US012772271B2

(12) United States Patent
Tsuboi et al.

(10) Patent No.: US 12,772,271 B2
(45) Date of Patent: Oct. 20, 2026

(54) TERMINAL APPARATUS, BASE STATION APPARATUS, AND METHOD

(71) Applicant: SHARP KABUSHIKI KAISHA, Sakai City (JP)

(72) Inventors: Hidekazu Tsuboi, Sakai City (JP); Shohei Yamada, Sakai City (JP); Takako Hori, Sakai City (JP); Kyosuke Inoue, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 448 days.

(21) Appl. No.: 18/269,597

(22) PCT Filed: Dec. 27, 2021

(86) PCT No.: PCT/JP2021/048469

§ 371 (c)(1),
(2) Date: Jun. 26, 2023

(87) PCT Pub. No.: WO2022/145403

PCT Pub. Date: Jul. 7, 2022

(65) Prior Publication Data

US 2024/0064785 A1 Feb. 22, 2024

(30) Foreign Application Priority Data

Dec. 29, 2020 (JP) ................................ 2020-219735

(51) Int. Cl.
*H04W 72/04* (2023.01)
*H04W 72/50* (2023.01)

(52) U.S. Cl.
CPC .......... *H04W 72/50* (2023.01); *H04W 72/04* (2013.01)

(58) Field of Classification Search
CPC ..... H04L 5/0098; H04L 5/0053; H04L 5/001; H04L 5/0092; H04L 1/0026;
(Continued)

(56) References Cited

U.S. PATENT DOCUMENTS 11,283,581 B2 * 3/2022 Tsuboi .................. H04W 72/23
2020/0077288 A1 3/2020 Tsuboi et al.
(Continued)

FOREIGN PATENT DOCUMENTS

WO 2018/174062 A1 9/2018

OTHER PUBLICATIONS

3GPP TS 38.300 V16.2.0 (Jul. 2020) 3rd Generation Partnership Project; Technical Specification Group Radio Access Network; NR; NR and NG-RAN Overall Description; Stage 2 (Release 16).
(Continued)

*Primary Examiner* — Quan M Hua
(74) *Attorney, Agent, or Firm* — ScienBiziP, P.C.

(57) ABSTRACT

A terminal apparatus for communicating with a base station apparatus by using a second cell group including a PSCell considers a measurement object including first information as a first measurement object group, considers a measurement object not including the first information as a second measurement object group, and based on the second cell group being in a deactivated state, does not measure the first measurement object group or measures the first measurement object group in accordance with a relaxed requirement.

3 Claims, 19 Drawing Sheets

(58) Field of Classification Search
CPC ................. H04L 1/0027; H04L 1/1614; H04L 12/403; H04L 5/0096; H04L 5/0055; H04L 5/0051; H04L 5/0057; H04L 5/0023; H04W 72/0453; H04W 76/27; H04W 76/15; H04W 72/23; H04W 52/0229; H04W 36/0064; H04W 72/53; H04W 36/0069; H04W 36/0077; H04W 74/02; H04W 74/0833; H04W 74/0838; H04W 74/002; H04W 74/004
See application file for complete search history.

(56) References Cited

U.S. PATENT DOCUMENTS

| | | | | |
|---|---|---|---|---|
| 2020/0235896 | A1* | 7/2020 | Lee | H04L 5/001 |
| 2021/0250156 | A1* | 8/2021 | Kim | H04W 72/23 |
| 2021/0250920 | A1* | 8/2021 | Kim | H04L 5/001 |
| 2022/0052829 | A1* | 2/2022 | Kim | H04L 5/0098 |

OTHER PUBLICATIONS

3GPP TS 36.300 V16.2.0 (Jul. 2020) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16).
3GPP TS 38.331 V16.2.0 (Sep. 2020) 3rd Generation Partnership Project; Technical Specification Group Radio Access Network; NR; Radio Resource Control (RRC) protocol specification (Release 16).
3GPP TS 36.331 V16.1.0 (Jul. 2020) 3rd Generation Partnership Project; Technical Specification Group Radio Access Network; Evolved Universal Terrestrial Radio Access (E-UTRA); Radio Resource Control (RRC); Protocol specification (Release 16).
3GPP TS 37.340 V16.2.0 (Jul. 2020) 3rd Generation Partnership Project; Technical Specification Group Radio Access Network; Evolved Universal Terrestrial Radio Access (E-UTRA) and NR; Multi-connectivity; Stage 2 (Release 16).
3GPP TS 38.321 V16.1.0 (Jul. 2020) 3rd Generation Partnership Project; Technical Specification Group Radio Access Network; NR; Medium Access Control (MAC) protocol specification (Release 16).
Nokia et al., "On fast deactivation/activation of SCG", R2-2009547, 3GPP TSG-RAN WG 2 Meeting #112 Electronic Elbonia, Nov. 2-13, 2020.
Ericsson, "Efficient SCG (de) acctivation", Tdoc R2-2010062, 3GPP TSG-RAN WG2 #112e, Electronic meeting, Nov. 2-13, 2020.

* cited by examiner

```
RRCReconfiguration ::=              SEQUENCE {
   <PARTLY OMITTED>
    radioBearerConfig                      RadioBearerConfig                                       OPTIONAL, -- Need M
    secondaryCellGroup                     OCTET STRING (CONTAINING CellGroupConfig)               OPTIONAL, -- Need M
    masterCellGroup                        OCTET STRING (CONTAINING CellGroupConfig)               OPTIONAL, -- Need M
    mrdc-SecondaryCellGroupConfig          SetupRelease { MRDC-SecondaryCellGroupConfig }          OPTIONAL, -- Need M
   <PARTLY OMITTED>
}

MRDC-SecondaryCellGroupConfig ::=       SEQUENCE {
    mrdc-ReleaseAndAdd                  ENUMERATED {true}                                        OPTIONAL,  -- Need N
    mrdc-SecondaryCellGroup             CHOICE {
        nr-SCG                              OCTET STRING  (CONTAINING RRCReconfiguration),
        eutra-SCG                           OCTET STRING
    }
}

CellGroupConfig ::=                        SEQUENCE {
    cellGroupId                                CellGroupId,
   <PARTLY OMITTED>
    mac-CellGroupConfig                        MAC-CellGroupConfig                                OPTIONAL,  -- Need M
    spCellConfig                               SpCellConfig                                       OPTIONAL,  -- Need M
    sCellToAddModList                          SEQUENCE (SIZE (1..maxNrofSCells)) OF SCellConfig  OPTIONAL,  -- Need N
    sCellToReleaseList                         SEQUENCE (SIZE (1..maxNrofSCells)) OF SCellIndex   OPTIONAL,  -- Need N
   <PARTLY OMITTED>
}
```

FIG. 7

```
RRCConnectionReconfiguration ::=    SEQUENCE {
        <PARTLY OMITTED>
        sCellToReleaseList-r10          SCellToReleaseList-r10          OPTIONAL,     -- Need ON
        sCellToAddModList-r10           SCellToAddModList-r10           OPTIONAL,     -- Need ON
        scg-Configuration-r12           SCG-Configuration-r12           OPTIONAL,     -- Cond nonFullConfig
        <PARTLY OMITTED>
}
PSCellToAddMod-r12 ::=              SEQUENCE {
        sCellIndex-r12                  SCellIndex-r10,
        cellIdentification-r12          SEQUENCE {
                <PARTLY OMITTED>
        }
        OPTIONAL,       -- Cond SCellAdd
        <PARTLY OMITTED>
}
SCellToAddModList-r10 ::=           SEQUENCE (SIZE (1..maxSCell-r10)) OF SCellToAddMod-r10
SCellToAddMod-r10 ::=               SEQUENCE {
        sCellIndex-r10                          SCellIndex-r10,
        cellIdentification-r10                  SEQUENCE {
                <PARTLY OMITTED>
        }
        OPTIONAL,       -- Cond SCellAdd
        <PARTLY OMITTED>
}
SCG-Configuration-r12 ::=           CHOICE {
        release                         NULL,
        setup                           SEQUENCE {
                <PARTLY OMITTED>
                scg-ConfigPartSCG-r12           SCG-ConfigPartSCG-r12   OPTIONAL      -- Need ON
        }
}
SCG-ConfigPartSCG-r12 ::=           SEQUENCE {
        <PARTLY OMITTED>
        sCellToReleaseListSCG-r12       SCellToReleaseList-r10          OPTIONAL,     -- Need ON
        pSCellToAddMod-r12              PSCellToAddMod-r12              OPTIONAL,     -- Need ON
        sCellToAddModListSCG-r12        SCellToAddModList-r10           OPTIONAL,     -- Need ON
        <PARTLY OMITTED>
}
```

FIG. 8

```
RRCReconfiguration ::=              SEQUENCE {
    rrc-TransactionIdentifier               RRC-TransactionIdentifier,
    <PARTLY OMITTED>
    radioBearerConfig                       RadioBearerConfig                                    OPTIONAL, -- Need M
    secondaryCellGroup                      OCTET STRING (CONTAINING CellGroupConfig)            OPTIONAL, -- Cond SCG
    masterCellGroup                         OCTET STRING (CONTAINING CellGroupConfig)            OPTIONAL, -- Need M
    mrdc-SecondaryCellGroupConfig           SetupRelease { MRDC-SecondaryCellGroupConfig }       OPTIONAL, -- Need M
    <PARTLY OMITTED>
}
```

FIG. 9

```
CellGroupConfig ::=                SEQUENCE {
    cellGroupId                        CellGroupId,
    rlc-BearerToAddModList             SEQUENCE (SIZE(1..maxLC-ID)) OF RLC-BearerConfig          OPTIONAL,   -- Need N
    rlc-BearerToReleaseList            SEQUENCE (SIZE(1..maxLC-ID)) OF LogicalChannelIdentity    OPTIONAL,   -- Need N
    mac-CellGroupConfig                MAC-CellGroupConfig                                       OPTIONAL,   -- Need M
    physicalCellGroupConfig            PhysicalCellGroupConfig                                   OPTIONAL,   -- Need M
    spCellConfig                       SpCellConfig                                              OPTIONAL,   -- Need M
    sCellToAddModList                  SEQUENCE (SIZE (1..maxNrofSCells)) OF SCellConfig         OPTIONAL,   -- Need N
    sCellToReleaseList                 SEQUENCE (SIZE (1..maxNrofSCells)) OF SCellIndex          OPTIONAL,   -- Need N
   <PARTLY OMITTED>
}
```

FIG. 10

```
SpCellConfig ::=                SEQUENCE {
    servCellIndex               ServCellIndex                              OPTIONAL,   -- Cond SCG
    reconfigurationWithSync     ReconfigurationWithSync                    OPTIONAL,   -- Cond ReconfWithSync
    rlf-TimersAndConstants      SetupRelease { RLF-TimersAndConstants }    OPTIONAL,   -- Need M
    spCellConfigDedicated       ServingCellConfig                          OPTIONAL,   -- Need M
   <PARTLY OMITTED>
}
```

FIG. 11

```
ReconfigurationWithSync ::=     SEQUENCE {
    spCellConfigCommon              ServingCellConfigCommon                         OPTIONAL,    -- Need M
    newUE-Identity                  RNTI-Value,
    t304                            ENUMERATED {ms50, ms100, ms150, ms200, ms500, ms1000, ms2000, ms10000},
    rach-ConfigDedicated            CHOICE {
        uplink                          RACH-ConfigDedicated,
        supplementaryUplink             RACH-ConfigDedicated
    }                                                                               OPTIONAL,    -- Need N
   <PARTLY OMITTED>
}
```

FIG. 12

```
ServingCellConfigCommon ::=        SEQUENCE {
    physCellId                         PhysCellId                              OPTIONAL,   -- Cond HOAndServCellAdd,
    downlinkConfigCommon               DownlinkConfigCommon                    OPTIONAL,   -- Cond HOAndServCellAdd
    uplinkConfigCommon                 UplinkConfigCommon                      OPTIONAL,   -- Need M
    ssb-PositionsInBurst               CHOICE {
        shortBitmap                        BIT STRING (SIZE (4)),
        mediumBitmap                       BIT STRING (SIZE (8)),
        longBitmap                         BIT STRING (SIZE (64))
    }                                                                          OPTIONAL,  -- Cond AbsFreqSSB
    ssbSubcarrierSpacing               SubcarrierSpacing                       OPTIONAL,  -- Cond HOAndServCellWithSSB
    <PARTLY OMITTED>
}

DownlinkConfigCommon ::=          SEQUENCE {
    frequencyInfoDL                    FrequencyInfoDL                     OPTIONAL,   -- Cond InterFreqHOAndServCellAdd
    initialDownlinkBWP                 BWP-DownlinkCommon                  OPTIONAL,   -- Cond ServCellAdd
    <PARTLY OMITTED>
}
```

FIG. 13

```
SCellConfig ::=              SEQUENCE {
    sCellIndex                   SCellIndex,
    sCellConfigCommon            ServingCellConfigCommon             OPTIONAL,   -- Cond SCellAdd
    sCellConfigDedicated         ServingCellConfig                   OPTIONAL,   -- Cond SCellAddMod
    sCellState-r16               ENUMERATED {activated}              OPTIONAL,   -- Cond SCellAddSync
   <PARTLY OMITTED>
}
```

FIG. 14

```
RRCReconfiguration ::=              SEQUENCE {
    rrc-TransactionIdentifier               RRC-TransactionIdentifier,
   <PARTLY OMITTED>
    conditionalReconfiguration              ConditionalReconfiguration                        OPTIONAL. -- Need M
   <PARTLY OMITTED>
}
ConditionalReconfiguration ::=     SEQUENCE {
    attemptCondReconfig          ENUMERATED {true}    OPTIONAL.   -- Cond PCell
    condReconfigToRemoveList    CondReconfigToRemoveList   OPTIONAL,    -- Need N
    condReconfigToAddModList    CondReconfigToAddModList   OPTIONAL,    -- Need N
    <PARTLY OMITTED>
}
CondReconfigToRemoveList ::=       SEQUENCE (SIZE (1.. maxNrofCondCells)) OF CondReconfigId
CondReconfigToAddModList ::=       SEQUENCE (SIZE (1.. maxNrofCondCells)) OF CondReconfigToAddMod
CondReconfigToAddMod ::=           SEQUENCE {
    condReconfigId             CondReconfigId.
    condExecutionCond          SEQUENCE (SIZE (1..2)) OF MeasId                OPTIONAL.    -- Cond condReconfigAdd
    condRRCReconfig            OCTET STRING (CONTAINING RRCReconfiguration)    OPTIONAL.    -- Cond condReconfigAdd
    <PARTLY OMITTED>
}
```

FIG. 18

TERMINAL APPARATUS, BASE STATION APPARATUS, AND METHOD

TECHNICAL FIELD

The present invention relates to a terminal apparatus, a base station apparatus, and a method.

This application claims priority based on JP 2020-219735 filed on Dec. 29, 2020, the contents of which are incorporated herein by reference.

BACKGROUND ART

In the 3rd Generation Partnership Project (3GPP) being a standardization project for cellular mobile communication systems, technical study and standardization have been carried out regarding the cellular mobile communication systems including radio access, core networks, services, and the like.

For example, in the 3GPP, technical study and standardization have been started on Evolved UniversaL TErrestrial Radio Access (E-UTRA) as a radio access technology (RAT) for cellular mobile communication systems for the 3.9th generation and the fourth generation. At present as well, in the 3GPP, technical study and standardization have been carried out on enhanced technology of E-UTRA. Note that E-UTRA may also be referred to as Long Term Evolution (LTE: trade name), and its enhanced technology may also be referred to as LTE-Advanced (LTE-A) and LTE-Advanced Pro (LTE-A Pro).

In the 3GPP, technical study and standardization have been started on New Radio or NR Radio access (NR) as a radio access technology (RAT) for cellular mobile communication systems for the fifth generation (5G). At present as well, in the 3GPP, technical study and standardization have been carried out on enhanced technology of NR.

CITATION LIST

Non Patent Literature

NPL 1: 3GPP TS 38.300 v16.2.0, "NR; NR and NG-RAN Overall description; Stage 2" pp. 10-134

NPL 2: 3GPP TS 36.300 v16.2.0, "Evolved Universal Terrestrial Radio Access (E-UTRA) and Evolved Universal Terrestrial Radio Access Network (E-UTRAN); Overall description; Stage 2" pp. 19-361

NPL 3: 3GPP TS 38.331 v16.2.0, "NR; Radio Resource Control (RRC); Protocol specifications" pp. 21-861

NPL 4: 3GPP TS 36.331 v16.1.0, "Evolved Universal Terrestrial Radio Access (E-UTRA); Radio Resource Control (RRC); Protocol specifications" pp. 25-1012

NPL 5: 3GPP TS 37.340 v16.2.0, "Evolved Universal Terrestrial Radio Access (E-UTRA) and NR; Multi-Connectivity; Stage 2" pp. 6-67

NPL 6: 3GPP TS 38.321 v16.1.0, "NR; Medium Access Control (MAC) protocol specification" pp. 8-148

SUMMARY OF INVENTION

Technical Problem

As an enhanced technology of NR, in order to enable data communication of large capacity, there is a dual connectivity (also referred to as multi-connectivity) technology, in which one or multiple base station apparatuses and a terminal apparatus communicate with each other using multiple cell groups. In dual connectivity, in order to perform communication in each of the cell groups, the terminal apparatus needs to monitor whether or not there is a message addressed to the terminal apparatus itself in each of the cell groups. There is a problem in that the terminal apparatus needs to constantly perform monitoring of multiple cell groups so as to be able to communicate with low delay in a case that data communication of large capacity occurs, and accordingly consumes much power. Thus, a technique (cell group Deactivation technique) of performing monitoring of a part of the cell groups at a low frequency or stopping the monitoring has been studied.

In addition to operation of the terminal apparatus in a deactivated state of the cell group, operation of the terminal apparatus in a case of activating (recovering) from the deactivated state has been studied as well.

In the deactivated state of the cell group, the terminal apparatus needs to perform processing necessary for promptly performing communication in a case that the cell group enters an activated state.

An aspect of the present invention is made in view of the circumstances described above, and has an object to provide a terminal apparatus, a base station apparatus, a method, and an integrated circuit that enable efficient communication control.

Solution to Problem

In order to accomplish the object described above, an aspect of the present invention is contrived to provide the following means. Specifically, an aspect of the present invention is a terminal apparatus for communicating with one or multiple base station apparatuses by using a first cell group including a PCell and a second cell group including a PSCell. The terminal apparatus includes a processing unit configured to process an RRC message received from a base station apparatus of the one or multiple base station apparatuses, and a measuring unit configured to perform measurement, based on a measurement configuration included in the RRC message. The measurement configuration includes a measurement object and a reporting configuration, and information of a measurement identifier associating the measurement object and the reporting configuration with each other. The measurement object including first information is considered to be a first measurement object group. The measurement object not including the first information is considered to be a second measurement object group. The first measurement object group and the second measurement object group are measured based on the second cell group being in an activated state. Based on the second cell group being in a deactivated state, the first measurement object group is not measured or is measured in accordance with a relaxed requirement.

An aspect of the present invention is a base station apparatus for communicating with a terminal apparatus. The base station apparatus includes a transmitter configured to transmit an RRC message to the terminal apparatus, and a processing unit configured to generate the RRC message to be transmitted to the terminal apparatus. A measurement configuration included in the RRC message includes a measurement object and a reporting configuration, and information of a measurement identifier associating the measurement object and the reporting configuration with each other. The measurement object including first information is considered to be a first measurement object group. The measurement object not including the first information is considered to be a second measurement object group.

Activation of a secondary cell group is indicated to the terminal apparatus to cause the terminal apparatus to measure the first measurement object group and the second measurement object group. Deactivation of the secondary cell group is indicated to the terminal apparatus to cause the terminal apparatus to not measure the first measurement object group, or to measure the first measurement object group in accordance with a relaxed requirement.

An aspect of the present invention is a method applied to a terminal apparatus for communicating with one or multiple base station apparatuses by using a first cell group including a PCell and a second cell group including a PSCell. The method includes the steps of processing an RRC message received from a base station apparatus of the one or multiple base station apparatuses, and performing measurement, based on a measurement configuration included in the RRC message. The measurement configuration includes a measurement object and a reporting configuration, and information of a measurement identifier associating the measurement object and the reporting configuration with each other. The measurement object including first information is considered to be a first measurement object group. The measurement object not including the first information is considered to be a second measurement object group. The first measurement object group and the second measurement object group are measured, based on the second cell group being in an activated state. Based on the second cell group being in a deactivated state, the first measurement object group is not measured or is measured in accordance with a relaxed requirement.

An aspect of the present invention is an integrated circuit implemented in a terminal apparatus for communicating with one or multiple base station apparatuses by using a first cell group including a PCell and a second cell group including a PSCell. The terminal apparatus is caused to perform processing an RRC message received from a base station apparatus of the one or multiple base station apparatuses, and performing measurement, based on a measurement configuration included in the RRC message. The measurement configuration includes a measurement object and a reporting configuration, and information of a measurement identifier associating the measurement object and the reporting configuration with each other. The measurement object including first information is considered to be a first measurement object group. The measurement object not including the first information is considered to be a second measurement object group. The first measurement object group and the second measurement object group are measured, based on the second cell group being in an activated state. Based on the second cell group being in a deactivated state, the first measurement object group is not measured or is measured in accordance with a relaxed requirement.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, the terminal apparatus, the base station apparatus, the method, and the integrated circuit can implement efficient communication control processing.

BRIEF DESCRIPTION OF DRAWINGS

FIG. 7 is an example of an ASN.1 notation included in a message related to reconfiguration of RRC connection in NR according to an embodiment of the present invention.

FIG. 8 is an example of an ASN.1 notation included in a message related to reconfiguration of RRC connection in E-UTRA according to an embodiment of the present invention.

FIG. 9 is an example of an ASN.1 notation of an RRC reconfiguration message according to an embodiment of the present invention.

FIG. 10 is an example of an ASN.1 notation of a cell group configuration information element according to an embodiment of the present invention.

FIG. 11 is an example of an ASN.1 notation of a configuration of an SpCell according to an embodiment of the present invention.

FIG. 12 is an example of an ASN.1 notation of a reconfiguration information element with synchronization according to an embodiment of the present invention.

FIG. 13 is an example of an ASN.1 notation of a ServingCellConfigCommon information element according to an embodiment of the present invention.

FIG. 14 is an example of an ASN.1 notation of an SCell configuration information element according to an embodiment of the present invention.

FIG. 18 is an example of an ASN.1 notation representing fields and/or information elements related to a configuration of conditional PSCell modification according to an embodiment of the present invention.

DESCRIPTION OF EMBODIMENTS

Hereinafter, an embodiment of the present invention will be described in detail with reference to the drawings.

LTE (and LTE-A, LTE-A Pro) and NR may be defined as different Radio Access Technologies (RATs). NR may be defined as a technology included in LTE. LTE may be defined as a technology included in NR. LTE that is connectible to NR by using Multi Radio Dual connectivity (MR-DC) may be distinguished from existing LTE. LTE using a 5GC as a core network may be distinguished from existing LTE using an EPC as a core network. Note that existing LTE may refer to LTE in which a technology standardized in release 15 or later versions of the 3GPP is not implemented. An embodiment of the present invention may be applied to NR, LTE, and other RATs. Terms associated with LTE and NR are used in the following description. However, an embodiment of the present invention may be applied to other technologies using other terms. In an embodiment of the present invention, the term "E-UTRA" may be replaced with "LTE," and the term "LTE" may be replaced with "E-UTRA."

Note that, in an embodiment of the present invention, terms of each node and entity, processing in each node and entity, and the like in a case that the radio access technology is E-UTRA or NR will be described. However, an embodiment of the present invention may be used for another radio access technology. The terms of each node and entity in an embodiment of the present invention may be other terms.

Figure 1:
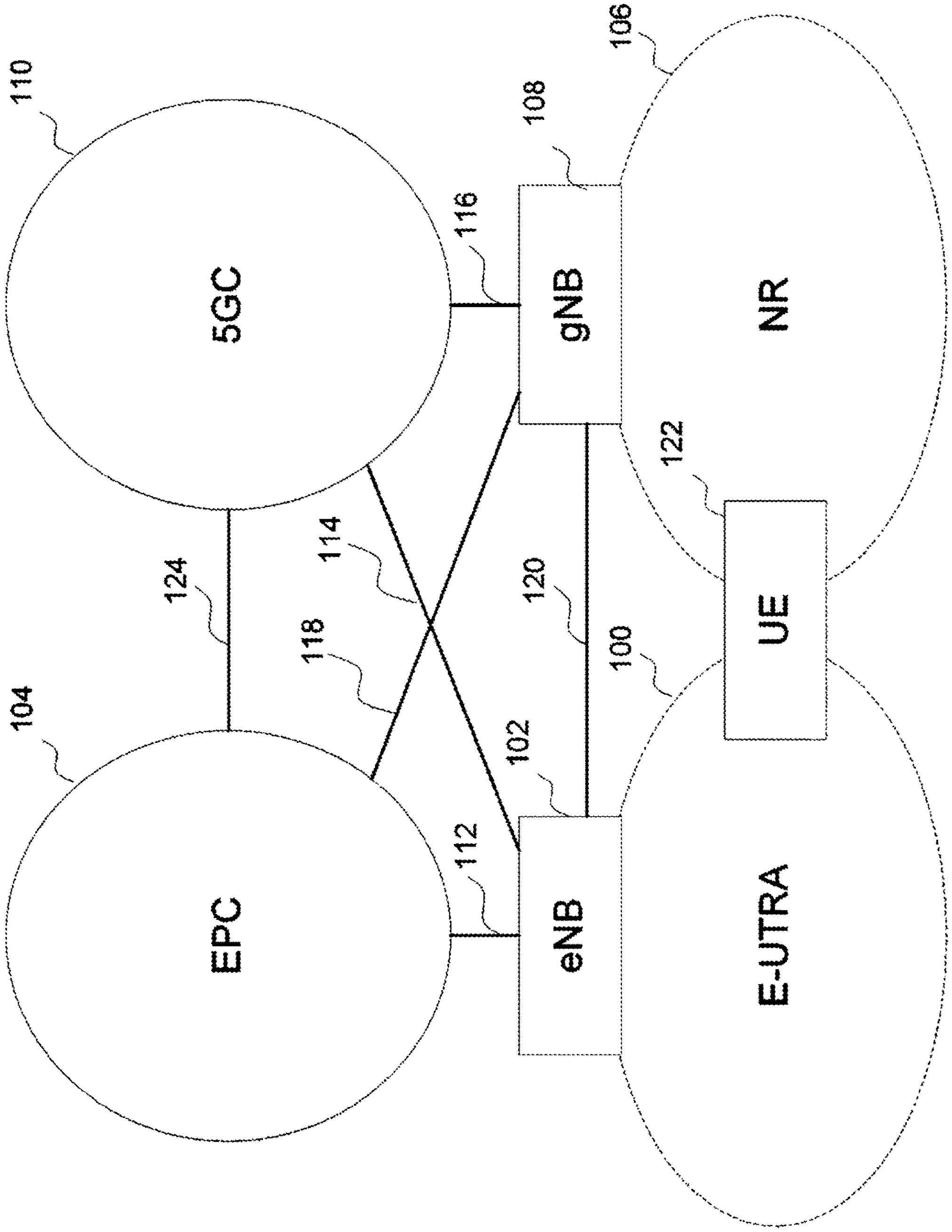
FIG. 1 is a schematic diagram of a communication system according to an embodiment of the present invention.

FIG. 1 is a schematic diagram of a communication system according to an embodiment of the present invention. Note that functions such as each node, radio access technology, core network, and interface to be described with reference to FIG. 1 are a part of functions closely related to an embodiment of the present invention, and other functions may be provided.

E-UTRA 100 may be a radio access technology. The E-UTRA 100 may be an air interface between a UE 122 and an eNB 102. The air interface between the UE 122 and the eNB 102 may be referred to as a Uu interface. The E-UTRAN Node B (eNB) 102 may be a base station apparatus of the E-UTRA 100. The eNB 102 may have an E-UTRA protocol to be described below. The E-UTRA protocol may include an E-UTRA User Plane (UP) protocol to be described below and an E-UTRA Control Plane (CP) protocol to be described below. The eNB 102 may terminate the E-UTRA User Plane (UP) protocol and the E-UTRA Control Plane (CP) protocol for the UE 122. A radio access network configured with the eNB may be referred to as an E-UTRAN.

An Evolved Packet Core (EPC) 104 may be a core network. An interface 112 is an interface between the eNB 102 and the EPC 104, and may be referred to as an S1 interface. The interface 112 may include a control plane interface through which a control signal passes and/or a user plane interface through which user data passes. The control plane interface of the interface 112 may be terminated in a Mobility Management Entity (MME) (not illustrated) in the EPC 104. The user plane interface of the interface 112 may be terminated in a serving gateway (S-GW) (not illustrated) in the EPC 104. The control plane interface of the interface 112 may be referred to as an S1-MME interface. The user plane interface of the interface 112 may be referred to as an S1-U interface.

Note that one or multiple eNBs 102 may be connected to the EPC 104 via the interface 112. Among the multiple eNBs 102 connected to the EPC 104, an interface may be present (not illustrated). The interface among the multiple eNBs 102 connected to the EPC 104 may be referred to as an X2 interface.

NR 106 may be a radio access technology. The NR 106 may be an air interface between the UE 122 and a gNB 108. The air interface between the UE 122 and the gNB 108 may be referred to as a Uu interface. The g Node B (gNB) 108 may be a base station apparatus of the NR 106. The gNB 108 may have an NR protocol to be described below. The NR protocol may include an NR User Plane (UP) protocol to be described below and an NR Control Plane (CP) protocol to be described below. The gNB 108 may terminate the NR User Plane (UP) protocol and the NR Control Plane (CP) protocol for the UE 122.

A 5GC 110 may be a core network. An interface 116 is an interface between the gNB 108 and the 5GC 110, and may be referred to as an NG interface. The interface 116 may include a control plane interface through which a control signal passes and/or a user plane interface through which user data passes. The control plane interface of the interface 116 may be terminated in an Access and mobility Management Function (AMF) (not illustrated) in the 5GC 110. The user plane interface of the interface 116 may be terminated in a User Plane Function (UPF) (not illustrated) in the 5GC 110. The control plane interface of the interface 116 may be referred to as an NG-C interface. The user plane interface of the interface 116 may be referred to as an NG-U interface.

Note that one or multiple gNBs 108 may be connected to the 5GC 110 via the interface 116. Among the multiple gNBs 108 connected to the 5GC 110, an interface may be present (not illustrated). The interface among the multiple gNBs 108 connected to the 5GC 110 may be referred to as an Xn interface.

The eNB 102 may have a function of connecting to the 5GC 110. The eNB 102 having the function of connecting to the 5GC 110 may be referred to as an ng-eNB. An interface 114 is an interface between the eNB 102 and the 5GC 110, and may be referred to as an NG interface. The interface 114 may include a control plane interface through which a control signal passes and/or a user plane interface through which user data passes. The control plane interface of the interface 114 may be terminated in an Access and mobility Management Function (AMF) (not illustrated) in the 5GC 110. The user plane interface of the interface 114 may be terminated in a User Plane Function (UPF) (not illustrated) in the 5GC 110. The control plane interface of the interface 114 may be referred to as an NG-C interface. The user plane interface of the interface 114 may be referred to as an NG-U interface. A radio access network including the ng-eNB or the gNB may be referred to as an NG-RAN. The NG-RAN, the E-UTRAN, the eNB, the ng-eNB, the gNB, and the like may be simply referred to as a network.

Note that one or multiple eNBs 102 may be connected to the 5GC 110 via the interface 114. Among the multiple eNBs 102 connected to the 5GC 110, an interface may be present (not illustrated). The interface among the multiple eNBs 102 connected to the 5GC 110 may be referred to as an Xn interface. The eNB 102 connected to the 5GC 110 and the gNB 108 connected to the 5GC 110 may be connected with an interface 120. The interface 120 between the eNB 102 connected to the 5GC 110 and the gNB 108 connected to the 5GC 110 may be referred to as an Xn interface.

The gNB 108 may have a function of connecting to the EPC 104. The gNB 108 having the function of connecting to the EPC 104 may be referred to as an en-gNB. An interface 118 is an interface between the gNB 108 and the EPC 104, and may be referred to as an S1 interface. The interface 118 may include a user plane interface through which user data passes. The user plane interface of the interface 118 may be terminated in an S-GW (not illustrated) in the EPC 104. The user plane interface of the interface 118 may be referred to as an S1-U interface. The eNB 102 connected to the EPC 104 and the gNB 108 connected to the EPC 104 may be connected with the interface 120. The interface 120 between the eNB 102 connected to the EPC 104 and the gNB 108 connected to the EPC 104 may be referred to as an X2 interface.

An interface 124 is an interface between the EPC 104 and the 5GC 110, and may be an interface that allows only the CP, only the UP, or both of the CP and the UP to pass therethrough. A part or all of the interfaces out of the interface 114, the interface 116, the interface 118, the interface 120, the interface 124, and the like may be absent depending on a communication system provided by a communication provider or the like.

The UE 122 may be a terminal apparatus that can receive broadcast information and a paging message transmitted from the eNB 102 and/or the gNB 108. The UE 122 may be a terminal apparatus that can perform radio connection with the eNB 102 and/or the gNB 108. The UE 122 may be a terminal apparatus that can simultaneously perform radio connection with the eNB 102 and radio connection with the gNB 108. The UE 122 may have the E-UTRA protocol and/or the NR protocol. Note that the radio connection may be Radio Resource Control (RRC) connection.

In a case that the UE 122 communicates with the eNB 102 and/or the gNB 108, Radio Bearers (RBs) may be established between the UE 122 and the eNB 102 and/or the gNB 108 to perform radio connection. The radio bearer used for the CP may be referred to as a Signalling Radio Bearer (SRB). The radio bearer used for the UP may be referred to as a data radio bearer (DRB Data Radio Bearer). Each radio bearer may be assigned a radio bearer identity (Identity) (ID). The radio bearer identity for the SRB may be referred to as an SRB identity (SRB Identity or SRB ID). The radio bearer identity for the DRB may be referred to as a DRB identity (DRB Identity or DRB ID).

The UE 122 may be a terminal apparatus that can connect to the EPC 104 and/or the 5GC 110 via the eNB 102 and/or the gNB 108. In a case that a connection destination core network of the eNB 102 and/or the gNB 108 with which the UE 122 performs communication is the EPC 104, each DRB established between the UE 122 and the eNB 102 and/or the gNB 108 may further be uniquely associated with each Evolved Packet System (EPS) bearer passing through the EPC 104. Each EPS bearer may be identified with an EPS bearer identity (Identity or ID). The same QoS may be secured for data, such as an IP packet and an Ethernet (trade name) frame, which passes through the same EPS bearer.

In a case that the connection destination core network of the eNB 102 and/or the gNB 108 with which the UE 122 performs communication is the 5GC 110, each DRB established between the UE 122 and the eNB 102 and/or the gNB 108 may further be associated with one of Packet Data Unit (PDU) sessions established in the 5GC 110. Each PDU session may include one or multiple QoS flows. Each DRB may be associated with (mapped to) one or multiple QoS flows, or may be associated with none of the QoS flows. Each PDU session may be identified with a PDU session Identifier (Identity, or ID). Each QoS flow may be identified with a QoS flow Identifier Identity, or ID). The QoS may be secured for data, such as an IP packet and an Ethernet frame, which passes through the same QoS flow.

The EPC 104 may not include the PDU session(s) and/or the QoS flow(s). The 5GC 110 may not include the EPS bearer(s). In a case that the UE 122 is connected to the EPC 104, the UE 122 may have information of the EPS bearer(s) but may not have information in the PDU session(s) and/or the QoS flow(s). In a case that the UE 122 is connected to the 5GC 110, the UE 122 may have information in the PDU session(s) and/or the QoS flow(s) but may not have information of the EPS bearer(s).

Note that, in the following description, the eNB 102 and/or the gNB 108 is also simply referred to as a base station apparatus, and the UE 122 is also simply referred to as a terminal apparatus or a UE.

Figure 2:
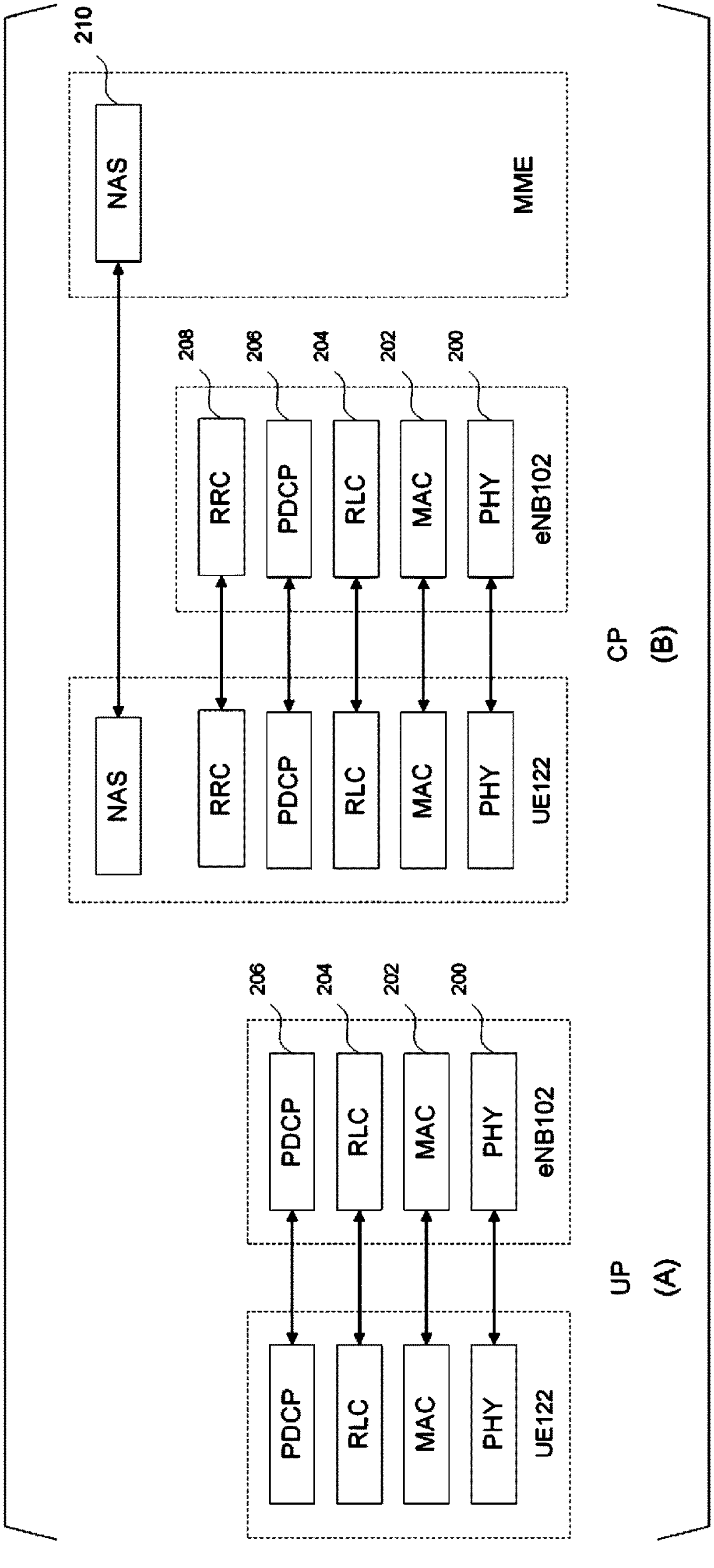
FIG. 2 is a diagram of an example of E-UTRA protocol architecture according to an embodiment of the present invention.
Figure 3:
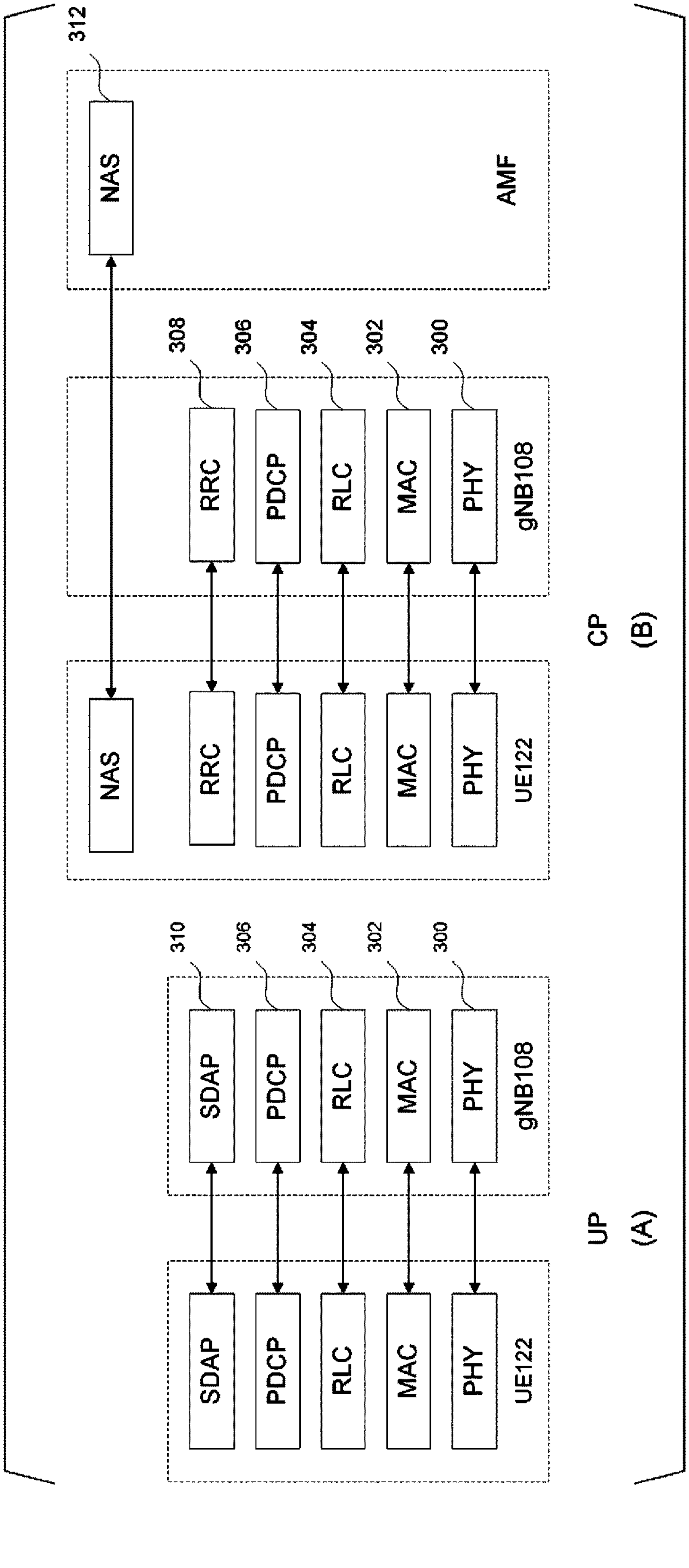
FIG. 3 is a diagram of an example of NR protocol architecture according to an embodiment of the present invention.

FIG. 2 is a diagram of an example of E-UTRA protocol architecture according to an embodiment of the present invention. FIG. 3 is a diagram of an example of NR protocol architecture according to an embodiment of the present invention. Note that functions of each protocol to be described with reference to FIG. 2 and/or FIG. 3 are a part of functions closely related to an embodiment of the present invention, and other functions may be provided. Note that, in an embodiment of the present invention, an uplink (UL) may be a link from the terminal apparatus to the base station apparatus. In each embodiment of the present invention, a downlink (DL) may be a link from the base station apparatus to the terminal apparatus.

FIG. 2(A) is a diagram of an E-UTRA user plane (UP) protocol stack. As illustrated in FIG. 2(A), the E-UTRAN UP protocol may be a protocol between the UE 122 and the eNB 102. In other words, the E-UTRAN UP protocol may be a protocol terminated in the eNB 102 in a network side. As illustrated in FIG. 2(A), the E-UTRA user plane protocol stack may include a Physical layer (PHY) 200 being a radio physical layer, a Medium Access Control (MAC) 202 being a medium access control layer, a Radio Link Control (RLC) 204 being a radio link control layer, and a Packet Data Convergence Protocol (PDCP) 206 being a packet data convergence protocol layer.

FIG. 3(A) is a diagram of an NR user plane (UP) protocol stack. As illustrated in FIG. 3(A), the NR UP protocol may be a protocol between the UE 122 and the gNB 108. In other words, the NR UP protocol may be a protocol terminated in the gNB 108 in a network side. As illustrated in FIG. 3(A), the E-UTRA user plane protocol stack may include a PHY 300 being a radio physical layer, a MAC 302 being a medium access control layer, an RLC 304 being a radio link control layer, a PDCP 306 being a packet data convergence protocol layer, and a service data adaptation protocol layer SDAP (Service Data Adaptation Protocol) 310.

FIG. 2(B) is a diagram of E-UTRA control plane (CP) protocol architecture. As illustrated in FIG. 2(B), in the E-UTRAN CP protocol, a Radio Resource Control (RRC) 208 being a radio resource control layer may be a protocol between the UE 122 and the eNB 102. In other words, the RRC 208 may be a protocol terminated in the eNB 102 in a network side. In the E-UTRAN CP protocol, a Non Access Stratum (NAS) 210 being a non Access Stratum (AS) layer (non AS layer) may be a protocol between the UE 122 and the MIME. In other words, the NAS 210 may be a protocol terminated in the MME in a network side.

FIG. 3(B) is a diagram of NR control plane (CP) protocol architecture. As illustrated in FIG. 3(B), in the NR CP protocol, an RRC 308 being a radio resource control layer may be a protocol between the UE 122 and the gNB 108. In other words, the RRC 308 may be a protocol terminated in the gNB 108 in a network side. In the E-UTRAN CP protocol, a NAS 312 being a non AS layer may be a protocol between the UE 122 and the AMF. In other words, the NAS 312 may be a protocol terminated in the AMF in a network side.

Note that the Access Stratum (AS) layer may be a layer terminated between the UE 122 and the eNB 102 and/or the gNB 108. In other words, the AS layer may be a layer including a part or all of the PHY 200, the MAC 202, the RLC 204, the PDCP 206, and the RRC 208, and/or a layer including a part or all of the PHY 300, the MAC 302, the RLC 304, the PDCP 306, the SDAP 310, and the RRC 308.

Note that, in an embodiment of the present invention, terms such as a PHY (PHY layer), a MAC (MAC layer), an RLC (RLC layer), a PDCP (PDCP layer), an RRC (RRC layer), and a NAS (NAS layer) may be hereinafter used, without the protocol of E-UTRA and the protocol of NR being distinguished from each other. In this case, the PHY (PHY layer), the MAC (MAC layer), the RLC (RLC layer), the PDCP (PDCP layer), the RRC (RRC layer), and the NAS (NAS layer) may be the PHY (PHY layer), the MAC (MAC layer), the RLC (RLC layer), the PDCP (PDCP layer), the RRC (RRC layer), and the NAS (NAS layer) of the E-UTRA protocol, or may be the PHY (PHY layer), the MAC (MAC layer), the RLC (RLC layer), the PDCP (PDCP layer), the RRC (RRC layer), and the NAS (NAS layer) of the NR protocol, respectively. The SDAP (SDAP layer) may be the SDAP (SDAP layer) of the NR protocol.

In an embodiment of the present invention, in a case that the protocol of E-UTRA and the protocol of NR are distinguished from each other, the PHY 200, the MAC 202, the RLC 204, the PDCP 206, and the RRC 208 may be hereinafter referred to as the PHY for E-UTRA or the PHY for LTE, the MAC for E-UTRA or the MAC for LTE, the RLC for E-UTRA or the RLC for LTE, the PDCP for E-UTRA or the PDCP for LTE, and the RRC for E-UTRA or the RRC for LTE, respectively. The PHY 200, the MAC 202, the RLC 204, the PDCP 206, and the RRC 208 may be referred to as an E-UTRA PHY or an LTE PHY, an E-UTRA MAC or an LTE MAC, an E-UTRA RLC or an LTE RLC, an E-UTRA PDCP or an LTE PDCP, an E-UTRA RRC or an LTE RRC, and the like, respectively. In a case that the protocol of E-UTRA and the protocol of NR are distinguished from each other, the PHY 300, the MAC 302, the RLC 304, the PDCP 306, and the RRC 308 may be referred to as a PHY for NR, a MAC for NR, an RLC for NR, an RLC for NR, and an RRC for NR, respectively. The PHY 200, the MAC 302, the RLC 304, the PDCP 306, and the RRC 308 may be referred to as an NR PHY, an NR MAC, an NR RLC, an NR PDCP, an NR RRC, and the like, respectively.

Entities in the AS layer of E-UTRA and/or NR will be described. An entity having a part or all of functions of the MAC layer may be referred to as a MAC entity. An entity having a part or all of functions of the RLC layer may be referred to as an RLC entity. An entity having a part or all of functions of the PDCP layer may be referred to as a PDCP entity. An entity having a part or all of functions of the SDAP layer may be referred to as an SDAP entity. An entity having a part or all of functions of the RRC layer may be referred to as an RRC entity. The MAC entity, the RLC entity, the PDCP entity, the SDAP entity, and the RRC entity may be alternatively referred to as a MAC, an RLC, a PDCP, an SDAP, and an RRC, respectively.

Note that data provided from the MAC, the RLC, the PDCP, and the SDAP to a lower layer, and/or data provided to the MAC, the RLC, the PDCP, and the SDAP from a lower layer may be referred to as a MAC Protocol Data Unit (PDU), an RLC PDU, a PDCP PDU, and an SDAP PDU, respectively. Data provided to the MAC, the RLC, the PDCP, and the SDAP from an upper layer, and/or data provided from the MAC, the RLC, the PDCP, and the SDAP to an upper layer may be referred to as a MAC Service Data Unit (SDU), an RLC SDU, a PDCP SDU, and an SDAP SDU, respectively. A segmented RLC SDU may be referred to as an RLC SDU segment. A layer ("Sou" in Japanese) is also referred to as a layer.

An example of the functions of the PHY will be described. The PHY of the terminal apparatus may have a function of receiving data transmitted from the PHY of the base station apparatus via a Downlink (DL) Physical Channel. The PHY of the terminal apparatus may have a function of transmitting data to the PHY of the base station apparatus via an Uplink (UL) physical channel. The PHY may be connected to an upper MAC with a Transport Channel. The PHY may deliver data to the MAC via the transport channel. The PHY may be provided with data from the MAC via the transport channel. In the PHY, in order to identify various pieces of control information, a Radio Network Temporary Identifier (RNTI) may be used.

Now, the physical channels will be described.

The physical channels used for radio communication between the terminal apparatus and the base station apparatus may include the following physical channels.

Physical Broadcast CHannel (PBCH)

Physical Downlink Control CHannel (PDCCH)

Physical Downlink Shared CHannel (PDSCH)

Physical Uplink Control CHannel (PUCCH)

Physical Uplink Shared CHannel (PUSCH)

Physical Random Access CHannel (PRACH)

The PBCH may be used to broadcast system information required by the terminal apparatus.

The PBCH may be used to broadcast time indexes (SSB-Indexes) within the periodicity of synchronization signal blocks (also referred to as SS/PBCH blocks, SSBs) in NR.

The PDCCH may be used to transmit (or carry) Downlink Control Information (DCI) in downlink radio communication (radio communication from the base station apparatus to the terminal apparatus). Here, one or multiple pieces of DCI (which may be referred to as DCI formats) may be defined for transmission of the downlink control information. In other words, a field for the downlink control information may be defined as DCI and may be mapped to information bits. The PDCCH may be transmitted in PDCCH candidates. The terminal apparatus may monitor a set of PDCCH candidates in a serving cell. To monitor a set of PDCCH candidates may mean an attempt to decode the PDCCH in accordance with a certain DCI format. The DCI format may be used for scheduling of the PUSCH in the serving cell. The PUSCH may be used for transmission of user data, transmission of RRC messages to be described below, and the like.

The PUCCH is used to transmit Uplink Control Information (UCI) in a case of uplink radio communication (radio communication from the terminal apparatus to the base station apparatus). Here, the uplink control information may include Channel State Information (CSI) used to indicate a downlink channel state. The uplink control information may include a Scheduling Request (SR) used for requesting Uplink Shared CHannel (UL-SCH) resources. The uplink control information may include a Hybrid Automatic Repeat request ACKnowledgement (HARQ-ACK).

The PDSCH may be used to transmit downlink data (Downlink Shared CHannel (DL-SCH)) from the MAC layer. In a case of the downlink, the PDSCH may be used to transmit System Information (SI), a Random Access Response (RAR), and the like.

The PUSCH may be used to transmit uplink data (Uplink-Shared CHannel (UL-SCH)) from the MAC layer or to transmit the HARQ-ACK and/or CSI along with the uplink data. The PUSCH may be used to transmit CSI only or a HARQ-ACK and CSI only. In other words, the PUSCH may be used to transmit the UCI only. The PDSCH or the PUSCH may be used to transmit RRC signalling (also referred to as an RRC message) and a MAC control element. In this regard, in the PDSCH, the RRC signalling transmitted from the base station apparatus may be signalling common to multiple terminal apparatuses in a cell. The RRC signalling transmitted from the base station apparatus may be dedicated signalling for a certain terminal apparatus (also referred to as dedicated signalling). In other words, terminal apparatus-specific (UE-specific) information may be transmitted through dedicated signalling to the certain terminal apparatus. Additionally, the PUSCH may be used to transmit UE capabilities in the uplink.

The PRACH may be used for transmitting a random access preamble. The PRACH may be used for indicating the initial connection establishment procedure, the handover procedure, the connection re-establishment procedure, synchronization (timing adjustment) for uplink transmission, and a request for a PUSCH (UL-SCH) resource.

An example of the functions of the MAC will be described. The MAC may be referred to as a MAC sublayer.

The MAC may have a function of mapping various Logical Channels to their corresponding transport channels. The logical channel may be identified with a logical channel identifier (Logical Channel Identity or Logical Channel ID). The MAC may be connected to an upper RLC with a logical channel. The logical channel may be classified into a control channel for transmitting control information and a traffic channel for transmitting user information, depending on a type of information to be transmitted. The logical channel may be classified into an uplink logical channel and a downlink logical channel. The MAC may have a function of multiplexing MAC SDUs belonging to one or multiple different logical channels and providing the multiplexed MAC SDUs to the PHY. The MAC may have a function of demultiplexing the MAC PDUs provided from the PHY and providing the demultiplexed MAC PDUs to an upper layer via the logical channels to which the respective MAC SDUs belong.

The MAC may have a function of performing error correction through a Hybrid Automatic Repeat reQuest (HARM). The MAC may have a Scheduling Report (SR) function of reporting scheduling information. The MAC may have a function of performing priority processing among the terminal apparatuses by using dynamic scheduling. The MAC may have a function of performing priority processing among the logical channels in one terminal apparatus. The MAC may have a function of performing priority processing of resources overlapping in one terminal apparatus.

The E-UTRA MAC may have a function of identifying Multimedia Broadcast Multicast Services (MBMS). The NR MAC may have a function of identifying a Multicast Broadcast Service (MB S).

The MAC may have a function of selecting a transport format. The MAC may have a function of performing Discontinuous Reception (DRX) and/or Discontinuous Transmission (DTX), a function of performing a Random Access (RA) procedure, a Power Headroom Report (PHR) function of reporting information of transmittable power, a Buffer Status Report (BSR) function of reporting data volume information of a transmission buffer, and the like.

The NR MAC may have a Bandwidth Adaptation (BA) function. A MAC PDU format used in the E-UTRA MAC and a MAC PDU format used in the NR MAC may be different from each other. The MAC PDU may include a MAC control element (MAC CE) being an element for performing control in the MAC.

Uplink (UL) and/or Downlink (DL) logical channels used in E-UTRA and/or NR will be described.

A Broadcast Control Channel (BCCH) may be a downlink logical channel for broadcasting control information, such as System Information (SI).

A Paging Control Channel (PCCH) may be a downlink logical channel for carrying a Paging message.

A Common Control Channel (CCCH) may be a logical channel for transmitting control information between the terminal apparatus and the base station apparatus. The CCCH may be used in a case that the terminal apparatus does not have RRC connection. The CCCH may be used between the base station apparatus and multiple terminal apparatuses.

A Dedicated Control Channel (DCCH) may be a logical channel for transmitting dedicated control information in a point-to-point bi-directional manner between the terminal apparatus and the base station apparatus. The dedicated control information may be control information dedicated to each terminal apparatus. The DCCH may be used in a case that the terminal apparatus has RRC connection.

A Dedicated Traffic Channel (DTCH) may be a logical channel for transmitting user data in a point-to-point manner between the terminal apparatus and the base station apparatus. The DTCH may be a logical channel for transmitting dedicated user data. The dedicated user data may be user data dedicated to each terminal apparatus. The DTCH may be present in both of the uplink and the downlink.

A Multicast Traffic Channel (MTCH) may be a point-to-multipoint downlink channel for transmitting data from the base station apparatus to the terminal apparatus. The MTCH may be a logical channel for multicasting. The MTCH may be used by the terminal apparatus only in a case that the terminal apparatus receives MBMS.

A Multicast Control Channel (MCCH) may be a point-to-multipoint downlink channel for transmitting MBMS control information for one or multiple MTCHs from the base station apparatus to the terminal apparatus. The MCCH may be a logical channel for multicasting. The MCCH may be used by the terminal apparatus only in a case that the terminal apparatus receives MBMS or the terminal apparatus is interested in receiving MBMS.

A Single Cell Multicast Traffic Channel (SC-MTCH) may be a point-to-multipoint downlink channel for transmitting data by using SC-PTM from the base station apparatus to the terminal apparatus. The SC-MTCH may be a logical channel for multicasting. The SC-MTCH may be used by the terminal apparatus only in a case that the terminal apparatus receives MBMS by using Single Cell Point-To-Multipoint (SC-PTM).

A Single Cell Multicast Control Channel (SC-MCCH) may be a point-to-multipoint downlink channel for transmitting MBMS control information for one or multiple SC-MTCHs from the base station apparatus to the terminal apparatus. The SC-MCCH may be a logical channel for multicasting. The SC-MCCH may be used by the terminal apparatus only in a case that the terminal apparatus receives MBMS by using SC-PTM or the terminal apparatus is interested in receiving MBMS by using SC-PTM.

Mapping between the logical channels and the transport channels in uplink, in E-UTRA and/or NR will be described.

The CCCH may be mapped to an Uplink Shared Channel (UL-SCH) being an uplink transport channel.

The DCCH may be mapped to an Uplink Shared Channel (UL-SCH) being an uplink transport channel.

The DTCH may be mapped to an Uplink Shared Channel (UL-SCH) being an uplink transport channel.

Mapping between the logical channels and the transport channels in downlink, in E-UTRA and/or NR will be described.

The BCCH may be mapped to a Broadcast Channel (BCH) and/or a Downlink Shared Channel (DL-SCH) being a downlink transport channel.

The PCCH may be mapped to a Paging Channel (PCH) being a downlink transport channel.

The CCCH may be mapped to a Downlink Shared Channel (DL-SCH) being a downlink transport channel.

The DCCH may be mapped to a Downlink Shared Channel (DL-SCH) being a downlink transport channel.

The DTCH may be mapped to a Downlink Shared Channel (DL-SCH) being a downlink transport channel.

The MTCH may be mapped to a Multicast Channel (MCH) being a downlink transport channel.

The MCCH may be mapped to a Multicast Channel (MCH) being a downlink transport channel.

The SC-MTCH may be mapped to a Downlink Shared Channel (DL-SCH) being a downlink transport channel.

The SC-MTCH may be mapped to a Downlink Shared Channel (DL-SCH) being a downlink transport channel.

An example of the functions of the RLC will be described. The RLC may be referred to as an RLC sublayer.

The E-UTRA RLC may have a function of segmenting (Segmentation) and/or concatenating (Concatenation) data provided from the PDCP of an upper layer, and providing the segmented and/or concatenated data to a lower layer. The E-UTRA RLC may have a function of reassembling (reassembly) and re-ordering data provided from a lower layer, and providing the reassembled and re-ordered data to an upper layer.

The NR RLC may have a function of assigning data provided from the PDCP of an upper layer with a sequence number independent of a sequence number assigned in the PDCP. The NR RLC may have a function of segmenting (Segmentation) data provided from the PDCP, and providing the segmented data to a lower layer. The NR RLC may have a function of reassembling (reassembly) data provided from a lower layer, and providing the reassembled data to an upper layer. The RLC may have a data retransmission function and/or retransmission request function (Automatic Repeat reQuest (ARQ)).

The RLC may have a function of performing error correction using the ARQ. Control information that indicates data required to be retransmitted and that is transmitted from a receiving side to a transmitting side of the RLC in order to perform the ARQ may be referred to as a status report. A status report transmission indication transmitted from the transmitting side to the receiving side of the RLC may be referred to as a poll. The RLC may have a function of detecting data duplication. The RLC may have a function of discarding data.

The RLC may have three modes, namely a Transparent Mode (TM), an Unacknowledged Mode (UM), and an Acknowledged Mode (AM). In the TM, segmentation of data received from an upper layer may not be performed, and addition of an RLC header may not be performed. A TM RLC entity may be a uni-directional entity, and may be configured as a transmitting TM RLC entity or as a receiving TM RLC entity. In the UM, segmentation and/or concatenation of data received from an upper layer, addition of an RLC header, and the like may be performed, but retransmission control of data may not be performed. A UM RLC entity may be a uni-directional entity, or may be a bi-directional entity. In a case that the UM RLC entity is a uni-directional entity, the UM RLC entity may be configured as a transmitting UM RLC entity or as a receiving UM RLC entity. In a case that the UM RLC entity is a bi-directional entity, the UM RRC entity may be configured as a UM RLC entity constituted with a transmitting side and a receiving side. In the AM, segmentation and/or concatenation of data received from an upper layer, addition of an RLC header, retransmission control of data, and the like may be performed. An AM RLC entity may be a bi-directional entity, and may be configured as an AM RLC constituted with a transmitting side and a receiving side. Note that data provided to a lower layer and/or data provided from a lower layer in the TM may be referred to as a TMD PDU. Data provided to a lower layer and/or data provided from a lower layer in the UM may be referred to as a UMD PDU. Data provided to a lower layer or data provided from a lower layer in the AM may be referred to as an AMD PDU.

An RLC PDU format used in the E-UTRA RLC and an RLC PDU format used in the NR RLC may be different from each other. The RLC PDU may include an RLC PDU for data and an RLC PDU for control. The RLC PDU for data may be referred to as an RLC DATA PDU (RLC Data PDU, RLC data PDU). The RLC PDU for control may be referred to as an RLC CONTROL PDU (RLC Control PDU, RLC control PDU).

An example of the functions of the PDCP will be described. The PDCP may be referred to as a PDCP sublayer.

The PDCP may have a function of maintenance of the sequence number. The PDCP may have a header compression and decompression function for efficiently transmitting, in wireless sections, user data such as an IP Packet and an Ethernet frame. A protocol used for header compression and decompression for an IP packet may be referred to as a Robust Header Compression (ROHC) protocol. A protocol used for header compression and decompression for an Ethernet frame may be referred to as an Ethernet (trade name) Header Compression (EHC) protocol. The PDCP may have a function of encryption and decryption of data. The PDCP may have a function of integrity protection and integrity verification of data. The PDCP may have a function of re-ordering. The PDCP may have a function of retransmitting the PDCP SDU. The PDCP may have a function of discarding data using a discard timer. The PDCP may have a Duplication function. The PDCP may have a function of discarding pieces of data received in a duplicate manner.

The PDCP entity may be a bi-directional entity, and may include a transmitting PDCP entity and a receiving PDCP entity. A PDCP PDU format used in the E-UTRA PDCP and a PDCP PDU format used in the NR PDCP may be different from each other. The PDCP PDU may include a PDCP PDU for data and a PDCP PDU for control. The PDCP PDU for data may be referred to as a PDCP DATA PDU (PDCP Data PDU, PDCP data PDU). The PDCP PDU for control may be referred to as a PDCP CONTROL PDU (PDCP Control PDU, PDCP control PDU).

An example of the functions of the SDAP will be described. The SDAP is a service data adaptation protocol layer.

The SDAP may have a function of performing association (mapping) between a downlink QoS flow transmitted from the 5GC 110 to the terminal apparatus via the base station apparatus and a data radio bearer (DRB) and/or mapping between an uplink QoS flow transmitted from the terminal apparatus to the 5GC 110 via the base station apparatus and a DRB. The SDAP may have a function of storing mapping rule information. The SDAP may have a function of performing marking of a QoS flow identifier (QoS Flow ID (QFI)). Note that the SDAP PDU may include an SDAP PDU for data and an SDAP PDU for control. The SDAP PDU for data may be referred to as an SDAP DATA PDU (SDAP Data PDU, SDAP data PDU). The SDAP PDU for control may be referred to as an SDAP CONTROL PDU (SDAP Control PDU, SDAP control PDU). Note that, in the terminal apparatus, one SDAP entity may be present for one PDU session.

An example of the functions of the RRC will be described.

The RRC may have a broadcast function. The RRC may have a Paging function from the EPC 104 and/or the 5GC 110. The RRC may have a Paging function from the gNB 108 or the eNB 102 connected to the 5GC 100. The RRC may have an RRC connection management function. The RRC may have a radio bearer control function. The RRC may have a cell group control function. The RRC may have a mobility control function. The RRC may have a terminal apparatus measurement reporting and terminal apparatus measurement reporting control function. The RRC may have a QoS management function. The RRC may have a radio link failure detection and recovery function. With use of an RRC message, the RRC may perform broadcast, paging, RRC connection management, radio bearer control, cell group control, mobity control, terminal apparatus measurement reporting and terminal apparatus measurement reporting control, QoS management, radio link failure detection and recovery, and the like. Note that RRC messages and parameters used in the E-UTRA RRC may be different from RRC messages and parameters used in the NR RRC.

The RRC message may be transmitted using the BCCH of the logical channel, may be transmitted using the PCCH of the logical channel, may be transmitted using the CCCH of the logical channel, may be transmitted using the DCCH of the logical channel, or may be transmitted using the MCCH of the logical channel.

In the RRC message transmitted using the BCCH, for example, a Master Information Block (MIB) may be included, a System Information Block (SIB) of each type may be included, or another RRC message may be included. In the RRC message transmitted using the PCCH, for example, a paging message may be included, or another RRC message may be included.

In the RRC message transmitted in the uplink (UL) direction using the CCCH, for example, an RRC setup request message (RRC Setup Request), an RRC resume request message (RRC Resume Request), an RRC reestablishment request message (RRC Reestablishment Request), an RRC system information request message (RRC System Info Request), and the like may be included. For example, an RRC connection request message (RRC Connection Request), an RRC connection resume request message (RRC Connection Resume Request), an RRC connection reestablishment request message (RRC Connection Reestablishment Request), and the like may be included. Another RRC message may be included.

In the RRC message transmitted in the downlink (DL) direction using the CCCH, for example, an RRC connection reject message (RRC Connection Reject), an RRC connection setup message (RRC Connection Setup), an RRC connection reestablishment message (RRC Connection Reestablishment), an RRC connection reestablishment reject message (RRC Connection Reestablishment Reject), and the like may be included. For example, an RRC reject message (RRC Reject), an RRC setup message (RRC Setup), and the like may be included. Another RRC message may be included.

In the RRC message transmitted in the uplink (UL) direction using the DCCH, for example, a measurement report message (Measurement Report), an RRC connection reconfiguration complete message (RRC Connection Reconfiguration Complete), an RRC connection setup complete message (RRC Connection Setup Complete), an RRC connection reestablishment complete message (RRC Connection Reestablishment Complete), a security mode complete message (Security Mode Complete), a UE capability information message (UE Capability Information), and the like may be included. For example, a measurement report message (Measurement Report), an RRC reconfiguration complete message (RRC Reconfiguration Complete), an RRC setup complete message (RRC Setup Complete), an RRC reestablishment complete message (RRC Reestablishment Complete), an RRC resume complete message (RRC Resume Complete), a security mode complete message (Security Mode Complete), a UE capability information message (UE Capability Information), and the like may be included. Another RRC message may be included.

In the RRC message transmitted in the downlink (DL) direction using the DCCH, for example, an RRC connection reconfiguration message (RRC Connection Reconfiguration), an RRC connection release message (RRC Connection Release), a security mode command message (Security Mode Command), a UE capability enquiry message (UE Capability Enquiry), and the like may be included. For example, an RRC reconfiguration message (RRC Reconfiguration), an RRC resume message (RRC Resume), an RRC release message (RRC Release), an RRC reestablishment message (RRC Reestablishment), a security mode command message (Security Mode Command), a UE capability enquiry message (UE Capability Enquiry), and the like may be included. Another RRC message may be included.

An example of the functions of the NAS will be described. The NAS may have an authentication function. The NAS may have a function of performing mobility management. The NAS may have a function of security control.

The functions of the PHY, the MAC, the RLC, the PDCP, the SDAP, the RRC, and the NAS described above are merely an example, and a part or all of each of the functions may not be implemented. Some or all of the functions of each layer may be included in another layer.

Note that, in upper layers (not illustrated) of the AS layer of the terminal apparatus, an IP layer, and a Transmission Control Protocol (TCP) layer and a User Datagram Protocol (UDP) layer, which are upper layers of the IP layer, and the like may be present. In the upper layers of the AS layer of the terminal apparatus, an Ethernet layer may be present. This may be referred to as a PDU layer being an upper layer of the AS layer of the terminal apparatus. The PDU layer may include the IP layer, the TCP layer, the UDP layer, the Ethernet layer, and the like. In the upper layers of the IP layer, the TCP layer, the UDP layer, the Ethernet layer, and the PDU layer, an application layer may be present. The application layer may include a Session Initiation Protocol (SIP) and a Session Description Protocol (SDP) used in an IP Multimedia Subsystem (IMS) being one of service networks standardized in the 3GPP. The application layer may include protocols, such as a Real-time Transport Protocol (RTP) used for media communication and/or Real-time Transport Control Protocol (RTCP) for media communication control, and/or a HyperText Transfer Protocol (HTTP). The application layer may include a codec for various media and the like. The RRC layer may be an upper layer of the SDAP layer.

The state and the state transition of the UE 122 in LTE and NR will now be described.

Regarding the UE 122 connected to the EPC or the 5GC, the UE 122 may be in an RRC_CONNECTED state in a case that an RRC connection has been established. The state in which the RRC connection has been established may include a state in which the UE 122 retains a part or all of UE contexts to be described below. The state in which the RRC connection has been established may include a state in which the UE 122 can transmit and/or receive unicast data. Regarding the UE 122, in a case that the RRC connection is suspended, the UE 122 may be in an RRC_INACTIVE state. The case that the UE 122 is in the RRC_INACTIVE state may be a case that the UE 122 is connected to the 5GC and the RRC connection is suspended. In a case that the UE 122 is in neither the RRC_CONNECTED state nor the RRC_INACTIVE state, the UE 122 may be in an RRC_IDLE state.

Note that, in a case that the UE 122 is connected to the EPC, suspension of the RRC connection may be started by the E-UTRAN although the UE 122 does not have the RRC_INACTIVE state. In a case that the UE 122 is connected to the EPC and the RRC connection is suspended, the UE 122 may transition to the RRC_IDLE state while retaining an AS context of the UE and an identifier (resumeIdentity) used for resumption (resume). In a case that the UE 122 retains the AS context of the UE and that the E-UTRAN permits the RRC connection to be resumed and that the UE 122 needs to transition from the RRC_IDLE state to the RRC_CONNECTED state, an upper layer (for example, the NAS layer) of the RRC layer of the UE 122 may initiate the resumption of the RRC connection suspended.

The definition of the suspension of RRC connection may vary between the UE 122 connected to the EPC 104 and the UE 122 connected to the 5GC 110. All or a part of the procedures for the UE 122 to resume from suspension of RRC connection may be different between a case that the UE 122 is connected to the EPC (is suspended in the RRC_IDLE state) and a case that the UE 122 is connected to the 5GC (is suspended in the RRC_INACTIVE state).

Note that the RRC_CONNECTED state, the RRC_INACTIVE state, and the RRC_IDLE state may be respectively referred to as an RRC connected state (RRC connected mode), an RRC inactive state (RRC inactive mode), and an RRC idle state (RRC idle mode), or, in a case that there is no risk of misunderstanding, may be simply respectively referred to as a connected state (connected mode), an inactive state (inactive mode), and an idle state (idle mode).

The AS context of the UE retained by the UE 122 may be information including all or some of a current RRC configuration, a current security context, a PDCP state including a RObust Header Compression (ROHC) state, a Cell Radio Network Temporary Identifier (C-RNTI) used in a PCell of a connection source, a cell identity (cellIdentity), and a physical cell identity of the PCell of the connection source. Note that the AS context of the UE retained by one or all of the eNB 102 and the gNB 108 may include information identical to the information of the AS context of the UE retained by the UE 122, or may include information different from the information included in the AS context of the UE retained by the UE 122.

The security context may be information including all or some of a ciphering key at the AS level, a Next Hop parameter (NH), a Next Hop Chaining Counter parameter (NCC) used to derive an access key for the next hop, an identifier of a ciphering algorithm at a selected AS level, and a counter used for replay protection.

The Cell Group configured for the terminal apparatus from the base station apparatus will be described. The cell group may include only one Special Cell (SpCell). The cell group may include one SpCell and one or multiple Secondary Cells (SCells). In other words, the cell group may include one SpCell, and optionally one or multiple SCells. Note that, in a case that the MAC entity is associated with a Master Cell Group (MCG), the SpCell may mean a Primary Cell (PCell). In a case that the MAC entity is associated with a Secondary Cell Group (SCG), the SpCell may mean a Primary SCG Cell (PSCell). In a case that the MAC entity is not associated with the cell group, the SpCell may mean the PCell. The PCell, the PSCell, and the SCell are each a serving cell. The SpCell may support PUCCH transmission and contention-based Random Access. The SpCell may constantly be in an activated state. The PCell may be a cell used for an RRC connection establishment procedure in a case that the terminal apparatus in the RRC idle state transitions to the RRC connected state. The PCell may be a cell used for an RRC connection reestablishment procedure in which the terminal apparatus performs reestablishment of RRC connection. The PCell may be a cell used for a random access procedure in a case of a handover. The PSCell may be a cell used for the random access procedure in a case of addition of a Secondary Node (SN) to be described below. The SpCell may be a cell used for purposes other than the purposes described above. Note that, in a case that the cell group includes the SpCell and one or more SCells, it can be said that carrier aggregation (CA) is configured for the cell group. For the terminal apparatus configured with CA, a cell that provides additional radio resources to the SpCell may mean the SCell.

A group of serving cells configured by the RRC, which is a cell group using the same timing reference cell and the same timing advance value for cells out of the group configured with the uplink may be referred to as a Timing Advance Group (TAG). The TAG including the SpCell of the MAC entity may mean a Primary Timing Advance Group (PTAG). The TAG other than the PTAG may mean a Secondary Timing Advance Group (STAG).

In a case that Dual Connectivity (DC) and Multi-Radio Dual Connectivity (MR-DC) are performed, addition of a cell group for the terminal apparatus from the base station apparatus may be performed. DC may be a technology for performing data communication by using radio resources of the cell groups configured by each of a first base station apparatus (first node) and a second base station apparatus (second node). MR-DC may be a technology included in DC. In order to perform DC, the first base station apparatus may add the second base station apparatus. The first base station apparatus may be referred to as a Master Node (MN). The cell group configured by the master node may be referred to as a Master Cell Group (MCG). The second base station apparatus may be referred to as a Secondary Node (SN). The cell group configured by the secondary node may be referred to as a Secondary Cell Group (SCG). Note that the master node and the secondary node may be configured in the same base station apparatus.

In a case that DC is not configured, the cell group configured for the terminal apparatus may be referred to as an MCG. In the case that DC is not configured, the SpCell configured for the terminal apparatus may be the PCell.

Note that MR-DC may be a technology for performing DC using E-UTRA for the MCG and NR for the SCG. MR-DC may be a technology for performing DC using NR for the MCG and E-UTRA for the SCG. MR-DC may be a technology for performing DC using NR for both of the MCG and the SCG. As an example of MR-DC using E-UTRA for the MCG and NR for the SCG, there may be E-UTRA-NR Dual Connectivity (EN-DC) using the EPC as a core network, or there may be NG-RAN E-UTRA-NR Dual Connectivity (NGEN-DC) using the 5GC as a core network. As an example of MR-DC using NR for the MCG and E-UTRA for the SCG, there may be NR-E-UTRA Dual Connectivity (NE-DC) using the 5GC as a core network. As an example of MR-DC using NR for both of the MCG and the SCG, there may be NR-NR Dual Connectivity (NR-DC) using the 5GC as a core network.

Note that, in the terminal apparatus, one MAC entity may be present for each cell group. For example, in a case that DC or MR-DC is configured for the terminal apparatus, one MAC entity may be present for the MCG, and one MAC entity may be present for the SCG. The MAC entity for the MCG in the terminal apparatus may be constantly established for the terminal apparatus in all of the states (the RRC idle state, the RRC connected state, the RRC inactive state, and the like). The MAC entity for the SCG in the terminal apparatus may be created by the terminal apparatus in a case that the SCG is configured for the terminal apparatus. Configuration of the MAC entity for each cell group of the terminal apparatus may be performed in a case that the terminal apparatus receives an RRC message from the base station apparatus. In EN-DC and NGEN-DC, the MAC entity for the MCG may be an E-UTRA MAC entity, and the MAC entity for the SCG may be an NR MAC entity. In NE-DC, the MAC entity for the MCG may be an NR MAC entity, and the MAC entity for the SCG may be an E-UTRA MAC entity. In NR-DC, the MAC entities for the MCG and the SCG may each be an NR MAC entity. Note that a case that one MAC entity is present for each cell group may be alternatively described as a case that one MAC entity is present for each SpCell. One MAC entity for each cell group may be alternatively referred to as one MAC entity for each SpCell.

The radio bearers will be described. For the SRBs of E-UTRA, SRB0 to SRB2 may be defined, or SRBs other than these may be defined. For the SRBs of NR, SRB0 to SRB3 may be defined, or SRBs other than these may be defined.

SRB0 may be an SRB for an RRC message transmitted and/or received using the CCCH of the logical channel.

SRB1 may be an SRB for an RRC message, and for a NAS message before establishment of SRB2. The RRC message transmitted and/or received using SRB1 may include a piggybacked NAS message. For all of RRC messages and NAS messages transmitted and/or received using SRB1, the DCCH of the logical channel may be used.

SRB2 may be an SRB for a NAS message, and for an RRC message including logged measurement information. For all of RRC messages and NAS messages transmitted and/or received using SRB2, the DCCH of the logical channel may be used. SRB2 may have a priority lower than that of SRB1.

SRB3 may be an SRB for transmitting and/or receiving a specific RRC message in a case that EN-DC, NGEN-DC, NR-DC, or the like is configured for the terminal apparatus. For all of RRC messages and NAS messages transmitted and/or received using SRB3, the DCCH of the logical channel may be used. Other SRBs may be provided for other purposes. The DRB may be a radio bearer for user data. For an RRC message transmitted and/or received using the DRB, the DTCH of the logical channel may be used.

The radio bearers in the terminal apparatus will be described. The radio bearers include an RLC bearer. The RLC bearer may include one or two RLC entities and a logical channel. The RLC entities in a case that the RLC bearer includes two RLC entities may be the transmitting RLC entity and the receiving RLC entity in the TM RLC entity and/or the uni-directional UM mode RLC entity.

SRB0 may include one RLC bearer. The RLC bearer of SRB0 may include the RLC entity of TM, and a logical channel. SRB0 may be constantly established in the terminal apparatus in all of the states (the RRC idle state, the RRC connected state, the RRC inactive state, and the like). In a case that the terminal apparatus transitions from the RRC idle state to the RRC connected state, one SRB1 may be established and/or configured for the terminal apparatus, using an RRC message received from the base station apparatus. SRB1 may include one PDCP entity, and one or multiple RLC bearers. The RLC bearer of SRB1 may include the RLC entity of AM, and a logical channel. One SRB2 may be established and/or configured for the terminal apparatus, using an RRC message that the terminal apparatus in the RRC connected state with activated AS security receives from the base station apparatus. SRB2 may include one PDCP entity, and one or multiple RLC bearers. The RLC bearer of SRB2 may include the RLC entity of AM, and a logical channel. Note that the PDCP of SRB1 and SRB2 on the base station apparatus side may be deployed in the master node. In a case that the secondary node in EN-DC, NGEN-DC, or NR-DC is added or in a case that the secondary node is changed, one SRB3 may be established and/or configured for the terminal apparatus, using an RRC message that the terminal apparatus in the RRC connected state with activated AS security receives from the base station apparatus. SRB3 may be a direct SRB between the terminal apparatus and the secondary node. SRB3 may include one PDCP entity, and one or multiple RLC bearers. The RLC bearer of SRB3 may include the RLC entity of AM, and a logical channel. The PDCP of the SRB3 on the base station apparatus side may be deployed in the secondary node.

One or multiple DRBs may be established and/or configured for the terminal apparatus, using an RRC message that the terminal apparatus in the RRC connected state with activated AS security receives from the base station apparatus. The DRB may include one PDCP entity, and one or multiple RLC bearers. The RLC bearer of the DRB may include the RLC entity of AM or UM, and a logical channel.

Note that, in MR-DC, the radio bearer whose PDCP is deployed in the master node may be referred to as an MN terminated bearer. In MR-DC, the radio bearer whose PDCP is deployed in the secondary node may be referred to as an SN terminated bearer. Note that, in MR-DC, the radio bearer whose RLC bearer is present only in the MCG may be referred to as an MCG bearer. In MR-DC, the radio bearer whose RLC bearer is present only in the SCG may be referred to as an SCG bearer. In DC, the radio bearer whose RLC bearer is present in both of the MCG and the SCG may be referred to as a split bearer.

In a case that MR-DC is configured for the terminal apparatus, a bearer type of SRB1 and SRB2 established/and or configured for the terminal apparatus may be an MN terminated MCG bearer and/or an MN terminated split bearer. In a case that MR-DC is configured for the terminal apparatus, a bearer type of SRB3 established/and or configured for the terminal apparatus may be an SN terminated SCG bearer. In a case that MR-DC is configured for the terminal apparatus, a bearer type of the DRB established/and or configured for the terminal apparatus may be any one of all of the bearer types.

The RLC entity established and/or configured for the RLC bearer established and/or configured for the cell group configured in E-UTRA may be the E-UTRA RLC. The RLC entity established and/or configured for the RLC bearer established and/or configured for the cell group configured in NR may be the NR RLC. In a case that EN-DC is configured for the terminal apparatus, the PDCP entity established and/or configured for the MN terminated MCG bearer may be either the E-UTRA PDCP or the NR PDCP. In a case that EN-DC is configured for the terminal apparatus, the PDCP established and/or configured for the radio bearers of other bearer types, i.e., an MN terminated split bearer, an MN terminated SCG bearer, an SN terminated MCG bearer, an SN terminated split bearer, and an SN terminated SCG bearer, may be the NR PDCP. In a case that NGEN-DC, NE-DC, or NR-DC is configured for the terminal apparatus, the PDCP entity established and/or configured for the radio bearers of all of the bearer types may be the NR PDCP.

Note that, in NR, the DRB established and/or configured for the terminal apparatus may be associated with one PDU session. One SDAP entity may be established and/or configured for one PDU session in the terminal apparatus. The SDAP entity, the PDCP entity, the RLC entity, and the logical channel established and/or configured for the terminal apparatus may be established and/or configured using an RRC message that the terminal apparatus receives from the base station apparatus.

Note that, regardless of whether or not MR-DC is configured, a network configuration in which the master node is the eNB 102 and the EPC 104 is used as a core network may be referred to as E-UTRA/EPC. A network configuration in which the master node is the eNB 102 and the 5GC 110 is used as a core network may be referred to as E-UTRA/5GC. A network configuration in which the master node is the gNB 108 and the 5GC 110 is used as a core network may be referred to as NR or NR/5GC. In a case that MR-DC is not configured, the master node described above may refer to the base station apparatus that performs communication with the terminal apparatus.

Next, the handover in LTE and NR will be described. The handover may be processing in which the UE 122 in the RRC connected state changes the serving cell. The handover may be performed in a case that the UE 122 receives an RRC message indicating handover from the eNB 102 and/or the gNB 108. The RRC message indicating handover may be a message related to reconfiguration of RRC connection including a parameter indicating handover (for example, an information element referred to as MobilityControlInfo, or an information element referred to as ReconfigurationWithSync). Note that the information element referred to as MobilityControlInfo described above may be alternatively referred to as a mobility control configuration information element, a mobility control configuration, or mobility control information. Note that the information element referred to as ReconfigurationWithSync described above may be alternatively referred to as a reconfiguration with synchronization information element, or a reconfiguration with synchronization. Alternatively, the RRC message indicating handover may be a message (for example, MobilityFromEUTRACommand, or MobilityFromNRCommand) indicating movement to a cell of another RAT. The handover may be alternatively referred to as a reconfiguration with synchronization (reconfiguration with sync). As a condition that the UE 122 can perform handover, a case that a part or all of a case that AS security is activated, a case that the SRB2 has been established, at least one DRB has been established may be included.

Note that the terminal apparatus may perform processing in which the serving cell is not changed, based on an RRC message for indicating handover. In other words, handover processing, in which the same cell as the current serving cell is a target cell, may be performed by the terminal apparatus.

Uplink Time Alignment in the MAC entity of the terminal apparatus will be described.

In the MAC entity of the terminal apparatus, the following parameter for Maintenance of uplink time alignment may be configured by the RRC.

Time alignment timer for each TAG (timeAlignmentTimner): A timer used by the MAC entity to control time in which it is considered that there is uplink time alignment between the serving cells belonging to the TAG associated with the timer (in other words, it is considered that there is uplink synchronization).

The MAC entity of the terminal apparatus performs a part or all of the following (A) to (D) for maintenance of the uplink time alignment:

(A) receive a timing advance command MAC control element, and in a case that a parameter (N_TA) indicating timing advance between the downlink and the uplink is maintained in the indicated TAG, (1) apply the timing advance command for the indicated TAG, and (2) start or restart the time alignment timer associated with the indicated TAG;

(B) in a case that the timing advance command is received on a random access response message for the serving cell belonging to a certain TAG or on an MSGB for the SpCell, a part or all of the following (B-1) to (B-3) may be performed:

(B-1) in a case that the random access preamble is not selected by the MAC entity among Contention-based random access preambles, perform processing of the following (B-1-1) to (B-1-2):

(B-1-1) apply the timing advance command for the TAG;

(B-1-2) start or restart the time alignment timer associated with the TAG;

(B-2) in a case that the condition of (B-1) is not met, and the time alignment timer associated with the TAG is not running, perform processing of the following (B-2-1) to (B-2-3):

(B-2-1) apply the timing advance command for the TAG;

(B-2-2) start the time alignment timer associated with the TAG;

(B-2-3) in a case that it is considered that Contention Resolution in the random access procedure has not succeeded, or it is considered that the contention resolution for an SI request has succeeded after transmitting HARQ feedback for the MAC PDU including a UE contention Resolution Identity MAC control element, stop the time alignment timer associated with the TAG;

(B-3) in a case that the condition of neither (B-1) nor (B-2) is met, ignore the received timing advance command;

(C) in a case that an Absolute timing advance command is received as a response for MSGA transmission including a C-RNTI MAC control element, (1) apply the timing advance command for the PTAG, and (2) start or restart the time alignment timer associated with the PTAG;

(D) in a case that the time alignment timer has expired, a part or all of the following (D-1) to (D-2) may be performed:

(D-1) in a case that the time alignment timer associated with the PTAG has expired, a part or all of the processing of the following (D-1-1) to (D-1-8) may be performed:

(D-1-1) flush all of the HARQ buffers of all of the serving cells;

(D-1-2) in a case that the PUCCH is configured for any of the serving cells, notify the RRC entity of the terminal apparatus of release of the PUCCH of all of the serving cells;

(D-1-3) in a case that the SRS is configured for any of the serving cells, notify the RRC entity of the terminal apparatus of release of the SRS of all of the serving cells;

(D-1-4) clear all of the Configured downlink assignments and the Configured uplink grants being configured;

(D-1-5) clear all of the PUSCH resources for semi-persistent CSI report;

(D-1-6) consider that all of the running time alignment timers have expired;

(D-1-7) maintain N_TA of all of the TAGs;

(D-1-8) in a case that the time alignment timer of the PTAG of the deactivated secondary cell group has expired, not perform detection and/or recovery of a beam failure in the cell of the secondary cell group;

(D-2) in a case that the condition of (D-1) is not met, and the time alignment timer associated with the STAG has expired, a part or all of the following (D-2-1) to (D-2-6) may be performed for all of the serving cells belonging to the TAG:

(D-2-1) flush all of the HARQ buffers;

(D-2-2) in a case that the PUCCH is configured, notify the RRC entity of the terminal apparatus of release thereof;

(D-2-3) in a case that the SRS is configured, notify the RRC entity of the terminal apparatus of release thereof;

(D-2-4) clear all of the Configured downlink assignments and the Configured uplink grants being configured;

(D-2-5) clear all of the PUSCH resources for semi-persistent CSI report;

(D-2-6) maintain N_TA of the TAG.

In a case that the MAC entity of the terminal apparatus stops uplink transmission in the SCell as a result of a maximum difference of the uplink timings between the TAGs of the MAC or a maximum difference of the uplink timings between the TAGs of any of the MAC entities of the terminal apparatus having exceeded an upper limit, the MAC entity may consider that the time alignment timer of the TAG associated with the SCell has expired.

In a case that the time alignment timer associated with the TAG belonging to a certain SCell is not running, the MAC entity of the terminal apparatus does not perform transmission other than transmission of the random access preamble and the MSGA in the SCell. In addition, in a case that the time alignment timer associated with the PTAG is not running, the MAC entity of the terminal apparatus does not perform all of the transmissions other than transmission of the random access preamble and the MSGA in the SpCell.

Figure 4:
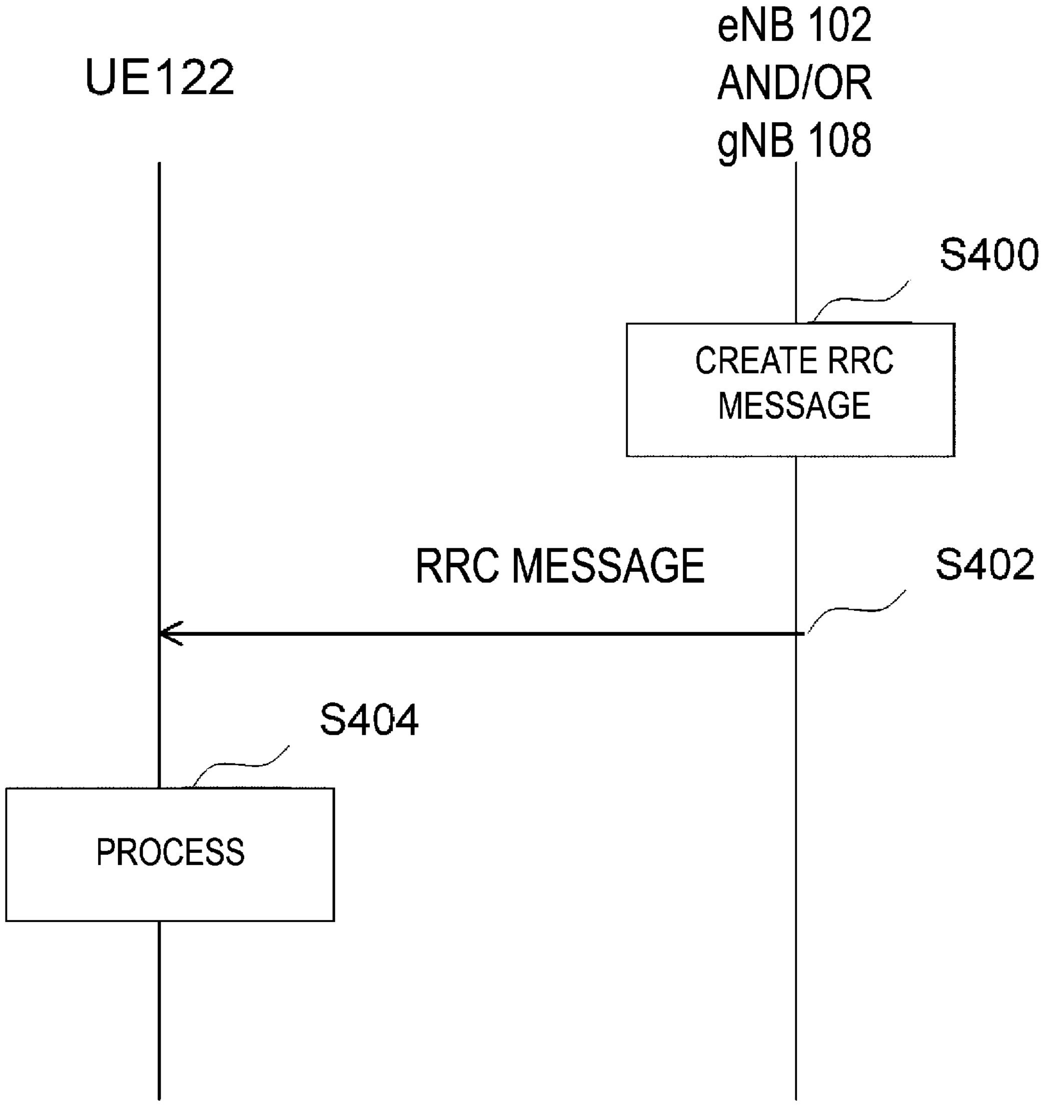
FIG. 4 is a diagram illustrating an example of a flow of a procedure for various configurations in RRC according to an embodiment of the present invention.

A flow of the RRC message transmitted and/or received between the terminal apparatus and the base station apparatus will be described. FIG. 4 is a diagram illustrating an example of a flow of a procedure for various configurations in the RRC according to an embodiment of the present invention. FIG. 4 is an example of a flow of a case in which the RRC message is transmitted from the base station apparatus (eNB 102 and/or gNB 108) to the terminal apparatus (UE 122).

In FIG. 4, the base station apparatus creates an RRC message (Step S400). The creation of the RRC message in the base station apparatus may be performed so that the base station apparatus distributes broadcast information (System Information (SI)) and paging information. The creation of the RRC message in the base station apparatus may be performed so that the base station apparatus causes a specific terminal apparatus to perform processing. The processing that the specific terminal apparatus is caused to perform may include, for example, processing such as configuration related to security, reconfiguration of RRC connection, handover to a different RAT, suspension of RRC connection, and release of RRC connection. The processing of reconfiguration of RRC connection may include, for example, processing such as control (establishment, change, release, or the like) of a radio bearer, control (establishment, addition, change, release, or the like) of a cell group, measurement configuration, handover, and security key update. The creation of the RRC message in the base station apparatus may be performed for a response to an RRC message transmitted from the terminal apparatus. The response to the RRC message transmitted from the terminal apparatus may include, for example, a response to an RRC setup request, a response to an RRC reconnection request, a response to an RRC resume request, and the like. The RRC message includes information (parameters) for various information notifications and configurations. These parameters may be referred to as fields and/or information elements, and may be notated by using a notation method referred to as Abstract Syntax Notation One (ASN.1).

In FIG. 4, the base station apparatus then transmits the RRC message created, to the terminal apparatus (Step S402). Then, in a case that processing such as a configuration is necessary in accordance with the RRC message received, the terminal apparatus performs the processing (Step S404). The terminal apparatus that has performed the processing may transmit an RRC message for a response to the base station apparatus (not illustrated).

In addition to the example described above, the RRC message may be used for other purposes as well.

Note that, in MR-DC, the RRC on the master node side may be used for transfer of the RRC message for the configuration (cell group configuration, radio bearer configuration, measurement configuration, and the like) on the SCG side to and from the terminal apparatus. For example, in EN-DC or NGEN-DC, the RRC message of E-UTRA transmitted and/or received between the eNB 102 and the UE 122 may include the RRC message of NR in a form of a container. In NE-DC, the RRC message of NR transmitted and/or received between the gNB 108 and the UE 122 may include the RRC message of E-UTRA in a form of a container. The RRC message for the configuration on the SCG side may be transmitted and/or received between the master node and the secondary node.

Note that an embodiment is not limited to a case that MR-DC is used, and the RRC message for E-UTRA transmitted from the eNB 102 to the UE 122 may include the RRC message for NR, and the RRC message for NR transmitted from the gNB 108 to the UE 122 may include the RRC message for E-UTRA.

An example of the parameters included in the RRC message related to reconfiguration of RRC connection will be described. FIG. 7 is an example of an ASN.1 notation representing a field and/or an information element related to a radio bearer configuration included in a message related to reconfiguration of RRC connection in NR in FIG. 4. FIG. 8 is an example of an ASN.1 notation representing a field and/or an information element related to a radio bearer configuration included in a message related to reconfiguration of RRC connection in E-UTRA in FIG. 4. Not only in the figures of FIG. 7 and FIG. 8, in examples of the ASN.1 according to an embodiment of the present invention, <omitted> and <partly omitted> are not a part of the notation of the ASN.1 and indicate that other information is omitted at these positions. Note that there may also be omitted information elements in a part where neither <omitted> nor <partly omitted> is indicated. Note that, in an embodiment of the present invention, the examples of the ASN.1 do not correctly comply with the ASN.1 notation method. In an embodiment of the present invention, the examples of the ASN.1 are notations of examples of parameters of the RRC message according to an embodiment of the present invention, and other terms and other notations may be used. The examples of ASN.1 correspond to only examples related to main information closely associated with an aspect of the present invention in order to avoid complicated description. Note that the parameters notated in ASN.1 may all be referred to as information elements without distinction between fields, information elements, or the like. In an embodiment of the present invention, fields, information elements, and the like included in the RRC message and notated in ASN.1 may be referred to as information, or may be referred to as parameters. Note that the message related to reconfiguration of RRC connection may be an RRC reconfiguration message in NR or an RRC connection reconfiguration message in E-UTRA.

Activation and deactivation of a cell will be described. In the terminal apparatus communicating in dual connectivity, the master cell group (MCG) and the secondary cell group (SCG) are configured by the message related to reconfiguration of RRC connection. Each cell group may include a special cell (SpCell) and zero or more cells (secondary cells (SCells)) other than the special cell. The SpCell of the MCG is also referred to as a PCell. The SpCell of the SCG is also referred to as a PSCell. Deactivation of a cell may not be applied to the SpCell but may be applied to the SCell.

Deactivation of a cell may not be applied to the PCell but may be applied to the PSCell. In this case, deactivation of a cell may be processing different between the SpCell and the SCell.

Activation and deactivation of a cell may be processed in the MAC entity that is present for each cell group. The SCell configured for the terminal apparatus may be activated and/or deactivated by the following (A) and/or (B):

(A) reception of a MAC CE indicating activation/deactivation of the SCell;

(B) an SCell deactivation timer configured for each SCell not configured with the PUCCH (the SCell is deactivated based on expiry of the timer);

(C) an SCell state (sCellState) configured for each SCell by the RRC message (the SCell is activated based on that a field of the SCell state is included in configuration of the SCell).

Specifically, the MAC entity of the terminal apparatus may perform a part or all of each process of the following processing (AD) for each SCell configured in the cell group.

Processing AD

The following processing is performed: (1) In a case that an RRC parameter (SCell state) is configured to "activated" or the MAC CE for activating the SCell is received in a case that the SCell is configured, the MAC entity of the UE 122 performs processing (AD-1). Otherwise, that is, in a case that the MAC CE for deactivating the SCell is received, or the SCell deactivation timer expires in the SCell in the activated state, the MAC entity of the UE 122 performs processing (AD-2);

(2) In a case that an uplink grant or a downlink assignment is reported on the PDCCH of the SCell in the activated state, or an uplink grant or a downlink assignment for the SCell in the activated state is reported on the PDCCH of a certain serving cell, or the MAC PDU is transmitted in a configured uplink grant, or the MAC PDU is received in a configured downlink assignment, the MAC entity of the UE 122 restarts the SCell deactivation timer associated with the SCell;

(3) In a case that the SCell enters the deactivated state, the MAC entity of the UE 122 performs processing (AD-3).

Processing AD-1

The MAC entity of the terminal apparatus may perform a part or all of the following (1) to (3):

(1) In NR, in a case that the SCell is in the deactivated state before the MAC CE for activating the SCell is received, or the RRC parameter (sCellState) configured for the SCell in a case of SCell configuration is configured to "activated", the MAC entity of the UE 122 performs processing (AD-1-1);

(2) The MAC entity of the UE 122 starts the SCell deactivation timer associated with the SCell, or restarts the timer (in a case that the timer has already started);

(3) In a case that the Active DL BWP is not a Dormant BWP and that there is a suspended type 1 configured uplink grant associated with the SCell). the MAC entity of the UE 122 (re-)initializes this in accordance with stored configuration. Then), the MAC entity of the UE 122 triggers the PHR.

Processing AD-1-1

The MAC entity of the terminal apparatus may perform a part or all of the following (1) to (3):

(1) In a case that the BWP indicated by a first active downlink BWP identifier (firstActiveDownlinkBWP-Id) configured for the SCell using the RRC message is not configured as the Dormant BWP, the MAC entity of the UE 122 performs processing (AD-1-1-1);

(2) In a case that the BWP indicated by the first active downlink BWP identifier (firstActiveDownlinkBWP-Id) configured for the SCell using the RRC message is configured for the Dormant BWP, and that a BWP deactivation timer (bwp-InactivityTimer) of the serving cell is running, the MAC entity of the UE 122 stops the timer;

(3) The MAC entity of the UE 122 activates a downlink BWP indicated by the first active downlink BWP identifier (firstActiveDownlinkBWP-Id) configured for the SCell using the RRC message and an uplink BWP indicated by a first active uplink BWP identifier (firstActiveUplinkBWP-Id).

Processing AD-1-1-1

The MAC entity of the terminal apparatus may bring the SCell into the activated state at prescribed timing, and apply (perform) regular SCell Operation including a part or all of the following (A) to (E):

(A) transmit a sounding reference signal (SRS) in the SCell;
(B) report channel state information (CSI) for the SCell;
(C) monitor the PDCCH in the SCell;
(D) monitor the PDCCH for the SCell (in a case that scheduling for the SCell is performed in another serving cell);
(E) perform PUCCH transmission in the SCell in a case that the PUCCH is configured.

Processing AD-2

The MAC entity of the terminal apparatus may perform a part or all of the following (A) to (D):

(A) deactivate the SCell at prescribed timing;
(B) stop the SCell deactivation timer associated with the SCell;
(C) deactivate all of the Active BWPs associated with the SCell;
(D) flush the HARQ buffer associated with the SCell.

Processing AD-3

The MAC entity of the terminal apparatus may perform a part or all of the following (A) to (D):

(A) not transmit an SRS in the SCell;
(B) not report CSI for the SCell;
(C) not transmit the PUCCH, the UL-SCH, and/or the RACH in the SCell;
(D) not monitor the PDCCH for the SCell and/or the PDCCH for the SCell.

As described above, activation and deactivation of the SCell is performed by the MAC entity performing the processing (AD).

In a case that the SCell is added as described above, the initial state of the SCell may be configured by the RRC message.

Here, the SCell deactivation timer will be described. A value (information related to time at which the timer is considered to have expired) of the SCell deactivation timer may be reported, by the RRC message, to the SCell not configured with the PUCCH. For example, in a case that information indicating 40 ms as the value of the SCell deactivation timer is reported by the RRC message, in the processing (AD), the timer is considered to have expired after the elapse of time (here, 40 ms) reported without stopping of the timer since the timer is started or restarted. The SCell deactivation timer may be a timer referred to as sCellDeactivationTimer.

Here, a bandwidth part (BWP) will be described.

The BWP may be a partial band or an entire band of the serving cell. The BWP may be referred to as a Carrier BWP. The terminal apparatus may be configured with one or multiple BWPs. A certain BWP may be configured by information included in broadcast information associated with a synchronization signal detected in initial cell search. A certain BWP may be a frequency bandwidth associated with a frequency for performing the initial cell search. A certain BWP may be configured by RRC signalling (for example, Dedicated RRC signalling). A downlink BWP (DL BWP) and an uplink BWP (UL BWP) may be separately configured. One or multiple uplink BWPs may be associated with one or multiple downlink BWPs. Association between the uplink BWP and the downlink BWP may be prescribed association, may be association by RRC signalling (for example, Dedicated RRC signalling), may be association by physical layer signalling (for example, downlink control information (DCI) reported on a downlink control channel, or may be a combination of those.

The BWP may include a group of continuous Physical Resource Blocks (PRBs). For the terminal apparatus in the connected state, parameters of the BWP(s) (one or multiple BWPs) of each component carrier may be configured. The parameters of the BWP of each component carrier may include a part or all of: (A) a type of a cyclic prefix; (B) a subcarrier spacing; (C) a frequency position of the BWP (for example, a start position on a low frequency side of the BWP or a center frequency position) (as the frequency position, for example, ARFCN may be used, or an offset from a specific subcarrier of the serving cell may be used. A unit of the offset may be a subcarrier unit, or may be a resource block unit. Both of the ARFCN and the offset may be configured); (D) a bandwidth of the BWP (for example, the number of PRBs); (E) resource configuration information of a control signal; and (F) center frequency position of an SS block (as the frequency position, for example, ARFCN may be used, or an offset from a specific subcarrier of the serving cell may be used. A unit of the offset may be a subcarrier unit, or may be a resource block unit. Both of the ARFCN and the offset may be configured). The resource configuration information of a control signal may be at least included in configuration of a part or all of the BWPs of the PCell and/or the PSCell.

The terminal apparatus may perform transmission and/or reception in an active BWP (Active BWP) out of the one or multiple configured BWPs. A maximum of one uplink BWP and/or a maximum of one downlink BWP may be configured to be an active BWP at certain time out of the one or multiple BWPs configured for one serving cell associated with the terminal apparatus. The activated downlink BWP is also referred to as an Active DL BWP. The activated uplink BWP is also referred to as an Active UL BWP.

Next, deactivation of the BWP will be described. In one serving cell, one or multiple BWPs may be configured. BWP switching in the serving cell is used to activate a deactivated BWP (also referred to as an Inactive BWP) and deactivate an activated BWP.

The BWP switching is controlled by the MAC entity itself for the PDCCH indicating a downlink assignment or an uplink grant, the BWP deactivation timer, RRC signalling, or initiation of a random access procedure. The Active BWP of the serving cell is indicated by the RRC or the PDCCH.

Next, a Dormant BWP will be described. Entering to the dormant BWP or leaving from the dormant BWP is performed through the BWP switching. This control is performed by the PDCCH for each SCell, or for each group referred to as a dormancy SCell group (Dormancy SCell Group). Configuration of the dormancy SCell group is indicated by the RRC signalling. In the current specifications, the dormant BWP is applied to only the SCell. Note that, it may be understood that the dormant BWP is not for changing a certain BWP into the dormant state but is one BWP configured for dormancy out of one or multiple BWPs configured for the UE. There may be multiple BWPs that are configured for the UE for dormancy.

A certain BWP being the dormant BWP may be indicated by no inclusion of a specific parameter in the configuration of the BWP. For example, no inclusion of a PDCCH-Config information element, being an information element for configuring parameters of the PDCCH specific to the UE included in the configuration of the downlink BWP, may indicate that the BWP is the dormant BWP. For example, no configuration (no inclusion) of a part of parameters included in the PDCCH-Config information element, being an information element for configuring parameters of the PDCCH specific to the UE included in the configuration of the downlink BWP, may indicate that the BWP is the dormant BWP. For example, no configuration (no inclusion) of a part or all of configurations related to a search space for defining where and/or how candidates for the PDCCH are searched, which are configured by the PDCCH-Config information element, as the configuration of a certain BWP may indicate that the BWP is the dormant BWP.

A certain configuration may not support configuration of the dormant BWP for a PUCCH SCell that allows transmission of the SpCell such as the PCell and the PSCell and the PUCCH.

The UE that has received in the SpCell the PDCCH indicating leaving from the dormant BWP outside a certain configured period (active time) activates the downlink BWP indicated by a first downlink BWP identifier reported by the RRC signalling in advance.

The UE that has received in the SpCell the PDCCH indicating leaving from the dormant BWP within the certain configured period (active time) activates the downlink BWP indicated by a second downlink BWP identifier reported by the RRC signalling in advance.

The UE that has received the PDCCH indicating entering to the dormant BWP activates the downlink BWP indicated by a third downlink BWP identifier (dormantDownlinkBWP-Id) reported by the RRC signalling in advance.

The entering to and the leaving from the dormant BWP are performed through the BWP switching, and in a case that a new BWP is activated, the BWP that has thus far been in the activated state is deactivated. In other words, in a case of leaving from the dormant BWP, the dormant BWP is deactivated, and in a case of entering to the dormant BWP, the dormant BWP is activated.

Here, the PDCCH indicating entering to the dormant BWP and the PDCCH indicating leaving from the dormant BWP will be described.

For example, the UE configured with discontinuous reception (DRX) in the SpCell may monitor the PDCCH in the Active BWP of the SpCell in order to detect a certain DCI format (for example, DCI format 2_6) outside the active time of DRX. A CRC of the DCI format may be scrambled with a certain RNTI (for example, a PS-RNTI). The UE configured with the dormancy SCell group determines switching of the Active DL BWP, based on bitmap information included in a payload of DCI format 2_6. For example, in a case that a certain bit of the bitmap is associated with one dormancy SCell group and the bit is 1, BWP switching may be performed to switch to another BWP configured in advance in a case that the Active DL BWP is the dormant BWP, and the BWP may remain the same in a case that the Active DL BWP is not the dormant BWP. In a case that the bit is 0, BWP switching may be performed such that the Active DL BWP is the dormant BWP.

In the active time of DRX, the UE need not monitor the PDCCH for the purpose of detecting DCI format 2_6.

The UE configured with discontinuous reception (DRX) in the SpCell may monitor the PDCCH in the Active BWP of the SpCell in order to detect certain DCI formats (for example, DCI formats 0_1 and 1_1) in the active time of DRX. A CRC of the DCI formats may be scrambled with a certain RNTI (for example, a C-RNTI or an MCS-C-RNTI). The UE configured with the dormancy SCell group determines switching of the Active DL BWP, based on bitmap information included in a payload of DCI format 0_1 or DCI format 1_1. For example, in a case that a certain bit of the bitmap is associated with one dormancy SCell group and the bit is 1, BWP switching may be performed to switch to another BWP configured in advance in a case that the Active DL BWP is the dormant BWP, and the BWP may remain the same in a case that the Active DL BWP is not the dormant BWP. In a case that the bit is 0, BWP switching may be performed such that the Active DL BWP is the dormant BWP. The "another BWP configured in advance" may be a BWP different from the "another BWP configured in advance" used in the description for DCI format 2_6.

Outside the active time of DRX, the UE need not monitor the PDCCH for the purpose of detecting DCI format 0_1 and DCI format 1_1.

To monitor the PDCCH indicating leaving from the dormant BWP may be to monitor the PDCCH for the purpose of detecting DCI format 2_6 outside the active time of DRX, and to monitor the PDCCH for the purpose of detecting DCI format 0_1 and DCI format 1_1 in the active time of DRX.

In each activated serving cell in which the BWP is configured, in a case that the BWP is activated (Active BWP), and the BWP is not the dormant BWP, the MAC entity may perform a part or all of the following (A) to (H):

(A) transmit the UL-SCH in the BWP;

(B) transmit the RACH in the BWP in a case that a PRACH occasion is configured;

(C) monitor the PDCCH in the BWP;

(D) transmit the PUCCH in the BWP in a case that the PUCCH is configured;

(E) report the CSI in the BWP;

(F) transmit the SRS in the BWP in a case that the SRS is configured;

(G) receive the DL-SCH in the BWP;

(H) initialize a configured uplink grant of grant type 1 configured and suspended in the BWP.

In each activated serving cell in which the BWP is configured, in a case that the BWP is activated (Active BWP), and the BWP is the dormant BWP, the MAC entity may perform a part or all of the following (A) to (G):

(A) stop the BWP deactivation timer of the serving cell of the BWP, in a case that the BWP deactivation timer is running;

(B) not monitor the PDCCH of the BWP;

(C) not monitor the PDCCH for the BWP;

(D) not receive the DL-SCH in the BWP;

(F) not transmit the SRS in the BWP;

(G) not transmit the UL-SCH in the BWP;

(H) not transmit the RACH in the BWP;

(I) not transmit the PUCCH in the BWP;

(J) clear each of a configured downlink assignment and a configured uplink grant of grant type 2 associated with the SCell;

(K) suspend a configured uplink grant of grant type 1 associated with the SCell; (L) in a case that a configuration related to a beam failure is configured, detect the Beam Failure, and in a case that the beam failure is detected, perform Beam Failure Recovery.

In a case that the BWP is deactivated, the MAC entity may perform a part or all of the following (A) to (I):

(A) not transmit the UL-SCH in the BWP;

(B) not transmit the RACH in the BWP;

(C) not monitor the PDCCH in the BWP;

(D) not transmit the PUCCH in the BWP;

(E) not report the CSI in the BWP;

(F) not transmit the SRS in the BWP;

(G) not receive the DL-SCH in the BWP;

(H) clear the configured uplink grant of grant type 2 configured in the BWP;

(I) suspend the configured uplink grant of grant type 1 of the deactivated BWP (inactive BWP).

Next, the random access procedure in the UE configured with the BWP will be described. In a case of initiating the random access procedure in a certain serving cell, in a selected carrier of the serving cell, the MAC entity may perform a part or all of the processing of the following (A) to (E):

(A) in a case that a resource (occasion) for transmitting the PRACH is not configured for the Active UL BWP, (A1) switch the Active UL BWP to the BWP indicated by an RRC parameter (initialUplinkBWP), and (A2) in a case that the serving cell is the SpCell, switch the Active UL BWP to the BWP indicated by an RRC parameter "initial downlink BWP" (initialDownlinkBWP);

(B) in a case that a resource (occasion) for transmitting the PRACH is configured for the Active UL BWP, the serving cell is the SpCell, and the Active DL BWP and the Active UL BWP do not include the same identifier (bwp-Id), switch the Active DL BWP to the BWP of an identifier the same as the identifier of the Active UL BWP;

(C) in a case that the BWP deactivation timer associated with the Active DL BWP of the serving cell is running, stop the timer;

(D) in a case that the serving cell is the SCell and the BWP deactivation timer associated with the Active DL BWP of the SpCell is running, stop the timer;

(E) perform the random access procedure in the Active DL BWP of the SpCell and the Active UL BWP of the serving cell.

Next, the BWP deactivation timer will be described. For each activated serving cell (Activated Serving Cell) configured with the BWP deactivation timer, the MAC entity performs the processing of the following (A). The BWP deactivation timer may be a timer referred to as bwp-InactivityTimer. (A) is as follows:

(A) in a case that an identifier (defaultDownlinkBWP-Id) of a default downlink BWP is configured, and the Active DL BWP is not the BWP indicated by an identifier (dormantDownlinkBWP-Id), or in a case that the identifier (defaultDownlinkBWP-Id) of the default downlink BWP is not configured, the Active DL BWP is not initialDownlinkBWP, and the Active DL BWP is not the BWP indicated by the identifier (dormantDownlinkBWP-Id), the MAC entity performs the processing of the following (A-1) and (A-2):

(A-1) in a case that the PDCCH addressed to a C-RNTI or a CS-RNTI indicating a downlink assignment or an uplink grant is received in the Active DL BWP, the PDCCH addressed to a C-RNTI or a CS-RNTI indicating a downlink assignment or an uplink grant for the Active DL BWP is received, the MAC PDU is transmitted in a configured uplink grant, or the MAC PDU is received in a configured downlink assignment, the MAC entity performs the processing of the following (A-1-1):

(A-1-1) in a case that the random access procedure associated with the serving cell is not being performed, or the random access procedure being performed associated with the serving cell successfully completed in response to reception of the PDCCH addressed to the C-RNTI, start or restart the BWP deactivation timer associated with the Active DL BWP;

(A-2) in a case that the BWP deactivation timer associated with the Active DL BWP expires, the MAC entity performs the processing of the following (A-2-1):

(A-2-1) in a case that defaultDownlinkBWP-Id is configured, perform BWP switching for the BWP indicated by defaultDownlinkBWP-Id, otherwise, perform BWP switching for initialDownlinkBWP.

In a case that the MAC entity receives the PDCCH for BWP switching and finishes switching the Active DL BWP, the MAC entity may perform the processing of the following (A):

(A) in a case that the identifier (defaultDownlinkBWP-Id) of the default downlink BWP is configured, the switched Active DL BWP is not the BWP indicated by the identifier (dormantDownlinkBWP-Id), and the switched Active DL BWP is not the BWP indicated by dormantDownlinkBWP-Id, start or restart the BWP deactivation timer associated with the Active DL BWP.

An example of operation related to Radio Link Failure (RLF) caused by the terminal apparatus in RRC connection will be described.

The terminal apparatus acquires, from the base station apparatus serving the terminal apparatus, information such as values (t310 and t313) of timers (for example, T310 and T313) for detection of problems of the physical layer (Physical layer problems) of the serving cell, N310 and N313 being thresholds for the number of times of detection out of synchronization (out-of? sync (OoS)), and N311 and N314 being thresholds for the number of times of detection in synchronization (in? sync (IS)), through broadcast information or an RRC message specific to a user. As the thresholds for the values of the timers and the number of times, default values may be configured. The terms for the timers may be different between EUTRA and NR.

For the sake of radio link monitoring, in a case that radio link quality of a serving cell is estimated to be worse than a specific threshold (Qout) for over a specific period (for example, TEvaluate_Qout=200 ms), based on information such as received power of a received reference signal and/or received power of a synchronization signal and/or an error rate of packets, for example, a physical layer processing unit of the terminal apparatus notifies an RRC layer processing unit being an upper layer of "out of synchronization (out-of-sync)". In a case that radio link quality of a serving cell is estimated to exceed a specific threshold (Qin) for over a specific period (for example, TEvaluate_Qin=100 ms), based on information such as received power of a received reference signal and/or received power of a synchronization signal and/or an error rate of packets, for example, the physical layer processing unit notifies the RRC layer processing unit being an upper layer, of "in synchronization (in-sync)". Note that the physical layer processing unit may perform the notification of out of synchronization or in synchronization to the upper layer at specific intervals (for example, TReport_sync=10 ms) or longer.

Here, for example, the threshold Qout may be defined as a level at which a downlink radio link cannot be reliably received and a Block error rate of transmission of a hypothetical downlink control channel (PDCCH) based on a prescribed parameter is a first specific ratio. For example, the threshold Qin may be defined as a level at which downlink radio link quality can be further significantly reliably received than the state of Qout and a block error rate of transmission of a hypothetical downlink control channel based on a prescribed parameter is a second specific ratio. Multiple block error rates (levels of the threshold Qout and the threshold Qin) may be defined based on a frequency and a subcarrier spacing to be used, a type of service, or the like. The first specific ratio and/or the second specific ratio may be a prescribed value determined in a specification. The first specific ratio and/or the second specific ratio may be a value notified or broadcast from the base station apparatus to the terminal apparatus(es).

In a serving cell (for example, a PCell and/or a PSCell), the terminal apparatus may perform radio link monitoring by using a certain type of reference signal (for example, a cell specific reference signal (CRS)). The terminal apparatus may receive configuration (radio link monitoring configuration (RadioLinkMonitoringConfig)) indicating which reference signal(s) is to be used for radio link monitoring in the serving cell (for example, the PCell and/or the PSCell) from the base station apparatus, and perform radio link monitoring by using the one or multiple reference signals configured (here, referred to as RLM-RS(s)). The terminal apparatus may perform radio link monitoring by using another signal. The physical layer processing unit of the terminal apparatus may notify an upper layer of in synchronization in a case that a condition of in synchronization is satisfied in the serving cell (for example, the PCell and/or the PSCell).

The monitoring configuration: RadioLinkMonitoringConfig) may be configured for each downlink BWP. The terminal apparatus may perform radio link monitoring, based on the monitoring configuration configured for a BWP being the Active DL BWP. The terminal apparatus may perform radio link monitoring, based on the monitoring configuration configured for a prescribed BWP or a BWP indicated from the base station apparatus under a specific condition.

In the radio link monitoring configuration, information indicating the purpose of monitoring and identifier information indicating a reference signal may be included. For example, the purpose of monitoring may include a purpose of monitoring a radio link failure, a purpose of monitoring a failure of a beam, both of the above purposes, or the like. For example, in the identifier information indicating a reference signal, information indicating an identifier (SSB-Index) of a Synchronization Signal Block (SSB) of a cell may be included. Specifically, in the reference signal, a synchronization signal may be included. For example, in the identifier information indicating a reference signal, information indicating an identifier associated with a channel state information reference signal (CSI-RS) configured for the terminal apparatus may be included.

In the primary cell, in a case that the RRC layer processing unit of the terminal apparatus receives out of synchronization notified from the physical layer processing unit consecutively a prescribed number of times (N310 times), the RRC layer processing unit may start or restart a timer (T310). In a case that the RRC layer processing unit of the terminal apparatus receives in synchronization consecutively a prescribed number of times (N311 times), the RRC layer processing unit may stop the timer (T310). In a case that the timer (T310) expires, the RRC layer processing unit of the terminal apparatus may perform transition to an idle state or a re-establishment procedure of RRC connection. For example, operation of the terminal apparatus may be different according to an established state of AS Security. In a case that AS Security has not yet been established, the terminal apparatus may transition to an RRC_IDLE state, whereas in a case that AS Security has already been established, the terminal apparatus may perform a re-establishment (Re? establishment) procedure of RRC connection. In determination of starting or restarting the timer T310, a condition that none of multiple specific timers runs may be added to a condition.

In a primary secondary cell, in a case that the RRC layer processing unit of the terminal apparatus receives out of synchronization notified from the physical layer processing unit consecutively a prescribed number of times (N313 times), the RRC layer processing unit may start or restart a timer (T313). In a case that the RRC layer processing unit of the terminal apparatus receives in synchronization consecutively a prescribed number of times (N314 times), the RRC layer processing unit may stop the timer (T313). In a case that the timer (T313) expires, the RRC layer processing unit of the terminal apparatus may perform an SCG failure information procedure for notifying a network of an SCG failure.

In SpCells (a PCell in the MCG and a PSCell in the SCG), in a case that the RRC layer processing unit of the terminal apparatus receives out of synchronization notified from the physical layer processing unit consecutively a prescribed number of times (N310 times) in each SpCell, the RRC layer processing unit may start or restart the timer (T310) of the SpCell. In a case that the RRC layer processing unit of the terminal apparatus receives in synchronization consecutively a prescribed number of times (N311 times) in each SpCell, the RRC layer processing unit may stop the timer (T310) of the SpCell. In a case that the timer (T310) of each SpCell expires and the SpCell is the PCell, the RRC layer processing unit of the terminal apparatus may perform transition to an idle state or a re-establishment procedure of RRC connection. In a case that the SpCell is the PSCell, the SCG failure information procedure for notifying a network of an SCG failure may be performed.

For example, in order to detect an early physical layer problem, in a case that the RRC layer processing unit of the terminal apparatus receives early out of synchronization notified from the physical layer processing unit consecutively a prescribed number of times (N310 times), the RRC layer processing unit may start a timer (T314). In a case that the RRC layer processing unit of the terminal apparatus receives in synchronization consecutively a prescribed number of times (N311 times) while T314 runs, the RRC layer processing unit may stop the timer (T314).

In a case that the RLM-RS is not explicitly or implicitly configured from a network, the RLM-RS may be undefined. In a case that configuration of the RLM-RS is not performed for the terminal apparatus from a network (for example, the base station apparatus), the terminal apparatus may perform radio link monitoring using a reference signal suitable to a prescribed condition.

The RLM-RS is a reference signal used in radio link monitoring, and multiple RLM-RSs may be configured for the terminal apparatus. Resources of one RLM-RS may be resources (or ports) of one SS block or one CSI-RS.

Radio link monitoring using a CRS may be performed in a cell of EUTRA, and radio link monitoring using an RLM-RS may be performed in a cell of NR, but this is not restrictive.

Detection of a radio link failure based on radio link monitoring will be described.

Regarding the terminal apparatus, in the MCG, in a case that the timer T310 expires, the timer T312 expires, the terminal apparatus receives notification of a problem of random access from a MAC layer of the MCG while none of multiple specific timers runs, or the terminal apparatus receives notification that retransmission of the SRB or the DRB has reached a maximum number of times of retransmission from an RLC layer of the MCG, the terminal apparatus determines that a radio link failure has been detected in the MCG. The specific timers do not include the timer T310 and the timer T312.

Regarding the terminal apparatus, in the SCG, in a case that the timer T310 expires, the timer T312 expires in the SCG, the terminal apparatus receives notification of a problem of random access from a MAC layer of the SCG while none of multiple specific timers runs, or the terminal apparatus receives notification that retransmission of the SRB or the DRB has reached a maximum number of times of retransmission from an RLC layer of the SCG, the terminal apparatus determines that a radio link failure has been detected in the SCG. The specific timers do not include the timer T310 and the timer T312.

In a case that transmission of a random access preamble is performed in the SpCell in a case that the number of times of retransmission of the random access preamble has reached a prescribed number of times in a MAC entity, the problem of random access may be notified from the MAC entity of a cell group including the SpCell to an upper layer (here, an RRC entity).

In a case that the terminal apparatus determines that a radio link failure has been detected in the MCG, the terminal apparatus stores various pieces of information as radio link failure information. Then, in a case that security of AS is not activated, a cause of release is configured to "other", and processing of exiting RRC_CONNECTED is initiated. In a case that AS security is activated, a procedure of RRC connection re-establishment is initiated.

Regarding the terminal apparatus, in a case that the timer T313 expires, the terminal apparatus receives a notification of a problem of random access from a MAC layer of the SCG, or the terminal apparatus receives notification that retransmission has reached a maximum number of times of retransmission from an RLC layer of the SCG, the terminal apparatus determines that a radio link failure has been detected in the SCG, and initiates processing for reporting related information to the base station apparatus as an SCG radio link failure.

Next, a procedure for detection and recovery of a beam failure will be described.

In the MAC entity, a beam failure recovery procedure may be configured for each serving cell by the RRC. The beam failure is detected by counting a beam failure instance report reported from a lower layer (PHY layer) to the MAC entity. The MAC entity may perform a part or all of the processing of the following (A), (B), and (C) in each serving cell for beam failure detection:

(A) in a case that the beam failure instance report is received from a lower layer, start or restart the timer (beamFailureDetectionTimer) and increment a counter (BFI-COUNTER) by 1. In a case that a value of BFI_COUNTER is equal to or larger than a configured threshold (beamFailureInstanceMaxCount), perform the processing of the following (A-1):
   (A-1) in a case that the serving cell is the SCell, trigger a beam failure recovery (BFR) for the serving cell, otherwise, initiate the random access procedure in the SpCell.

(B) in a case that beamFailureDetectionTimer for the serving cell expires, or a configuration of beamFailureDetectionTimer, beamFailureInstanceMaxCount, and/or a reference signal for beam failure detection is changed by an upper layer, configure BFI_COUNTER to 0;

(C) in a case that the serving cell is the SpCell, and the random access procedure successfully completed, configure BFI_COUNTER to 0, stop the timer (beamFailureRecoveryTimer), and consider that the beam failure recovery procedure successfully completed. Otherwise, that is, in a case that the serving cell is the SCell, the PDCCH addressed to the C-RNTI indicating a new uplink grant for transmitting information for the beam failure recovery of the SCell (for example, information included in an SCell BFR MAC CE) is received, or the SCell is in the deactivated state, configure BFI_COUNTER to 0, consider that the beam failure recovery procedure successfully completed, and cancel all of the beam failure recoveries (BFRs) triggered for the serving cell.

In a case that at least one beam failure recovery (BFR) is triggered by the beam failure recovery procedure, and it is not cancelled, the MAC entity performs the processing of the following (A):

(A) in a case that the UL-SCH resource can include a BFR MAC CE of the SCell and its subheader with priority of logical channels being taken into consideration, include the BFR MAC CE of the SCell and its subheader. Otherwise, that is, in a case that the UL-SCH resource can include a truncated BFR MAC CE of the SCell and its subheader with priority of logical channels being taken into consideration, include the truncated BFR MAC CE of the SCell and its subheader. Otherwise, trigger a scheduling request for an SCell beam failure recovery.

Dormancy of the SCell is performed by activating the dormant BWP in the SCell. Even in a case that the SCell is in the dormant state, measurement of the CSI in the SCell, Automatic Gain Control (AGC), and beam control (beam management) including the beam failure recovery may be performed.

Next, a method of adding the PSCell and zero or more SCells of the SCG to the terminal apparatus will be described.

The addition of the PSCell and zero or more SCells of the SCG may be performed with an RRC message related to reconfiguration of RRC connection. FIG. 9 to FIG. 13 are examples of an ASN.1 notation representing fields and/or information elements related to addition of the PSCell and zero or more SCells of the SCG included in the message related to reconfiguration of RRC connection in NR.

Note that, in order to avoid complexity of description, the messages and/or the information elements in each figure may be different from actual message structures and/or information element structures and a part of structured fields and information elements may be developed, and/or fields and information elements not directly related to description may be omitted.

As illustrated in FIG. 9, in order to add the PSCell and zero or more SCells of the SCG, an RRC reconfiguration message (RRCReconfiguration message) may be used. The RRC reconfiguration message may include a part or all of pieces of information of the following (A) to (E). The RRC reconfiguration message may include other information. (A) to (E) are as follows:

(A) an identifier of an RRC transaction (rrc-TransactionIdentifier);

(B) a configuration for adding, modifying, and releasing the radio bearer (radioBearerConfig);

(C) a configuration of the secondary cell group (secondaryCellGroup);

(D) a configuration of the master cell group (masterCellGroup);

(E) RRC configuration of the secondary cell group in MR-DC (mrdc-SecondaryCellGroupConfig).

In a case that the RRC reconfiguration message is notified to the terminal apparatus on SRB3, the configuration of the SCG may be notified by the configuration of above (C) of the RRCReconfiguration message. In a case that the RRC reconfiguration message is notified to the terminal apparatus on SRB1, the configuration of the SCG may be notified using the RRC reconfiguration message generated by the secondary node, which is included in above (E) of the RRCReconfiguration message generated by the master node. In this case, the configuration of the SCG may be notified using the configuration of above (C) included in the RRC reconfiguration message generated by the secondary node. Another message may be used for the configuration of the SCG.

The configuration of the secondary cell group may be given by a cell group configuration information element (CellGroupConfigIE) As illustrated in FIG. 10, the cell group configuration information element may include a part or all of pieces of information of the following (A) to (H). The cell group configuration information element may include other information. (A) to (H) are as follows:

(A) an identifier of the cell group (cellGroupId);

(B) a configuration for adding and/or modifying the RLC bearer (rlc-BearerToAddModList);

(C) a configuration for releasing the RLC bearer (rlc-BearerToReleaseList);

(D) a configuration of the MAC of the cell group (mac-CellGroupConfig);

(E) a configuration of the PHY of the cell group (physicalCellGroupConfig);

(F) a configuration of the SpCell (spCellConfig);

(G) a configuration for adding and modifying the SCell (sCellToAddModList);

(H) a configuration for releasing the SCell (sCellToReleaseList).

The SpCell may be added and/or configured by the configuration of the SpCell of above (F), and the SCell may be added, modified, and/or released by the configurations of above (G) and (H). Those may be performed by other messages.

As illustrated in FIG. 11, the configuration of the SpCell may include a part or all of pieces of information of the following (A) to (D). The configuration of the SpCell may include other information. (A) to (D) are as follows:

(A) an index for identifying the serving cells (servCellIndex);

(B) reconfiguration with synchronization (reconfigurationWithSync);

(C) a value of a timer and information of a constant used for determination of a radio link failure (rlf-TimersAndConstants) or the like;

(D) a configuration of a parameter specific to the terminal apparatus of the SpCell (spCellConfigDedicated).

As illustrated in FIG. 12, the information element of the reconfiguration with synchronization may include a part or all of pieces of information of the following (A) to (D). The information of reconfiguration with synchronization may include other information. (A) to (D) are as follows:

(A) a configuration of a parameter specific to a cell of the SpCell (spCellConfigCommon);

(B) a new terminal identifier (UE-Identity) value (newUE-Identity);

(C) a value of a timer T304 (t304);

(D) a configuration of a parameter specific to the terminal apparatus of the RACH (rach-ConfigDedicated).

The configuration of the parameter specific to the terminal apparatus of the RACH may include a parameter (CFRA) used for contention free (Contintion free) random access. Note that, in a case that the CFRA is not included in the configuration, the terminal apparatus may perform contention based (Contition based random access in the random access procedure. The CFRA may include information of an RA Occasion used in contention free random access.

An information element (ServingCellConfig IE) indicating the configuration of the parameter specific to the terminal apparatus of the SpCell may include a part or all of pieces of information of the following (A) to (C):

(A) information (initialDownlinkBWP) of an initial downlink BWP;

(B) information (downlinkBWP-ToAddModList) of addition and modification of a downlink BWP;

(C) identifier information (firstActiveDownlinkBWP-Id) of a first active downlink BWP (First Active DL BWP).

The information of the initial downlink BWP is a configuration for a terminal apparatus-specific (UE-Specific) initial downlink BWP (BWP identifier #0). In a case that one of optional IEs is configured being included in the information of the initial downlink BWP, the terminal apparatus may consider that BWP identifier #0 is a BWP configured by RRC.

In a case that the identifier information of the first active downlink BWP is configured for the SpCell, the identifier of the first active downlink BWP is an identifier of a downlink BWP to be activated in a case of performing RRC reconfiguration (Upon performing the RRC reconfiguration) including the information. In a case that the identifier information of the first active downlink BWP is configured for the SCell, the downlink BWP indicated by the identifier information is activated in a case that the SCell is activated. In a case that the identifier information of the first active downlink BWP is configured for the SpCell, the downlink BWP of the SpCell indicated by the identifier information may be activated in a case that the SCG is activated. Similarly, in the uplink as well, identifier information of a first active uplink BWP may be configured for the terminal apparatus. The identifier information of the first active uplink BWP may be configured for the terminal apparatus, using the same information element as or a different information element from that of the identifier information of the first active downlink BWP. The BWP identifier configured using the identifier information of the first active downlink BWP and the BWP identifier configured using the identifier information of the first active uplink BWP may be the same value, or may be different values. In a case that the identifier information of the first active uplink BWP is configured for the SpCell, the uplink BWP of the SpCell indicated by the identifier information may be activated in a case that the SCG is activated. In this case, the BWP identifier configured using the identifier information of the first active downlink BWP and the BWP identifier configured using the identifier information of the first active uplink BWP may be the same value.

The configuration of the parameter specific to the cell of the SpCell may be given by an information element (ServingCellConfigCommon IE) used for configuring the parameter specific to a cell of the serving cell. As illustrated in FIG. 13, the information element used for configuring the parameter specific to the cell of the serving cell may include a part or all of pieces of information of the following (A) to (D). The information element used for configuring the parameter specific to the cell of the serving cell may include other information. (A) to (D) are as follows:

(A) a physical cell identity (physCellId);

(B) a downlink common parameter in the cell (downlinkConfigCommon);

(C) an uplink common parameter in the cell (uplinkConfigCommon);

(D) a configuration of a parameter specific to the terminal apparatus of the SCell (partially including a cell-specific parameter) (sCellConfigDedicated);

(E) SSB subcarrier spacing information (ssbSubcarrierSpacing).

The downlink common parameter in the cell may include downlink frequency information (frequencyInfoDL) and/or initial downlink BWP information (initialDownlinkBWP). The downlink frequency information may include information of a frequency of the SSB used in the serving cell.

The configuration for adding and modifying the SCell may be given by one or more SCell configuration information elements (SCellConfigIE) As illustrated in FIG. 14, the SCell configuration information element(s) may include a part or all of pieces of information of the following (A) to (D). The SCell configuration information elements may include other information. (A) to (D) are as follows:

(A) an identifier for identifying the SCell (sCellIndex);

(B) a configuration of a parameter specific to a cell of the SCell (sCellConfigCommon);

(C) a configuration of a parameter specific to the terminal apparatus of the SCell (partially including a cell-specific parameter) (sCellConfigDedicated);

(D) information for indicating activation and deactivation of the SCell (sCellState-r16).

As an example, a procedure of adding the PSCell and zero or more SCells of the SCG using the above RRC messages and information elements will be described. Note that the RRC messages and the information elements used in description are merely an example, and terms and structures in a case that the procedure is performed are not limited to these.

The RRC entity of the terminal apparatus that has received the RRCReconfiguration message may perform a part or all of the following (A) to (F). The terminal apparatus that has received the RRCReconfiguration message may perform other processing. (A) to (F) are as follows:

(A) in a case that masterCellGroup is included in RRCReconfiguration, perform processing (BD-1) for the master cell group, based on masterCellGroup;

(B) in a case that secondaryCellGroup is included in RRCReconfiguration, perform processing (BD-1) for the secondary cell group, based on secondaryCellGroup;

(C) in a case that radioBearerConfig is included in RRCReconfiguration, configure the radio bearer, based on radioBearerConfig;

(D) set contents to be included in the RRC reconfiguration complete message;

(E) in a case that reconfigurationWithSync is included in the configuration (spCellConfig) of the SpCell of the configuration of the secondary cell group received, initiate the random access procedure in the SpCell;

(F) in a case that reconfigurationWithSync is included in the configuration (spCellConfig) of the SpCell of the MCG or the SCG, and the random access procedure successfully completes in the cell group of NR, stop the timer T304 of the cell group.

Processing BD-1

The RRC entity of the terminal apparatus may perform a part or all of the following (A) to (G):

(A) in a case that CellGroupConfig includes spCellConfig including reconfigurationWithSync, the RRC entity of the terminal apparatus performs a part or all of the following (1) to (3):

(1) perform processing (BD-2);

(2) resume all of the suspended radio bearers;

(3) in a case that transmission of the SCG to all of the radio bearers is suspended, resume the transmission;

(B) in a case that rlc-BearerToReleaseList is included in CellGroupConfig, release the RLC bearer, based on rlc-BearerToReleaseList;

(C) in a case that rlc-BearerToAddModList is included in CellGroupConfig, add and/or modify the RLC bearer, based on rlc-BearerToAddModList;

(D) in a case that mac-CellGroupConfig is included in CellGroupConfig, configure the MAC entity of the cell group, based on mac-CellGroupConfig;

(E) in a case that sCellToReleaseList is included in CellGroupConfig, release the SCell, based on sCellToReleaseList;

(F) in a case that spCellConfig is included in CellGroupConfig, configure the SpCell, based on spCellConfig;

(G) in a case that sCellToAddModList is included in CellGroupConfig, add and/or modify the SCell, based on sCellToAddModList.

Processing BD-2

The RRC entity of the terminal apparatus may perform a part or all of the following (A) to ( ):

(A) in a case that AS security is not activated, perform processing for transitioning to RRC_IDLE and end the procedure;

(B) start the timer T304 for the SpCell (as a target of configuration), using a value of t304 included in reconfigurationWithSync;

(C) in a case that downlink frequency information (frequencyInfoDL) is included in reconfigurationWithSync, determine that a cell indicated by the physical cell identity (physCellId) included in reconfigurationWithSync in an SSB frequency indicated by frequencyInfoDL is a target SpCell;

(D) in a case that downlink frequency information (frequencyInfoDL) is not included in reconfigurationWithSync, determine that a cell indicated by the physical cell identity (physCellId) included in reconfigurationWithSync in an SSB frequency of a Source SpCell is a target SpCell;

(E) start downlink synchronization of the target SpCell;

(F) acquire the MIB of the target SpCell;

(G) in a case that a specific bearer (DAPS bearer) is not configured. perform a part or all of the following (1) to (4):

(1) reset the MAC entity of the cell group;

(2) in a case that the SCell not included in SCellToAddModList is configured for the cell group, bring the SCell into the deactivated state;

(3) apply the value of newUE-Identity as the C-RNTI of the cell group;

(4) configure a lower layer, based on received spCellConfigCommon.

Next, the timer T304 will be described. The timer T304 may be present for each cell group. A value (information of time at which the timer expires) of a certain timer (here, the timer T304) may be notified using the RRC message. For example, in a case that information indicating 1000 ms is notified as the value of the timer using the RRC message, it may be considered that the timer expires after the elapse of time (in the present example, 1000 ms) notified without stopping of the timer since the timer is started or restarted.

The terminal apparatus may start the timer T304 of the cell group to which the configuration of reconfiguration- WithSync is applied, based on reception of the RRC reconfiguration message including reconfigurationWithSync.

The terminal apparatus may stop the timer T304 of the cell group to which the configuration of reconfigurationWithSync is applied, based on successful completion of random access to the target SpCell indicated by reconfigurationWithSync.

The terminal apparatus may stop the timer T304 of the SCG, based on release of the SCG.

In a case that the timer T304 of the MCG expires and a specific bearer (DAPS bearer) is not configured, the terminal apparatus may perform the RRC connection reestablishment procedure.

In a case that the timer T304 of the SCG expires, the terminal apparatus may initiate an SCG failure information procedure and thereby notify the network of the failure of reconfiguration with synchronization.

Operation of the terminal apparatus in a case that the timer T304 of the SCG expires will be further described.

In a case that the timer T304 of the secondary cell group expires, the RRC entity of the terminal apparatus performs the following processing (A) in a case that MCG transmission is not suspended, and performs the following processing (B) in a case that MCG transmission is suspended:

(A) in a case that a preamble specific to the terminal apparatus provided by rach-ConfigDedicated is configured, release the preamble, and in order to report the failure of SCG reconfiguration with synchronization, initiate a procedure for SCG failure information;

(B) initiate the RRC connection reestablishment procedure.

Next, the procedure for the SCG failure information will be described. The procedure may be referred to as an SCG failure information procedure.

The procedure may be used to notify the master node of E-UTRAN or NR of the SCG failure that the terminal apparatus has experienced.

The RRC entity of the terminal apparatus may initiate the procedure in order to report the SCG failure in a case that transmission of the MCG or the SCG is not suspended, and one of the conditions of the following (A) to (D) is met:

(A) a radio link failure of the SCG has been detected;

(B) a failure of configuration with synchronization of the SCG has been detected;

(C) a failure of the configuration of the SCG has been detected;

(D) a failure of Integrity check related to SRB3 has been notified from a lower layer of the SCG.

The RRC entity of the terminal apparatus that initiates the procedure performs a part or all of the following (A) to (E):

(A) suspend SCG transmission for all of the SRBs and the DRBs;

(B) reset the SCG MAC;

(C) in a case that the timer T304 in the SCG is running, stop the timer T304;

(D) in a case that a conditional reconfiguration for PSCell change is configured, stop the evaluation;

(E) configure contents to be included in an SCG failure information (SCGFailureInformation) message, and submit the message to the lower layer for transmission.

The lower layer of the RRC of the terminal apparatus may transmit the SCG failure information (SCGFailureInformation) message to the base station apparatus.

Measurements will be described. The base station apparatus transmits a Measurement configuration information element (also referred to as a measurement configuration) to the terminal apparatus, by using an RRC reconfiguration (RRCReconfiguration) message of RRC signalling (radio resource control signal) (by including the measurement configuration in the RRC reconfiguration message). The terminal apparatus performs measurement, event evaluation, and measurement report for the serving cell and neighbor cells (including a listed cell and/or a detected cell (detectedcell)), in accordance with information included in the notified measurement configuration. The listed cell refers to a cell listed as a Measurement object (a cell notified as a neighbor cell list from the base station apparatus to the terminal apparatus). The detected cell refers to a cell that is not listed as a measurement object (Measurementobject) despite being detected by the terminal apparatus in a frequency and a subcarrier spacing indicated by the Measurement object (a cell that is not notified as a neighbor cell list and is detected by the terminal apparatus itself).

For example, (A) the measurement configuration for the MCG may be included in a first RRC reconfiguration message, an encapsulated RRC reconfiguration message of the SCG (second RRC reconfiguration message) may be included in a field indicating information related to the SCG of MR-DC included in the first RRC reconfiguration message, and the measurement configuration for the SCG may be included in the second RRC reconfiguration message. In this case, the first RRC reconfiguration message for performing notification of the measurement configuration of the MCG and the first RRC reconfiguration message for performing notification of the measurement configuration of the SCG may be the same RRC reconfiguration message, or may be different RRC reconfiguration messages notified at different timings. Alternatively, (B) the measurement configuration of the MCG may be notified on SRB1, and the measurement configuration of the SCG may be notified on SRB3.

The terminal apparatus may hold a variable VarMeasConfig for storing the notified measurement configuration. The terminal apparatus may hold a variable VarMeasReportList for storing measurement information matching a reporting condition. The terminal apparatus may be notified of the measurement configuration for each cell group. The variable VarMeasConfig for storing each measurement configuration configured for each cell group (or for the cell group, or associated with the cell group) and the variable VarMeasReportList for storing the measurement information matching the reporting condition of each measurement configuration may be held for each cell group.

The measurements include three types (intra-frequency measurements, inter-frequency measurements, and inter-radio access technology measurements (inter-RAT measurements)). The intra-frequency measurements are measurements in the same sub carrier spacing as the serving cell in a downlink frequency (downlink frequency) of the serving cell. The inter-frequency measurements are measurements in a frequency different from the downlink frequency of the serving cell or in a different subcarrier spacing in the same frequency as the downlink frequency of the serving cell. The inter-radio access technology measurements (inter-RAT measurements) are measurements in a radio technology (for example, UTRA, GERAN, CDMA2000, E-UTRA, or the like) different from the radio technology (for example, NR) of the serving cell.

The measurement configuration may include a part or all of a list of measurement identifiers (measId) to be added and/or modified, a list of measurement identifiers to be removed, a list of Measurement objects to be added and/or modified, a list of measurement objects to be removed, a list of Reporting configurations to be added and/or modified, a list of reporting configurations to be removed, a quantity configuration (quantityConfig), a measurement gap configuration (measGapConfig), and a configuration of a serving cell quality threshold (s-Measure).

Quantity Configuration (quantityConfig)

The quantity configuration (quantityConfig) indicates a third layer filtering coefficient (L3 filtering coefficient), in a case that the Measurement objects are of NR and/or E-UTRA. The third layer filtering coefficient (L3 filtering coefficient) defines a ratio between the latest measurement results and past filtering measurement results. The filtering results are used for event evaluation in the terminal apparatus.

Measurement Gap Configuration (measGapConfig)

The measurement gap configuration (measGapConfig) includes information of a length and periodicity of a measurement gap. The measurement gap configuration may be independently configured for each terminal apparatus or for each prescribed frequency range. Measurement Identifier (measId)

Here, the measurement identifier (measId) is used for associating (or linking) the Measurement objects and the Reporting configurations, and specifically links measurement object identifiers (measObjectId) and reporting configuration identifiers (reportConfigId). One measurement object identifier (measObjectId) and one reporting configuration identifier (reportConfigId) are associated with the measurement identifier (measId). The measurement configuration can be added, modified, or removed for a relationship of the measurement identifiers (measId), the Measurement objects, and the Reporting configurations.

The list of measurement identifiers to be removed included in the measurement configuration includes a list of measurement identifiers, and the terminal apparatus performs processing of the following (A) to (C) for each of the measurement identifiers included in the list of measurement identifiers to be removed: (A) remove an entry of the measurement identifier from the variable VarMeasConfig of the cell group as a measurement configuration object; (B) in a case of being included, remove an entry of the measurement report for the measurement identifier from the variable VarMeasReportList of the cell group as a measurement configuration object; (C) stop a timer used for a periodic report for the measurement identifier or a timer T321 in a case that the timer has been started, and reset related information for the measurement identifier. Note that the timer T321 is a timer started in a case that a measurement configuration including a reporting configuration for a purpose of measurement of a cell global identity is received. The timer is stopped in a case that an identifier of the reporting configuration for a purpose of measurement of the cell global identity is included in the list of reporting configurations to be removed to be described below, a case that a detected cell does not broadcast SIB1, or the like.

The list of measurement identifiers to be added and/or modified included in the measurement configuration includes a list of measurement identifiers, and the terminal apparatus performs processing of the following (A) to (C) for each of the measurement identifiers included in the list of measurement identifiers to be added and/or modified: (A) in a case that an entry of a measurement identifier matching the measurement identifier is present in the list of measurement identifiers included in the variable VarMeasConfig of the cell group as a measurement configuration object, replace the entry with a value received for the measurement identifier (the value received for this measId). Otherwise, add the new entry for the measurement identifier to the variable VarMeasConfig of the cell group as a measurement configuration object; (B) in a case of being included, remove a measurement report entry for the measurement identifier from the variable VarMeasReportList of the cell group as a measurement configuration object; (C) stop a timer used for a periodic report for the measurement identifier or a timer T321 in a case that the timer has been started, and reset related information for the measurement identifier.

The list of measurement objects to be removed (measObjectToRemoveList) included in the measurement configuration is a field including information for removing an indicated measurement object identifier (measObjectId) and the Measurement objects corresponding to the indicated measurement object identifier (measObjectId). In this case, all of the measurement identifiers (measId) of the cell group as a measurement configuration object associated with the indicated measurement object identifier (measObjectId) may be removed. The field can simultaneously indicate multiple measurement object identifiers (measObjectId).

The list of measurement objects to be added and/or modified (measObjectToAddModList) included in the measurement configuration is a field including information for modifying the Measurement objects indicated by the measurement object identifiers (measObjectId) or adding the Measurement objects indicated by the measurement object identifiers (measObjectId). The field can simultaneously indicate multiple measurement object identifiers (measObjectId).

The list of reporting configurations to be removed (reportConfigToRemoveList) included in the measurement configuration is a field including information for removing an indicated reporting configuration identifier (reportConfigId) and Reporting configurations corresponding to the indicated reporting configuration identifier (reportConfigId). In this case, all of the measurement identifiers (measId) associated with the indicated reporting configuration identifier (reportConfigId) are removed. The command can simultaneously indicate multiple reporting configuration identifiers (reportConfigId).

The list of reporting configurations to be added and/or modified (reportConfigToAddModList) is a field including information for modifying the Reporting configurations indicated by the reporting configuration identifier (reportConfigId) or adding the Reporting configurations indicated by the reporting configuration identifier (reportConfigId). The field can simultaneously indicate multiple reporting configuration identifiers (reportConfigId).

The list of measurement identifiers to be removed (measIdToRemoveList) is a command for removing the indicated measurement identifier (measId). In this case, the measurement object identifier (measObjectId) and the reporting configuration identifier (reportConfigId) associated with the indicated measurement identifier (measId) are maintained without being removed. The command can simultaneously indicate multiple measurement identifiers (measId).

The list of measurement identifiers to be added and/or modified (measIdToAddModifyList) is a command for modifying the indicated measurement identifier (measId) to be associated with the indicated measurement object identifier (measObjectId) and the indicated reporting configuration identifier (reportConfigId), or associating the indicated measurement object identifier (measObjectId) and the indicated reporting configuration identifier (reportConfigId) with the indicated measurement identifier (measId) and adding the indicated measurement identifier (measId). The command can simultaneously indicate multiple measurement identifiers (measId).

Measurement Objects

The Measurement objects are configured (defined) for each RAT and frequency. Note that, in a case that the RAT is NR, the measurement objects may be configured for each frequency and subcarrier spacing. The Reporting configurations may include a definition for NR and a definition for a RAT other than NR.

The Measurement objects may include measurement object NR (measObjectNR) in which the measurement object associated with the measurement object identifier (measObjectId) is NR, and measurement object EUTRA (measObjectEUTRA) in which the measurement object is E-UTRA. The measurement objects may include a part or all of measurement object UTRA (measObjectUTRA) in which the measurement object is of UTRA, measurement object GERAN (measObjectGERAN) in which the measurement object is of GERAN, measurement object CDMA2000 (measObjectCDMA2000) in which the measurement object is of CDMA2000, and measurement object WLAN (measObjectWLAN) in which the measurement object is of WLAN.

The measurement object identifier (measObjectId) is an identifier used for identifying a configuration of the Measurement objects. As described above, the configuration of the Measurement objects is defined for each radio access technology (RAT) and frequency, and further, in NR, for each subcarrier spacing. Separate specifications of the Measurement objects may be present for E-UTRA, UTRA, GERAN, and CDMA2000. The measurement object NR (measObjectNR) being the Measurement objects for NR defines information applied to the serving cell and neighbor cells of NR. Note that a correspondence between a measurement object of a measurement object identifier and a serving cell may be indicated by an information element (for example, a serving cell configuration) included in an RRC message including the measurement configuration and/or an RRC message not including the measurement configuration.

The measurement object NR (measObjectNR) may include a part or all of frequency information (ssbFrequency) of a block (SSB) including a synchronization signal, an SSB subcarrier spacing (ssbSubcarrierSpacing), information related to a list of cells as the measurement objects, information related to a black list to be removed from the measurements, and information related to a white list on which the measurements are performed.

The information related to the list of cells as the measurement objects includes information related to a cell as an object for event evaluation and measurement report. The information related to the list of cells as the measurement objects includes a physical cell identity (physical cell ID), a cell-specific offset (cellIndividualOffset, indicating a measurement offset value to be applied to a neighbor cell), and the like.

Reporting Configurations

The Reporting configurations include reporting configuration NR (reportConfigNR) associated with the reporting configuration identifier (reportConfigId) and the like.

The reporting configuration identifier (reportConfigId) is an identifier used for identifying the Reporting configurations related to measurement. As described above, the Reporting configurations related to the measurement may include a definition for NR and a definition for a RAT (a part or all of UTRA, GERAN, CDMA2000, and E-UTRA) other than NR. The reporting configuration NR (reportConfigNR) being the Reporting configurations for NR defines triggering conditions (triggering criteria) of an event used for reporting the measurement in NR.

The reporting configuration NR (reportConfigNR) may include a part or all of an event identifier (eventId), trigger quantity (triggerQuantity), hysteresis, trigger time (timeToTrigger), report quantity (reportQuantity), a maximum number of report cells (maxReportCells), a report interval (reportInterval), and the number of times of reporting (reportAmount).

Next, the reporting configuration NR (reportConfigNR) will be described. The event identifier (eventId) is used for selecting conditions (criteria) related to event triggered reporting. Here, the event triggered reporting refers to a method of reporting the measurement in a case that event triggering conditions are satisfied. In addition, the event triggered reporting also includes event triggered periodic reporting in which the measurement is reported a certain number of times at certain intervals, in a case that the event triggering conditions are satisfied.

In a case that the event triggering conditions indicated by the event identifier (eventId) are satisfied, the terminal apparatus performs measurement report for the base station apparatus. The trigger quantity (triggerQuantity) is quantity used for evaluating the event triggering conditions. In other words, reference signal received power (RSRP) or reference signal received quality (RSRQ) is indicated. In other words, the terminal apparatus performs measurement of a downlink synchronization signal by using the quantity indicated by the trigger quantity (triggerQuantity), and determines whether or not the event triggering conditions indicated by the event identifier (eventId) are satisfied. The hysteresis is a parameter used in the event triggering conditions. The trigger time (timeToTrigger) indicates a period in which the event triggering conditions are to be satisfied. The report quantity (reportQuantity) indicates quantity to be reported in the measurement report. Here, the quantity indicated by the trigger quantity (triggerQuantity), or the reference signal received power (RSRP) or the reference signal received quality (RSRQ) is indicated. The maximum number of report cells (maxReportCells) indicates a maximum number of cells to be included in the measurement report. The report interval (reportInterval) is used for periodical reporting or event triggered periodic reporting, and periodical reporting is performed once every interval indicated by the report interval (reportInterval). The number of times of reporting (reportAmount) defines the number of times the periodical reporting is performed as necessary.

Note that threshold parameters and offset parameters (a1_Threshold, a2_Threshold, a3_Offset, a4_Threshold, a5_Threshold1, a5_Threshold2, a6_Offset, c1_Threshold, c2_Offset) used in the event triggering conditions may be notified to the terminal apparatus together with the event identifier (eventId) in the reporting configuration NR (reportConfigNR).

Event Triggering Conditions

Multiple event triggering conditions for performing the measurement report are defined, each of which includes an entering condition and a leaving condition. In other words, the terminal apparatus that satisfies the entering condition for an event indicated by the base station apparatus transmits a measurement report to the base station apparatus. The terminal apparatus that satisfies the leaving condition for an event indicated from the base station apparatus transmits a measurement report to the base station apparatus in a case that the terminal apparatus is configured to trigger a report in a case that the terminal apparatus satisfies the leaving condition from the base station apparatus (in a case that reportOnLeave is included in the reporting configuration).

In reporting configurations InterRAT (reportConfigInterRAT) being the Reporting configurations for a RAT other than NR, multiple triggering conditions (triggering criteria) for an event used for reporting the measurement in a RAT other than NR are defined. For example, in a case that the measurement results of a neighbor cell (another RAT) are more satisfactory than a threshold b1_Threshold configured for each RAT after application of each parameter, an event B1 is caused. In a case that the measurement results of the PCell are poorer than a threshold b2_Threshold1 after application of each parameter, and the measurement results of a neighbor cell (another RAT) are more satisfactory than a threshold b2_Threshold2 configured for each RAT after application of each parameter, an event B2 is caused.

Note that the base station apparatus may or may not perform notification of the serving cell quality threshold (s-Measure). In a case that the serving cell quality threshold (s-Measure) is configured for the terminal apparatus by the base station apparatus, and quality (RSRP value) after layer 3 filtering of the PCell being the serving cell is lower than the serving cell quality threshold (s-Measure), measurement of the neighbor cell of the frequency and the RAT indicated by the measurement object is performed. In contrast, in a case that the serving cell quality threshold (s-Measure) is not configured for the terminal apparatus by the base station apparatus, the terminal apparatus performs measurement of the neighbor cell, regardless of the quality (RSRP value) of the serving cell.

Measurement Results

The terminal apparatus may initiate a measurement report procedure in a case that the event triggering conditions are satisfied, in a case that first measurement results of the periodic report become Available, in a case that the timer for the periodic report or the timer T321 expires, or the like. The purpose of the measurement report procedure is to transfer the Measurement report to the network from the terminal apparatus. The measurement report includes Measurement results. The measurement results are configured for each of the measurement identifiers with which the measurement report procedure is triggered.

The measurement results may include the measurement identifier (measId), a list of serving measurement object measurement results (measResultServingMO), and neighbor cell measurement results (measResultNeighCellNR). The neighbor cell measurement results may include one of a list of measurement results of NR and a list of measurement results of E-UTRA. The measurement results of NR and the measurement results of E-UTRA include a part or all of the physical cell identity, measurement results of a cell, and information of the cell global identity. The serving measurement object measurement results (measResultServingMO) are measurement results of the measurement object associated with the serving cell, and may include a part or all of an identifier of the serving cell, measurement results of the serving cell, and the best measurement result in neighbor cells.

In the measurement report procedure, the measurement results as described above are set for each of the measurement identifiers with which the measurement report procedure is triggered. In a case that the terminal apparatus is configured with EN-DC, in a case that SRB3 is configured, the terminal apparatus submits a message of the measurement report including the measurement results to a lower layer via SRB3 for transmission to end the procedure, whereas in a case that SRB3 is not configured, the terminal apparatus encapsulates (embeds) the message of the measurement report in an RRC message of E-UTRA and submits the RRC message to a lower layer via the MCG of E-UTRA. In a case that the terminal apparatus is configured with NR-DC, and the measurement configuration that has triggered the measurement report is associated with the SCG, in a case that SRB3 is configured, the terminal apparatus submits a message of the measurement report including the measurement results to a lower layer via SRB3 for transmission to end the procedure, whereas in a case that SRB3 is not configured, the terminal apparatus encapsulates (embeds) the message of the measurement report in an RRC message of the MCG of NR and submits the RRC message to a lower layer via the MCG of NR.

A Conditional Handover (CHO) will be described. The conditional handover may be the conditional handover described in NPL 1 and the like. The terminal apparatus may receive an RRC message including a parameter of a conditional handover configuration from the base station apparatus, and the configuration of the conditional handover may be thereby performed. The parameter of the conditional handover configuration may include a configuration parameter of a target candidate SpCell and a performing condition parameter for performing a handover after applying the configuration to the target candidate SpCell. The conditional handover may be a handover for performing a handover procedure by the terminal apparatus in a case that one or multiple performing conditions are satisfied. Note that the conditional handover may be referred to as a Conditional Reconfiguration. The conditional handover may be referred to as a handover. Note that an RRC message including a conditional handover configuration information element may be a message related to a reconfiguration of RRC connection or an RRC reconfiguration message.

FIG. 18 is an example of an ASN.1 notation representing fields and/or information elements related to a configuration of a conditional handover. An information element represented by ConditionalReconfiguration in FIG. 18 may be an information element indicating a target candidate SpCell in the conditional handover and a configuration of a conditional handover performing condition. The information element represented by ConditionalReconfiguration may be referred to as a conditional handover configuration information element or a conditional handover configuration. The conditional handover configuration information element may also be used for conditional PSCell modification. In other words, in a case that ConditionalReconfiguration is configured for the SCG, the information element represented by ConditionalReconfiguration may be referred to as a conditional PSCell modification configuration information element or a conditional PSCell modification configuration.

In FIG. 18, regarding a field represented by attemptCondReconfig included in the conditional handover configuration information element, in a case that the field is present, and a cell selected first after a handover failure is one candidate SpCell included in the conditional handover configuration information element, this may be a configuration indicating performing the conditional reconfiguration for the candidate SpCell. The field represented by attemptCondReconfig may be referred to as an attempt conditional reconfiguration field or an attempt conditional reconfiguration.

In FIG. 18, an information element represented by CondReconfigToRemoveList included in the conditional handover configuration information element and the conditional PSCell modification configuration information element may be a list of candidate SpCells to be removed. The information element represented by CondReconfigToRemoveList may be referred to as a to-be-removed conditional reconfiguration list information element or a to-be-removed conditional reconfiguration list. The to-be-removed conditional reconfiguration list information element may be a list of information elements represented by CondReconfigId to be described later.

In FIG. 18, an information element represented by CondReconfigToAddModList included in the conditional handover configuration information element and the conditional PSCell modification configuration information element may be a list of configurations of the candidate SpCell to be added or modified. The information element represented by CondReconfigToAddModList may be referred to as a conditional reconfiguration list information element or a conditional reconfiguration list. The conditional reconfiguration list information element may be a list of information elements represented by CondReconfigToAddMod. The information element represented by CondReconfigToAddMod may be referred to as a conditional reconfiguration information element or a conditional reconfiguration.

In FIG. 18, a field represented by condReconfigId included in the conditional reconfiguration information element may be an identifier for identifying a configuration of the conditional handover or the conditional PSCell modification. The field represented by condReconfigId may be referred to as a conditional reconfiguration identifier field or a conditional reconfiguration identifier.

In FIG. 18, a field represented by condExecutionCond included in the conditional reconfiguration information element and the conditional PSCell modification configuration information element may be a performing condition that needs to be satisfied in order to trigger performing of the conditional reconfiguration. The field represented by condExecutionCond may be referred to as a conditional reconfiguration performing condition field or a conditional reconfiguration performing condition. The reconfiguration performing condition field may include one or multiple identifiers (measurement identifiers) for identify measurement configuration(s). In other words, in a case that the reporting condition of the measurement indicated by the measurement identifier included in the reconfiguration performing condition field is satisfied, performing of the conditional reconfiguration may be triggered.

In FIG. 18, an information element represented by condRRCReconfig included in the conditional reconfiguration information element may be an RRC reconfiguration message applied in a case that the conditional reconfiguration performing condition indicated in the conditional reconfiguration performing condition field is satisfied. In other words, the information element represented by condRRCReconfig may include a part or all of information elements and/or fields included in the RRC reconfiguration message. The information element represented by condRRCReconfig may be referred to as a conditional reconfiguration information element or a conditional reconfiguration. Inclusion of the conditional reconfiguration information element in the information elements and/or the fields of the RRC reconfiguration message included in the conditional reconfiguration information element may be prohibited.

The conditional reconfiguration information element may include a part or all of the configurations of the following (A) to (F), for example:

(A) a cell group configuration (which may be an information element represented by a name of CellGroupConfig);

(B) information indicating whether or not it is a full configuration (which may be a field represented by fullConfig);

(C) a message of a NAS layer (which may be an information element represented by a name of Dedicated-NAS-message);

(D) a key update configuration (which may be an information element represented by a name of MasterKeyUpdate);

(E) a measurement configuration (which may be an information element represented by a name of MeasConfig);

(F) a radio bearer configuration.

The configuration information of the cell group may include a part or all of the configurations of the following (1) to (6), for example:

(1) an identifier of the cell group (which may be an information element represented by a name of CellGroupId);

(2) an RLC bearer configuration (which may be an information element represented by a name of RLC-BearerConfig);

(3) a MAC layer configuration of the cell group (which may be an information element represented by a name of MAC-CellGroupConfig);

(4) a physical (PHY) layer configuration of the cell group (which may be an information element represented by a name of PhysicalCellGroupConfig);

(5) an SpCell configuration (which may be an information element represented by a name of SpCellConfig);

(6) information of the SCell (which may be an information element represented by a name of SCellConfig).

Note that the SpCell configuration of (5) may include a reconfiguration information element with synchronization. The reconfiguration information element with synchronization included in the SpCell configuration of (5) may include a physical cell identity of the target candidate SpCell (which may be an information element represented by a name of PhysCellId).

The configuration of the radio bearer may include a part or all of the configurations of the following (1) to (3):

(1) an SRB configuration;

(2) a DRB configuration;

(3) a security configuration (which may be an information element represented by a name of SecurityConfig).

Note that the security configuration of (3) may include information related to an algorithm of integrity protection and an algorithm of ciphering for the SRB and/or the DRB (which may be an information element represented by a name of SecurityAlgorithmConfig), and/or information indicating which key is to be used among a key for the MCG and a key for the SCG (which may be a field represented by a name of keyToUse).

Note that the candidate SpCell may be referred to as a target candidate SpCell. The SpCell may be referred to as a Cell, a PCell, or a PSCell.

Figure 19:
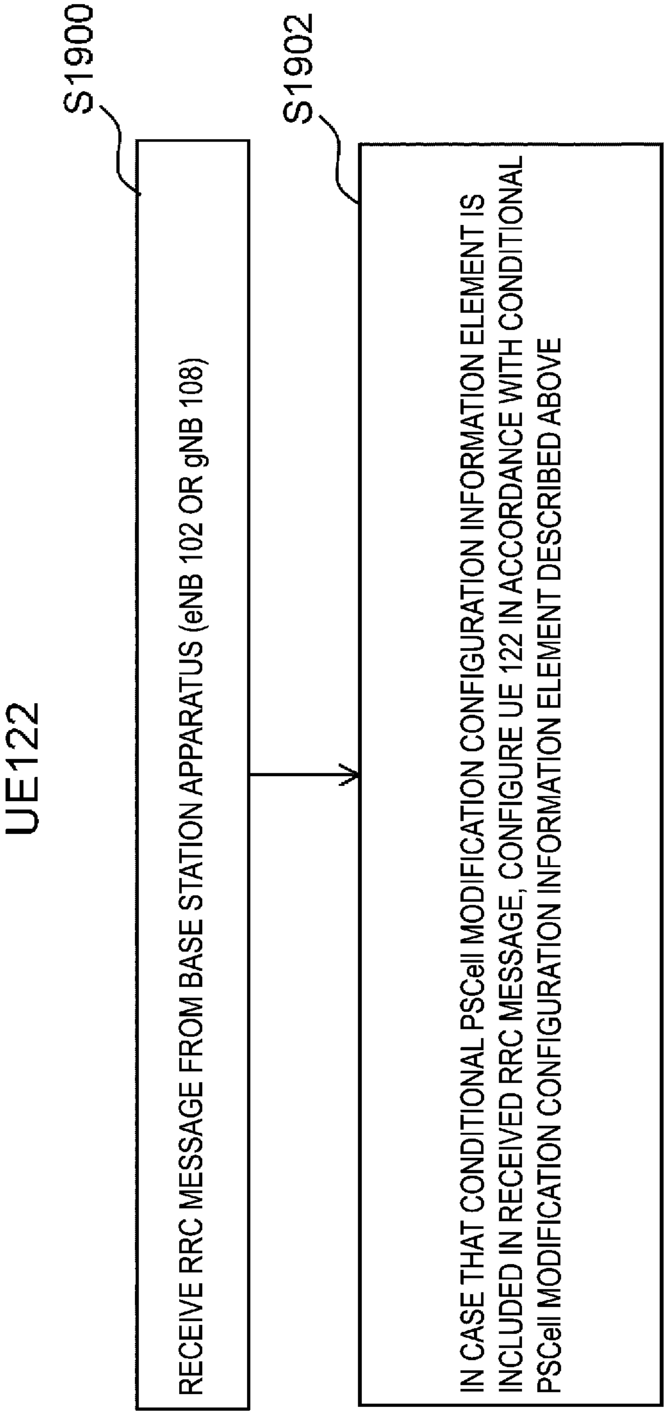
FIG. 19 is a diagram illustrating an example of processing of the terminal apparatus according to an embodiment of the present invention.

With reference to FIG. 19, an example of processing of the terminal apparatus according to an embodiment of the present invention will be described. Here, although a PSCell modification procedure will be described, the procedure may be applied to PCell modification (in other words, a handover) as well.

The receiver 500 of the UE 122 may receive an RRC message from the base station apparatus. The processing unit 502 of the UE 122 may perform a configuration for the UE 122 in accordance with the RRC message received from the base station apparatus. (Step S1900)

An example of initiation of the PSCell modification procedure in Step S1902 will be described. In Step S1900, for example, in a case that a first reconfiguration information element with synchronization is included in the RRC message received from the base station apparatus, and the first reconfiguration information element with synchronization is not an information element included in the conditional PSCell modification configuration information element, the processing unit 502 of the UE 122 may apply the first reconfiguration information element with synchronization, and initiate the PSCell modification procedure for a first SpCell in accordance with the first reconfiguration information element with synchronization. A case that the first reconfiguration information element with synchronization is included in the RRC message received from the base station apparatus, and the first reconfiguration information element with synchronization is not an information element included in the conditional PSCell modification configuration information element may be a case of non-conditional PSCell modification or normal PSCell modification. Note that, in a case that the first reconfiguration information element with synchronization is not included in the RRC message received from the base station apparatus, the PSCell modification procedure for the first SpCell need not be initiated. (Step S1902)

In Step S1900, for example, in a case that the conditional PSCell modification configuration information element is included in the RRC message received from the base station apparatus, the processing unit 502 of the UE 122 may perform a configuration for the UE 122 in accordance with the conditional PSCell modification configuration information element. Here, the PSCell modification configuration information element may include the conditional reconfiguration list information element. The conditional reconfiguration list information element may include first to N-th conditional reconfiguration information elements (note that N is a positive integer). In a case of satisfaction of an m-th conditional reconfiguration performing condition included in an m-th conditional reconfiguration information element configured for the UE 122 at a certain time point, the processing unit 502 of the UE 122 may perform processing including the following (A). Here, m may be an integer larger than or equal to 1, and an integer smaller than or equal to N. (A) is as follows:

(A) the m-th conditional reconfiguration information element included in the m-th conditional reconfiguration information element may be applied, and the PSCell modification procedure may be initiated for an m-th SpCell in accordance with an m-th reconfiguration information element with synchronization included in the m-th conditional reconfiguration information element.

Note that the PSCell modification for the m-th SpCell may be referred to as the conditional PSCell modification for the m-th SpCell. In a case that the m-th conditional reconfiguration performing condition is not satisfied, the processing unit 502 of the UE 122 need not perform processing of (A) above. (Step S1902)

Next, an example of Activation and Deactivation of the SCG will be described.

In LTE and/or NR, a state (SCG deactivated state) in which the SCG is deactivated may be included as a part of the RRC_CONNECTED state.

In LTE and/or NR, the state (SCG deactivated state) in which the SCG is deactivated may be a state in which the terminal apparatus performs a part or all of the following (A) to (J) in the SpCell (PSCell) of the SCG and/or all of the cells of the SCG:

(A) not transmit the SRS in the cell;

(B) not report CSI for the cell. And/or not report the CSI in the cell;

(C) not transmit the PUCCH, the UL-SCH, and/or the RACH in the cell;

(D) not monitor the PDCCH of the cell and/or the PDCCH for the cell;

(E) not monitor the PDCCH of the cell and/or the PDCCH for the cell addressed to the C-RNTI, the MCS-C-RNTI, and/or the CS-RNTI indicating an uplink grant for UL-SCH transmission in the cell;

(F) not perform Automatic Gain Control (AGC) in the cell;

(G) not perform beam control (beam management) including beam failure recovery in the cell;

(H) not perform Radio Link Monitoring (RLM) in the cell;

(I) change the BWP configured to be the dormant BWP to the activated BWP (Active BWP) in the cell;

(J) not monitor the C-RNTI on the PDCCH in the activated dormant BWP of the cell.

In the SCG deactivated state, different processing may be performed between a case in which the time alignment timer runs in the SCG and a case in which the time alignment timer is stopped (including a state in which the time alignment timer has expired). For example, in a case that the time alignment timer runs in the SCG deactivated state, the CSI may be reported in the SpCell of the SCG, whereas in a case that the time alignment timer is stopped in the SCG deactivated state, the CSI may be arranged not to be reported in the SpCell of the SCG. For example, in a case that the time alignment timer runs in the SCG deactivated state, RLM may be performed in the SpCell of the SCG, whereas in a case that the time alignment timer is stopped in the SCG deactivated state, RLM may be arranged not to be performed in the SpCell of the SCG. In the SCG deactivated state, the terminal apparatus may be arranged not to perform processing involving initiation of the random access procedure. The timer may be another timer started in a case that deactivation of the SCG is indicated or in a case that the SCG is deactivated, for example. The timer may be a timer managed by the MAC entity.

To enter the SCG deactivated state may be referred to as entering the deactivated SCG. The SCG deactivated state may be a state in which the Active BWP of all of the cells of the SCG is the dormant BWP. The SCG deactivated state may be a state in which the SCG to be described later transitions from the activated state (SCG activated state) in a case that entering the deactivated SCG is indicated from the RRC entity.

In LTE and/or NR, a state (SCG activated state) in which the SCG is activated may be included as a part of the RRC_CONNECTED state.

In LTE and/or NR, the state (SCG activated state) in which the SCG is activated may be a state in which the terminal apparatus performs a part or all of the following (A) to (J) in the SpCell (PSCell) of the SCG and/or any one of the cells of the SCG:

(A) transmit the SRS in the cell;

(B) report CSI for the cell;

(C) transmit the PUCCH, the UL-SCH, and/or the RACH in the cell;

(D) monitor the PDCCH of the cell and/or the PDCCH for the cell;

(E) monitor the PDCCH of the cell and/or the PDCCH for the cell addressed to the C-RNTI, the MCS-C-RNTI, and/or the CS-RNTI indicating an uplink grant for UL-SCH transmission in the cell;
(F) perform Automatic Gain Control (AGC) in the cell;
(G) perform beam control (beam management) including beam failure recovery in the cell;
(H) perform Radio Link Monitoring (RLM) in the cell;
(I) not change the BWP configured to be the dormant BWP to the activated BWP (Active BWP) in the cell;
(J) monitor the C-RNTI on the PDCCH in the activated BWP of the cell.

To enter the SCG activated state may be referred to as entering the activated SCG. The SCG activated state may be a state in which the Active BWP of the SpCell and/or one or more SCells of the SCG are not the dormant BWP. The SCG deactivated state may be a state in which the SCG transitions from the deactivated state (SCG deactivated state) in a case that leaving the deactivated SCG is indicated from the RRC entity.

In LTE and/or NR, the terminal apparatus may transition the SCG to the deactivated state (in other words, may deactivate the SCG), based on reception of a part or all of the following (A) to (B). Note that the messages and the control elements in the following (A) to (C) may be reported from a cell group other than the SCG to the terminal apparatus. Each piece of information may be notified to the terminal apparatus on an RRC message, a MAC control element, or a physical control channel. (A) to (C) are as follows:

(A) information for indicating deactivation of the SCG;
(B) information for indicating deactivation of the SpCell;
(C) information indicating switching of the Active BWP of the SpCell to a specific BWP.

The terminal apparatus may transition the SCG from the activated state to the deactivated state, based on a timer related to deactivation of the SCG. The terminal apparatus may transition the SCG from the activated state to the deactivated state, based on a timer related to deactivation of the PSCell.

In a case that the terminal apparatus initiates the random access procedure due to a scheduling request (i.e., initiated by the MAC entity itself), the terminal apparatus may transition the SCG from the deactivated state to the activated state. The MAC entity of the terminal apparatus may acquire, from the RRC entity of the terminal apparatus, an indication for activating the SCG, an indication of resumption from the deactivated SCG, an indication of resumption from the dormant state of the SpCell, and/or other information.

In LTE and/or NR, the terminal apparatus may transition the SCG from the deactivated state to the activated state (in other words, may activate the SCG), based on reception of a part or all of the following (A) to (D). Note that the messages and the control elements in the following (A) to (D) may be reported from a cell group other than the SCG to the terminal apparatus. Each piece of information may be notified to the terminal apparatus on an RRC message, a MAC control element, or a physical control channel. (A) to (D) are as follows:

(A) information for indicating activation of the SCG;
(B) information for indicating resumption (Resume) from the deactivated state of the SCG;
(C) information for indicating activation of the SpCell;
(D) information for indicating resumption from the deactivated state of the SpCell.

The terminal apparatus may transition the SCG from the deactivated state to the activated state, based on a timer related to deactivation of the SCG. The terminal apparatus may transition the SCG from the deactivated state to the activated state, based on a timer related to deactivation of the PSCell.

In a case that the terminal apparatus initiates the random access procedure due to a scheduling request triggered for transmitting the MAC PDU including the MAC SDU, the terminal apparatus may transition the SCG from the deactivated state to the activated state. In a case that the terminal apparatus initiates the random access procedure, the terminal apparatus may transition the SCG from the deactivated state to the activated state.

In a case that the terminal apparatus initiates the random access procedure due to a scheduling request (i.e., initiated by the MAC entity itself), the terminal apparatus may transition the SCG from the deactivated state to the activated state. The MAC entity of the terminal apparatus may acquire, from the RRC entity of the terminal apparatus, an indication for activating the SCG, an indication of resumption from the deactivated SCG, an indication of resumption from the dormant state of the SpCell, and/or other information.

The deactivation of the SCG may be referred to as entering to a Dormant SCG. The deactivation of the SCG may be activation of the dormant BWP of the SpCell of the cell group. The deactivation of the SCG may be referred to as dormancy (Dormant) of the SCG or suspension of the SCG (SCG suspention).

In a case that the SCG is in the deactivated state, and at least the time alignment timer is stopped, all of uplink transmissions may be stopped in the SCG. In this case, information related to the SCG may be transmitted in another cell group (for example, the MCG). Alternatively, the information related to the SCG may be transmitted in the SCG (activated SCG) that has left the deactivated state.

The random access procedure in the SpCell (PSCell) may be initiated in the deactivated SCG by the trigger of the scheduling request for transmitting the MAC PDU including the MAC CE from the MAC entity, or by the MAC entity directly. In this case, the MAC PDU may not include the MAC SDU.

Meanwhile, the random access procedure in the SpCell (PSCell) may be initiated in the deactivated SCG by the trigger of the scheduling request for transmitting the MAC PDU including data (MAC SDU) from an upper layer, such as user data and an RRC message.

The resumption from the deactivated state of the SCG (activation of the SCG) may be referred to as leaving from the dormant SCG. The resumption from the deactivated state of the SCG may be performing BWP switching from the dormant BWP to another BWP (not the dormant BWP) in the SpCell of the cell group.

The resumption from the deactivated state of the SCG may be referred to as activation of the SCG (SCG Activation).

The terminal apparatus that performs the deactivation of the SCG may perform a part or all of the processing of the following (A) to (I) in the SCG:

(A) cause all of the SCells to be in the deactivated state;
(B) consider that all of the SCell deactivation timers associated with the SCells in the activated state have expired;
(C) consider that all of the SCell deactivation timers associated with the SCells in the dormant state have expired;
(D) not start or restart any of the SCell deactivation timers associated with the SCells;

(E) ignore the MAC CE for activating the SCells. For example, perform processing (AD-1) in a case that the MAC CE for activating the SCells is received and the deactivation of the SCG is not indicated (or the SCG is not in the deactivated state) in the processing (AD);
(F) perform the processing (AD-2). For example, perform the processing (AD-2) in a case that the deactivation of the SCG is indicated (or the SCG has entered the deactivated state) in the processing (AD);
(G) switch the Active BWP of a specific SCell to the Dormant BWP (in other words, switch the SCell to the dormant state). The specific SCell may refer to the SCell indicated from the base station apparatus, or may be the SCell in which the Dormant BWP is configured;
(H) switch the Active BWP of the SpCell to a specific BWP. The specific BWP may refer to the BWP indicated from the base station apparatus, may be the BWP configured as a First Active BWP, or may be an Initial BWP. The BWP to be switched may be only the DL BWP, or may be both of the DLBWP and the UL BWP;
(I) deactivate all of the BWPs of the SpCell. In other words, perform, on the SpCell, similar processing for deactivating all of the BWPs of the SCell in a case that the SCell is deactivated.

The terminal apparatus that performs the resumption from the deactivated state of the SCG may perform a part or all of the processing of the following (A) to (F) in the SCG:
(A) perform processing (AD-1) to cause all of the SCells to be in the activated state;
(B) cause all of the SCells to remain in the deactivated state. Note that, because it is not the deactivated state, for example, in a case that the MAC CE for activating the SCells is received in the processing (AD), the deactivation of the SCG is not indicated (or the SCG is not in the deactivated state), and thus processing (AD-1) may be performed;
(C) in a case that the resumption from the deactivated state of the SCG is performed based on an RRC message and the RRC message includes a parameter related to random access to a part or all of the SCells, initiate the random access procedure in target SCell(s) based on the reported parameter.
(D) in a case that the resumption from the deactivated state of the SCG is performed based on an RRC message, and information for indicating the state of the SCell is included in the RRC message, determine whether to cause the state of the each SCell to be in the activated state or in the deactivated state, based on the information;
(E) switch the Active BWP of the SpCell to a specific BWP. The specific BWP may refer to the BWP indicated from the base station apparatus, or may be the BWP configured as the First Active BWP;
(F) activate the BWP configured as the First Active BWP of the SpCell.

Based on the description in the above, various embodiments of the present invention will be described. Note that the processing described above may be applied to corresponding processing not described in the following description.

Figure 5:
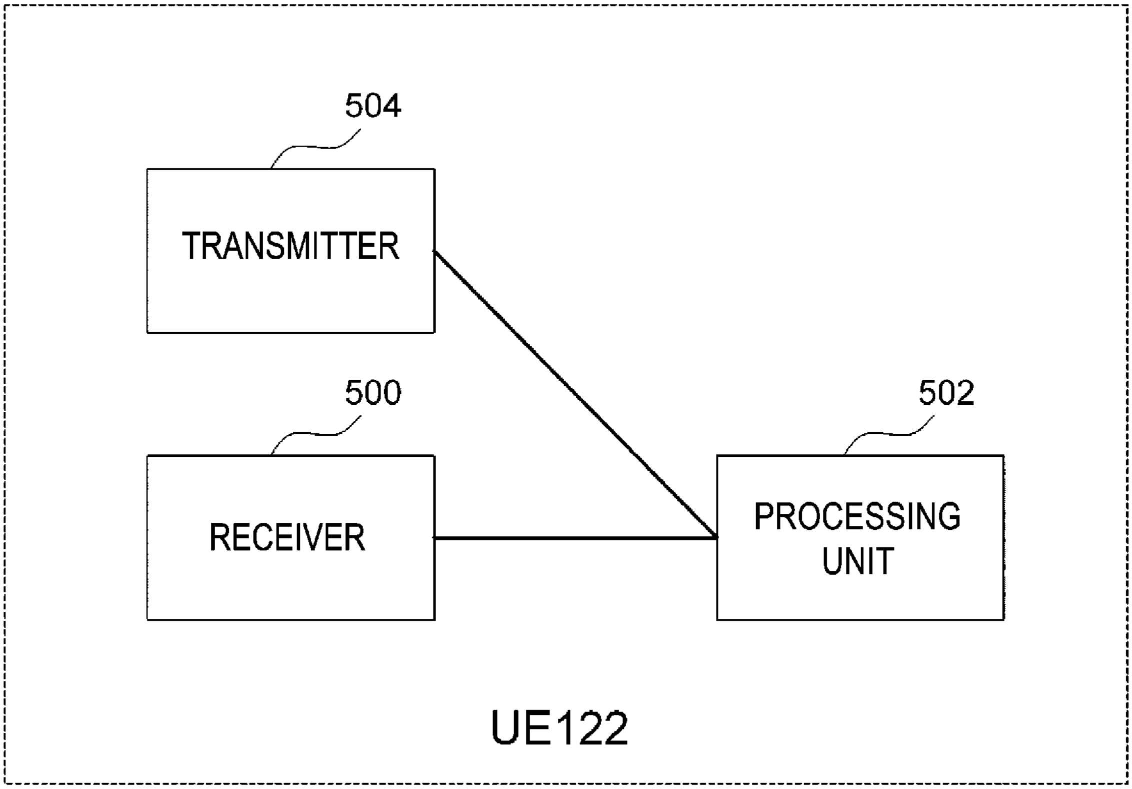
FIG. 5 is a block diagram illustrating a configuration of a terminal apparatus according to an embodiment of the present invention.

FIG. 5 is a block diagram illustrating a configuration of the terminal apparatus (UE 122) according to an embodiment of the present invention. Note that FIG. 5 illustrates only the main components closely related to an aspect of the present invention in order to avoid complexity of description.

The UE 122 illustrated in FIG. 5 includes a receiver 500 that receives an RRC message and the like from the base station apparatus, a processing unit 502 that performs processing in accordance with parameters included in a received message, and a transmitter 504 that transmits an RRC message and the like to the base station apparatus. The base station apparatus may be the eNB 102, or may be the gNB 108. The processing unit 502 may include a part or all of functions of various layers (for example, the physical layer, the MAC layer, the RLC layer, the PDCP layer, the SDAP layer, the RRC layer, and the NAS layer). In other words, the processing unit 502 may include a part or all of a physical layer processing unit, a MAC layer processing unit, an RLC layer processing unit, a PDCP layer processing unit, an SDAP processing unit, an RRC layer processing unit, and a NAS layer processing unit. The UE 122 may include a measuring unit (not illustrated) for performing measurement.

Figure 6:
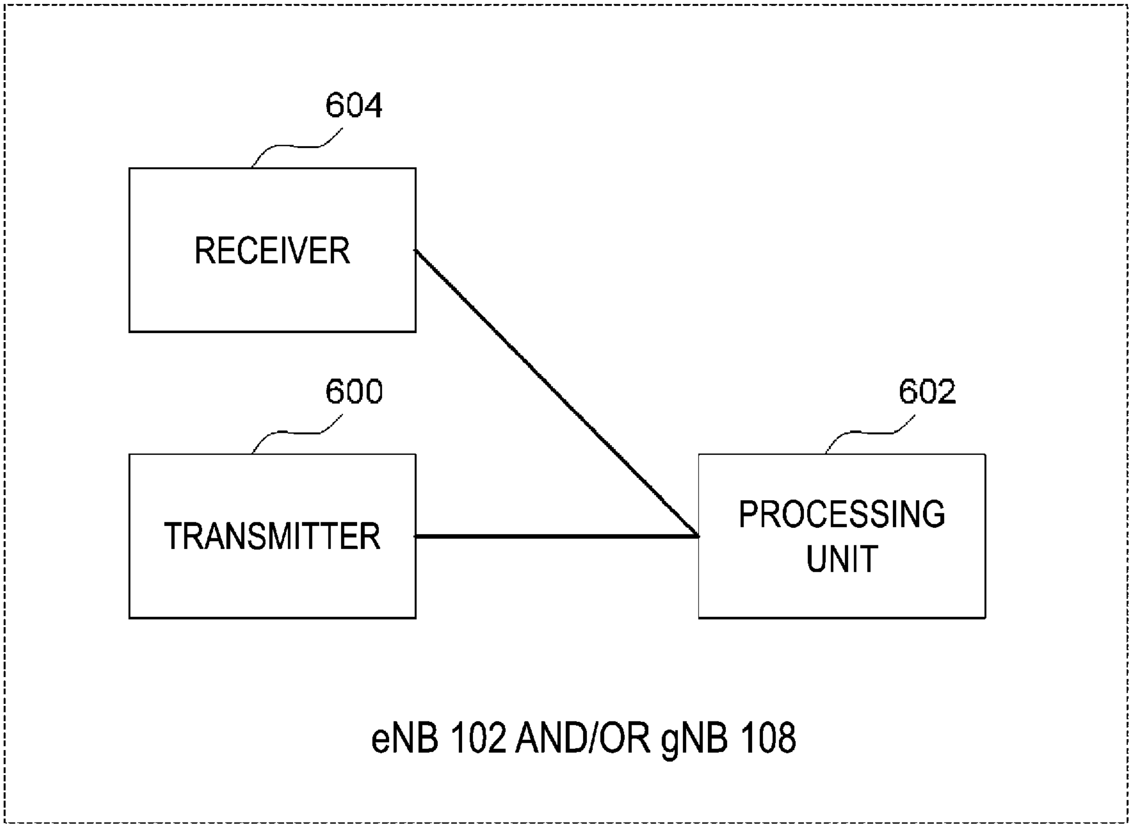
FIG. 6 is a block diagram illustrating a configuration of a base station apparatus according to an embodiment of the present invention.

FIG. 6 is a block diagram illustrating a configuration of the base station apparatus according to an embodiment of the present invention. Note that FIG. 6 illustrates only the main components closely related to an aspect of the present invention in order to avoid complexity of description. The base station apparatus may be the eNB 102, or may be the gNB 108.

The base station apparatus illustrated in FIG. 6 includes a transmitter 600 that transmits an RRC message and the like to the UE 122, a processing unit 602 that creates an RRC message including parameters and transmits the RRC message to the UE 122 to thereby cause the processing unit 502 of the UE 122 to perform processing, and a receiver 604 that receives an RRC message and the like from the UE 122. The processing unit 602 may include a part or all of functions of various layers (for example, the physical layer, the MAC layer, the RLC layer, the PDCP layer, the SDAP layer, the RRC layer, and the NAS layer). In other words, the processing unit 602 may include a part or all of a physical layer processing unit, a MAC layer processing unit, an RLC layer processing unit, a PDCP layer processing unit, an SDAP processing unit, an RRC layer processing unit, and a NAS layer processing unit.

Various examples of processing of the terminal apparatus according to an embodiment of the present invention will be described below.

Figure 15:
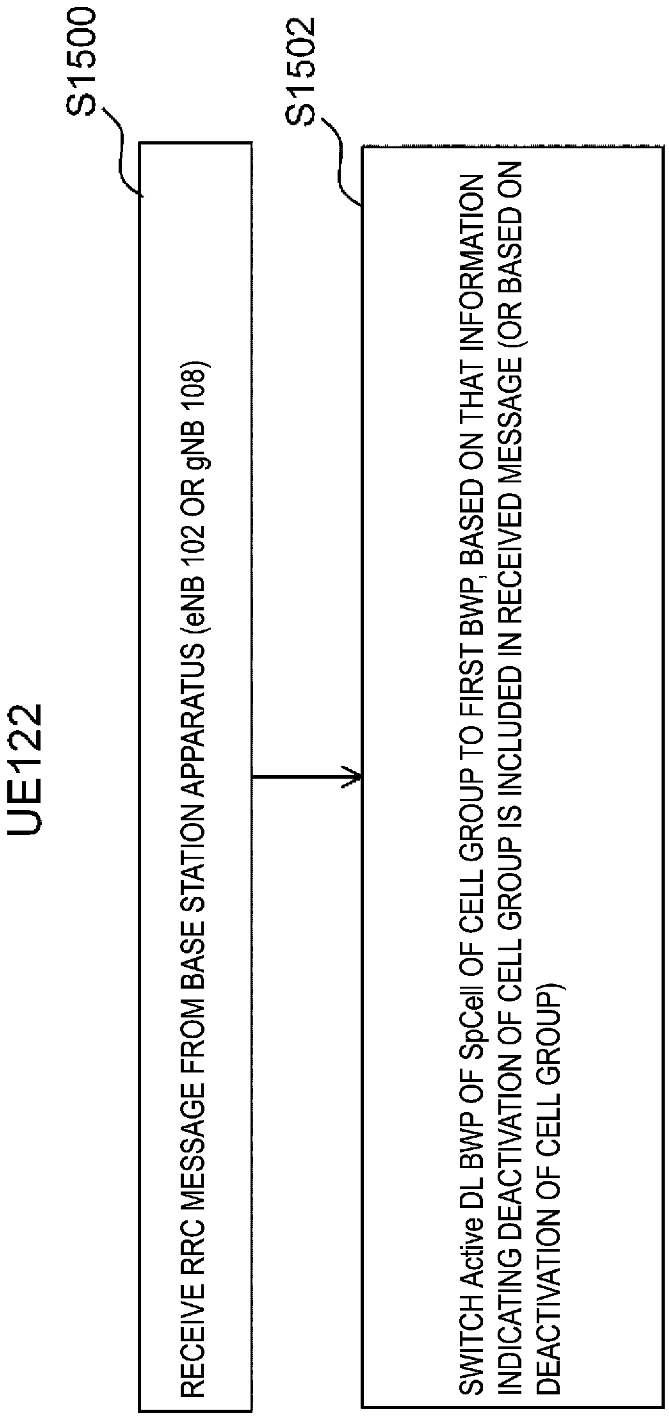
FIG. 15 is an example of processing of the terminal apparatus according to an embodiment of the present invention.

FIG. 15 is a diagram illustrating an example of processing of the terminal apparatus according to an embodiment of the present invention.

The terminal apparatus (UE 122) receives a message from the base station apparatus (the eNB 102 or the gNB 108) (Step S1500). The message may include configurations of one or multiple downlink BWPs for the SpCell. Each of the configurations of the downlink BWPs may include information of a reference signal used for radio link monitoring. The message may include information for determining (or indicating) whether to bring the cell group into the activated state or the deactivated state. Note that the configuration and the information may be notified on the same message, or may be notified on different messages. The message may be an RRC message, may be a MAC control element or a message including the MAC control element, may be another message, or may be a combination of those.

Information (BWP identifier) indicating a specific BWP (first BWP) among the downlink BWPs may be included in the message.

The terminal apparatus switches the Active DL BWP of the SpCell of the cell group to the first BWP, based on that information indicating that the cell group is to be deactivated is included in the received message (or based on that the cell group is deactivated) (Step S1502). The terminal apparatus performs radio link monitoring by using a reference signal used for radio link monitoring configured for the first BWP. The cell group may be the master cell group or the secondary cell group.

In this manner, in a case that the cell group is deactivated, the terminal apparatus can efficiently perform necessary radio link monitoring. The base station apparatus can efficiently acquire information related to a radio link failure in the cell group from the terminal apparatus that has deactivated the cell group.

An example of a case in which the message is an RRC message will be described. The terminal apparatus receives an RRC message transmitted from the base station apparatus (the eNB 102 or the gNB 108). The RRC message may include configurations (for example, a BWP-Downlink information element included in a ServingCellConfig information element in NR) of one or multiple downlink BWPs for the SpCell. Each of the configurations of the downlink BWPs may include information (for example, a RadioLinkMonitoringConfig information element in NR) of a reference signal used for radio link monitoring. The RRC message may include information for determining whether to bring the cell group into the activated state or the deactivated state. The configuration and the information may be included in the same RRC message, or may be included in different RRC messages. The RRC message may be the RRC connection reconfiguration message in LTE. The RRC message may be the RRC reconfiguration message in NR.

Information (for example, a BWP identifier) indicating a specific BWP (first BWP) among the downlink BWPs may be included in the message.

The RRC entity of the terminal apparatus notifies the MAC entity of the information indicating the first BWP, based on that the information indicating the first BWP is included in the received message.

The RRC entity of the terminal apparatus notifies (indicates) the MAC entity of the cell group of deactivation of the cell group, based on that information indicating that the cell group is to be deactivated is included in the received message (or based on that the cell group is deactivated).

The MAC entity that has received the notification (indication) of deactivation of the cell group switches the Active DL BWP of the SpCell of the cell group to the first BWP. Based on received power of the reference signal used for radio link monitoring configured for the first BWP, the PHY entity of the terminal apparatus may evaluate whether it is in synchronization (in-sync) or out of synchronization (out-of-sync). The RRC entity of the terminal apparatus may perform radio link monitoring, based on the evaluation of the PHY entity.

An example of the first BWP will be described. For example, the first BWP may be a BWP indicated with the first active downlink BWP identifier (firstActiveDownlinkBWP-Id). For example, the first BWP may be the initial downlink BWP (initialDownlinkBWP) (in other words, a BWP having the BWP identifier of 0). For example, the first BWP may be a BWP configured as the dormant BWP. For example, the first BWP may be a BWP of the BWP identifier indicated by the base station apparatus as a switch destination in the PSCell in a case that the cell group is deactivated. For example, the first BWP may be a BWP that has remained as the Active BWP in the PSCell until the terminal apparatus deactivates the SCG.

In this manner, the terminal apparatus can efficiently perform necessary radio link monitoring in a case that the cell group is deactivated, based on the RRC reconfiguration message.

The RRC entity of the terminal apparatus may perform processing so as to perform radio link monitoring in the cell group, based on a relaxed required condition, based on that information indicating that the cell group is to be deactivated is included in the received RRC message. The relaxed required condition may be a required condition defined in a specification in advance, or may be a required condition notified from the base station apparatus.

Figure 16:
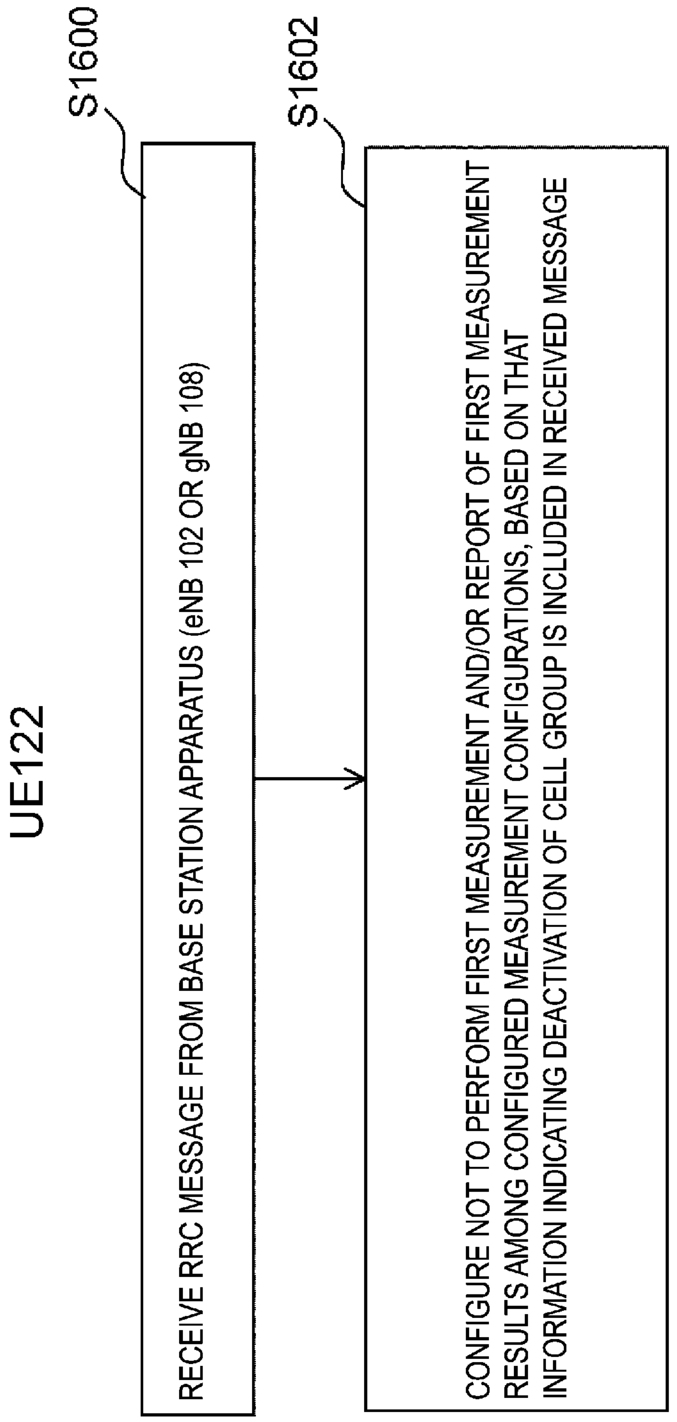
FIG. 16 is an example of processing of the terminal apparatus according to an embodiment of the present invention.

FIG. 16 is a diagram illustrating an example of processing of the terminal apparatus according to an embodiment of the present invention.

The terminal apparatus (UE 122) receives a message from the base station apparatus (the eNB 102 or the gNB 108) (Step S1600). The message may include a measurement configuration. The message may include information for determining (or indicating) whether to bring the cell group into the activated state or the deactivated state. Note that the measurement configuration and the information may be notified on the same message, or may be notified on different messages. The message may be an RRC message, may be a MAC control element or a message including the MAC control element, may be another message, or may be a combination of those.

The measurement configuration may include information (measurement identification information), with which whether measurement is first measurement or second measurement (or is not the first measurement) can be identified. The measurement identification information may be information indicating whether the measurement is the first measurement or the second measurement. The measurement identification information may be such information that indicates that the measurement is the first measurement in a case that the measurement identification information is included in the measurement configuration and indicates that the measurement is the second measurement in a case that the measurement identification information is not included in the measurement configuration. The measurement identification information may be information included in an information element other than the measurement configuration.

The terminal apparatus configures not to perform report of the first measurement and/or first measurement results among the configured measurement configurations, based on that information indicating that the cell group is to be deactivated is included in the received message (Step S1602). In this case, the terminal apparatus may continue report of the second measurement and/or second measurement results among the configured measurement configurations. Alternatively, the RRC entity of the terminal apparatus may perform processing so as to perform the first measurement among the measurement configurations configured in the cell group, based on a relaxed required condition, based on that information indicating that the cell group is to be deactivated is included in the received RRC message. The relaxed required condition may be a required condition defined in a specification in advance, or may be a required condition notified from the base station apparatus.

For example, the relaxed required condition may be a condition that a maximum allowable time period for the terminal apparatus to identify a new cell in a certain frequency in the first measurement is a time period longer than a maximum allowable time period in the second measurement. For example, the relaxed required condition may be a condition that an allowable period (measurement period) for the terminal apparatus to measure the reference signal received power (RSRP) and/or the reference signal received quality (RSRQ) of required accuracy in the first measurement is a period longer than a period in the second measurement. The relaxed required condition may be other conditions.

The cell group may be the master cell group or the secondary cell group.

In this manner, the terminal apparatus can efficiently perform necessary measurement in a case that the cell group is deactivated. The base station apparatus can efficiently acquire measurement results required by the base station apparatus from the terminal apparatus that has deactivated the cell group.

An example of a case in which the message is an RRC message will be described. The terminal apparatus receives an RRC message transmitted from the base station apparatus (the eNB 102 or the gNB 108). The RRC message may include a measurement configuration. The RRC message may include information for determining whether to bring the cell group into the activated state or the deactivated state. The measurement configuration and the information may be included in the same RRC message, or may be included in different RRC messages. The RRC message may be the RRC connection reconfiguration message in LTE. The RRC message may be the RRC reconfiguration message in NR.

The RRC entity of the terminal apparatus determines whether each of the measurements identified with the measurement identifiers is the first measurement or the second measurement, based on that the measurement configuration is included in the received RRC message and the measurement identification information is included in the measurement configuration.

The RRC entity of the terminal apparatus (1) indicates to the MAC entity of the cell group deactivation of the cell group, based on that information indicating that the cell group is to be deactivated is included in the received RRC message, and (2) indicates to the MAC entity of the cell group activation of the cell group, based on that information indicating activation of the cell group is included in the received RRC message.

The RRC entity of the terminal apparatus performs processing so as not to perform the first measurement and/or report of the first measurement results among the measurement configurations configured in the cell group, based on that information indicating that the cell group is to be deactivated is included in the received RRC message. Alternatively, the RRC entity of the terminal apparatus may perform processing so as to perform the first measurement among the measurement configurations configured in the cell group, based on a relaxed required condition, based on that information indicating that the cell group is to be deactivated is included in the received RRC message. The relaxed required condition may be a required condition defined in a specification in advance, or may be a required condition notified from the base station apparatus.

The MAC entity of the terminal apparatus may be notified of activation or deactivation of the cell group by an upper layer (for example, the RRC layer) and/or another MAC entity of the terminal apparatus.

An example of the measurement identification information will be described. For example, the measurement identification information may be information included in the measurement objects. The RRC entity of the terminal apparatus may determine whether measurements of all of the measurement identifiers associated with the measurement objects are the first measurement or the second measurement, based on the measurement identification information included in the measurement objects.

For example, the measurement identification information may be information included in the reporting configuration. The RRC entity of the terminal apparatus may determine whether measurements of all of the measurement identifiers associated with the reporting configuration are the first measurement or the second measurement, based on the measurement identification information included in the reporting configuration.

For example, the measurement identification information may be information not included in the measurement configuration. In this case, the measurement identification information may include information indicating which measurement in the measurement configuration is the first measurement. For example, the measurement identification information may include identifier information of a part or all of (A) the measurement identifier, (B) the measurement object identifier, and (C) the reporting configuration identifier as the objects of the first measurement. The RRC entity of the terminal apparatus may determine which measurement is the first measurement or the second measurement (or is not the first measurement), based on the measurement identification information.

The following will describe an example of processing in which the terminal apparatus does not perform the first measurement and/or report of the first measurement results among the measurement configurations configured in the cell group, based on that information indicating that the cell group is to be deactivated is included in the received RRC message. For example, in a case that the measurement identification information is included in the measurement objects, the RRC entity of the terminal apparatus may remove the measurement objects determined as the first measurement using the measurement identification information, based on that information indicating that the cell group is to be deactivated is included in the received RRC message. In this case, even in a case that the cell group is activated, the removed measurement objects need not be restored.

For example, in a case that the measurement identification information is included in the measurement objects, the RRC entity of the terminal apparatus may suspend the measurement objects determined as the first measurement using the measurement identification information, based on that information indicating that the cell group is to be deactivated is included in the received RRC message. In this case, in a case that the cell group is activated, the suspended measurement objects may be resumed.

In a case that the measurement identification information is included in the reporting configuration, the measurement identification information may be removed or suspended, similarly to the case that the measurement identification information is included in the measurement objects.

For example, the RRC entity of the terminal apparatus may ignore the measurements determined as the first measurement using the measurement identification information, based on that information indicating that the cell group is to be deactivated is included in the received RRC message.

In addition to the measurements explicitly specified using the measurement identification information as described above, there may be measurements that are not performed based on a rule defined in advance, or measurements that are performed under a relaxed required condition based on a rule defined in advance. For example, the measurements may be the inter-frequency measurements and/or the inter-radio access technology measurements. Information indicating enabling (or disabling) of not performing the measurements based on the rule defined in advance or of performing the measurements under the relaxed required condition based on the rule defined in advance may be notified from the base station apparatus.

In this manner, the terminal apparatus can efficiently perform necessary measurement in a case that the cell group is deactivated, based on the RRC reconfiguration message.

Figure 17:
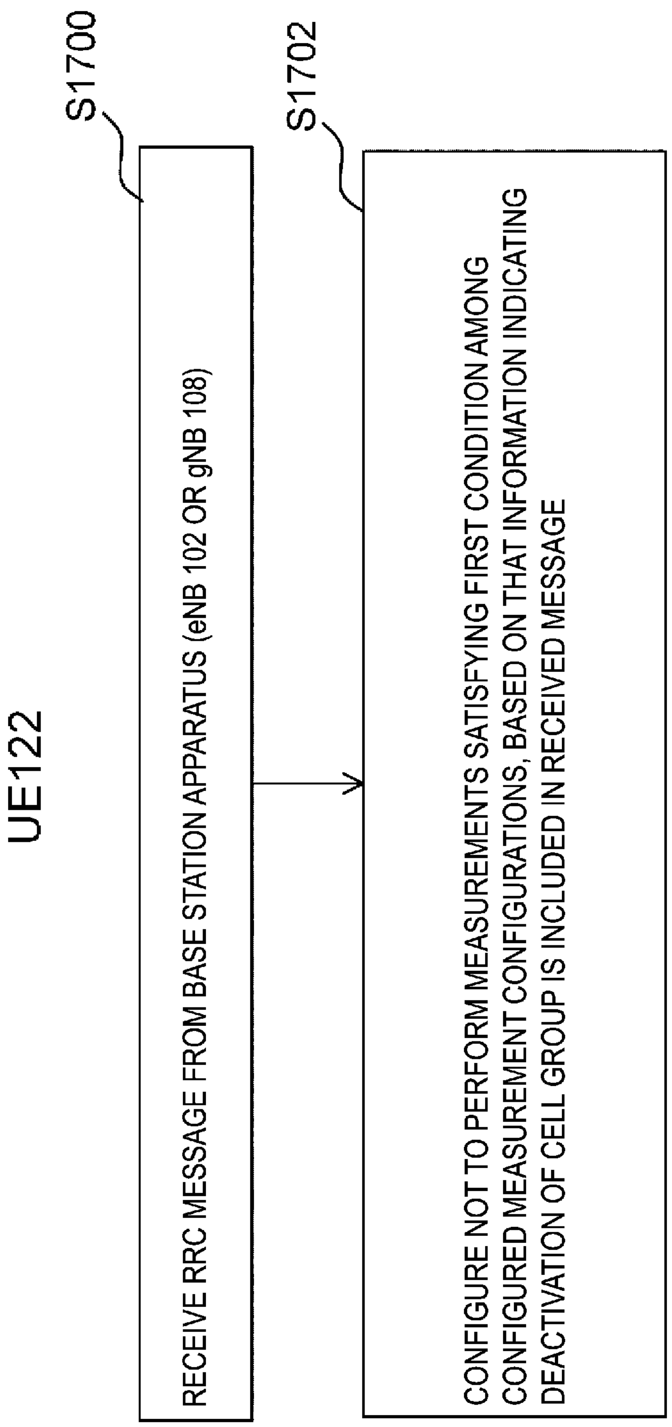
FIG. 17 is an example of processing of the terminal apparatus according to an embodiment of the present invention.

FIG. 17 is a diagram illustrating an example of processing of the terminal apparatus according to an embodiment of the present invention.

The terminal apparatus (UE 122) receives a message from the base station apparatus (the eNB 102 or the gNB 108) (Step S1700). The message may include a measurement configuration. The message may include information of a conditional reconfiguration. The message may include information for determining (or indicating) whether to bring the cell group into the activated state or the deactivated state. Note that the configuration and the information may be notified on the same message, or may be notified on different messages. The message may be an RRC message, may be a MAC control element or a message including the MAC control element, may be another message, or may be a combination of those.

The measurement configuration includes measurement identifier(s) indicating combinations of the measurement objects and the reporting configurations. The conditional reconfiguration may include one or multiple measurement identifiers as the conditional reconfiguration performing condition.

The terminal apparatus configures not to perform measurements satisfying a first condition among the configured measurement configurations, based on that information indicating that the cell group is to be deactivated is included in the received message (or based on that the cell group is to be deactivated) (Step S1502). In this case, the terminal apparatus may continue the measurements not satisfying the first condition and/or report of results of the measurements not satisfying the first condition, among the configured measurement configurations. Alternatively, the RRC entity of the terminal apparatus may perform processing so as to perform measurements satisfying the first condition among the measurement configurations configured in the cell group, based on a relaxed required condition, based on that information indicating that the cell group is to be deactivated is included in the received RRC message. The relaxed required condition may be a required condition defined in a specification in advance, or may be a required condition notified from the base station apparatus. The first condition may include a part or all of the conditions of the following (A) to (C):

(A) the measurement objects are the inter-frequency measurements (the frequency of the measurement objects is a frequency other than the serving cell, or the frequency of the measurement objects is the serving frequency and a subcarrier spacing different from the serving cell is used);

(B) the measurement objects are the inter-radio access technology measurements;

(C) the measurement identifiers are not included in the conditional reconfiguration performing condition of the conditional reconfiguration.

In this manner, the terminal apparatus can efficiently perform necessary measurement in a case that the cell group is deactivated. The base station apparatus can efficiently acquire measurement results required by the base station apparatus from the terminal apparatus that has deactivated the cell group.

An example of a case in which the message is an RRC message will be described. The terminal apparatus receives an RRC message transmitted from the base station apparatus (the eNB 102 or the gNB 108). The RRC message may include a measurement configuration. The message may include information of a conditional reconfiguration. The RRC message may include information for determining whether to bring the cell group into the activated state or the deactivated state. The configuration and the information may be included in the same RRC message, or may be included in different RRC messages. The RRC message may be the RRC connection reconfiguration message in LTE. The RRC message may be the RRC reconfiguration message in NR.

The RRC entity of the terminal apparatus stores information of the measurement configuration including the measurement identifiers, based on that the measurement configuration is included in the received RRC message.

The RRC entity of the terminal apparatus stores information of the conditional reconfiguration including one or multiple measurement identifiers included as the conditional reconfiguration performing condition, based on that the conditional reconfiguration is included in the received RRC message. The RRC entity of the terminal apparatus determines whether or not the reconfiguration performing condition is satisfied, based on the measurement results of the measurement configuration corresponding to the measurement identifiers included as the conditional reconfiguration performing condition.

The RRC entity of the terminal apparatus (1) indicates to the MAC entity of the cell group deactivation of the cell group, based on that information indicating that the cell group is to be deactivated is included in the received RRC message, and (2) indicates to the MAC entity of the cell group activation of the cell group, based on that information indicating activation of the cell group is included in the received RRC message.

The RRC entity of the terminal apparatus configures not to perform a measurement, among the measurements configured, that satisfies the first condition, based on that information indicating that the cell group is to be deactivated is included in the received message (or based on that the cell group is deactivated). In this case, the terminal apparatus may continue the measurements not satisfying the first condition and/or report of results of the measurements not satisfying the first condition, among the configured measurement configurations. Alternatively, the RRC entity of the terminal apparatus may perform processing so as to perform measurements satisfying the first condition among the measurement configurations configured in the cell group, based on a relaxed required condition, based on that information indicating that the cell group is to be deactivated is included in the received RRC message. The relaxed required condition may be a required condition defined in a specification in advance, or may be a required condition notified from the base station apparatus.

In this manner, the terminal apparatus can efficiently perform necessary measurement in a case that the cell group is deactivated, based on the RRC reconfiguration message.

Note that "based on that information indicating that the cell group is to be deactivated is included in the received RRC message" in each description above may be replaced with "based on that the cell group is to be deactivated". In other words, even in a case that the cell group is explicitly deactivated based on an RRC message, the above operation may be applied in a case that the cell group is deactivated. In the terminal apparatus, one of the above processes may be performed, or a part or all of the above processes may be performed.

A state in which the cell group is deactivated may include one or multiple states. For example, a state in which the cell group is deactivated and the time alignment timer is running and a state in which the cell group is deactivated and the time alignment timer is stopped may be present.

For example, in a state in which the cell group is deactivated and the time alignment timer of the PTAG of the cell group is running, the first BWP may function as the Active BWP in the SpCell of the cell group, whereas in a state in which the cell group is deactivated and the time alignment timer of the PTAG of the cell group is stopped, all of the BWPs may be deactivated (Deactivate) in the SpCell of the cell group. In this case, in the state in which the cell group is deactivated, in a case that one of the BWPs is activated (Active), the terminal apparatus may perform radio link monitoring by using a reference signal for radio link monitoring configured for the BWP, and that all of the BWPs are deactivated, the terminal apparatus may be arranged not to perform radio link monitoring.

In the example related to the measurement processing, "based on that information indicating that the cell group is to be deactivated is included in the received RRC message" may be replaced with "based on that the cell group is deactivated and the time alignment timer expires". In other words, in a state in which the cell group is deactivated and the time alignment timer expires, a part of the measurements may not be performed, or the measurements may be performed under a relaxed required condition.

The terminal apparatus may include a timer that is started in a case that the cell group is deactivated, and a state in which the cell group is deactivated and the timer is running and a state in which the cell group is deactivated and the timer expires and is stopped may be present.

For example, in a state in which the cell group is deactivated and the timer is running, the first BWP may function as the Active BWP in the SpCell of the cell group, whereas in a state in which the cell group is deactivated and the timer is stopped, all of the BWPs may be deactivated (Deactivate) in the SpCell of the cell group. In this case, in the state in which the cell group is deactivated, in a case that one of the BWPs is activated (Active), the terminal apparatus may perform radio link monitoring by using a reference signal for radio link monitoring configured for the BWP, whereas in a case that all of the BWPs are deactivated, the terminal apparatus may be arranged not to perform radio link monitoring.

In the example related to the measurement processing, "based on that information indicating that the cell group is to be deactivated is included in the received RRC message" may be replaced with "based on that the cell group is deactivated and a certain timer expires". In other words, in a state in which the cell group is deactivated and a certain timer expires, a part of the measurements may not be performed, or the measurements may be performed under a relaxed required condition.

The expression "information indicating bringing the cell group into the deactivated state is included" may include no inclusion of the information indicating bringing the cell group into the activated state. Similarly, the expression "information indicating bringing the cell group into the activated state is included" may include no inclusion of the information indicating bringing the cell group into the deactivated state.

Activation (deactivation) of the cell group and activation (deactivation) of the SpCell of the cell group may be replaced with each other. Similarly, bringing the cell group into the activated state (deactivated state) and bringing the SpCell of the cell group into the activated state (deactivated state) may be replaced with each other.

In a case that the secondary cell group is deactivated, the MAC entity of the terminal apparatus may be arranged not to stop the time alignment timer of the PTAG of the cell group. In a case that the secondary cell group is activated, the MAC entity of the terminal apparatus may initiate the random access procedure, based on no running (stopping) of the time alignment timer of the PTAG of the cell group. The MAC entity of the terminal apparatus may notify an upper layer (RRC entity) of information allowing determination of expiry of the time alignment timer, based on deactivation of the secondary cell group and expiry of the time alignment timer of the PTAG of the cell group.

The radio bearer(s) in the above description may be the DRB, may be the SRB, or may be the DRB and the SRB.

In the above description, expressions such as "link", "map", and "associate" may be replaced with each other.

In the above description, the "SpCell of the SCG" may be replaced with the "PSCell".

In the above description, the "dormant state" and the "deactivated state" may be replaced with each other, and the "state resumed from the dormant state" and the "activated state" may be replaced with each other. In the above description, "to activate and to deactivate" and "the activated state and the deactivated state" may be replaced with each other.

In the above description, the "activated BWP" and the "Active BWP" may be replaced with each other.

In the example of each processing or the example of the flow of each processing in the above description, a part or all of the steps need not be performed. In the example of each processing or the example of the flow of each processing in the above description, order of the steps may be different from each other. In the example of each processing or the example of the flow of each processing in the above description, a part or all of the processing in each step need not be performed. In the example of each processing or the example of the flow of each processing in the above description, order of processing in each step may be different from each other. In the above description, "to perform B based on satisfaction of A" may be replaced with "to perform B". In other words, "to perform B" may be performed independently of "satisfaction of A".

Note that in the above description, "A may be interpreted as B" may include the meaning that B is interpreted as A in addition to interpretation of A as B. In a case that the above description contains "C may be D" and "C may be E," this means inclusion of "D may be E." In a case that the above description contains "F may be G" and "G may be H," this may mean inclusion of "F may be H."

In the above description, in a case that a condition "A" and a condition "B" are conditions that cannot be satisfied simultaneously, the condition "B" may be expressed as "other" condition of the condition "A".

Various aspects of the terminal apparatus according to embodiments of the present invention will be described below.

(1) A first aspect of the present invention is a terminal apparatus for communicating with one or multiple base station apparatuses by using a first cell group including a PCell and a second cell group including a PSCell. The terminal apparatus includes a receiver configured to receive an RRC message from the one or multiple base station apparatuses, and a processing unit configured to process the RRC message received from the one or multiple base station apparatuses. A first active downlink BWP and/or a first active uplink BWP is configured, based on BWP identifier information included in the RRC message. The terminal apparatus switches an Active DL BWP in the PSCell to the first active downlink BWP, based on that the second cell group is deactivated. The terminal apparatus performs radio link monitoring by using a reference signal for radio link monitoring configured for the first active downlink BWP.

(2) A second aspect of the present invention is a base station apparatus for communicating with a terminal apparatus. The base station apparatus includes a transmitter configured to transmit an RRC message to the terminal apparatus, and a processing unit configured to generate the RRC message to be transmitted to the terminal apparatus. The base station apparatus configures a first active downlink BWP and/or a first active uplink BWP for the terminal apparatus, based on BWP identifier information to be included in the RRC message. The base station apparatus causes the terminal apparatus to switch an Active DL BWP in a PSCell to the first active downlink BWP, based on the base station apparatus deactivating a secondary cell group of the terminal apparatus. The base station apparatus causes performing of radio link monitoring by using a reference signal for radio link monitoring configured for the first active downlink BWP.

(3) A third aspect of the present invention is a method applied to a terminal apparatus for communicating with one or multiple base station apparatuses by using a first cell group including a PCell and a second cell group including a PSCell. The method includes the steps of receiving an RRC message from the one or multiple base station apparatuses, and processing the RRC message received from the one or multiple base station apparatuses. A first active downlink BWP and/or a first active uplink BWP is configured, based on BWP identifier information included in the RRC message. An Active DL BWP in the PSCell is switched to the first active downlink BWP, based on that the second cell group is deactivated. Radio link monitoring is performed by using a reference signal for radio link monitoring configured for the first active downlink BWP.

(4) A fourth aspect of the present invention is an integrated circuit implemented in a terminal apparatus for communicating with one or multiple base station apparatuses by using a first cell group including a PCell and a second cell group including a PSCell. The integrated circuit is configured to cause the terminal apparatus to exert a function of receiving an RRC message from the one or multiple base station apparatuses, and a function of processing the RRC message received from the one or multiple base station apparatuses. A first active downlink BWP and/or a first active uplink BWP is configured, based on BWP identifier information included in the RRC message. An Active DL BWP in the PSCell is switched to the first active downlink BWP, based on that the second cell group is deactivated. Radio link monitoring is performed by using a reference signal for radio link monitoring configured for the first active downlink BWP.

(5) A fifth aspect of the present invention is a terminal apparatus for communicating with one or multiple base station apparatuses by using a first cell group including a PCell and a second cell group including a PSCell. The terminal apparatus includes a processing unit configured to process an RRC message received from the one or multiple base station apparatuses, and a measuring unit configured to perform measurement, based on a measurement configuration included in the RRC message. The measurement configuration includes a measurement object and a reporting configuration, and information of a measurement identifier associating the measurement object and the reporting configuration. The measurement object including first information is regarded as a first measurement object group. The measurement object not including the first information is regarded as a second measurement object group. The terminal apparatus measures the first measurement object group and the second measurement object group, based on that the second cell group is in an activated state. The terminal apparatus does not measure the first measurement object group, or does measure the first measurement object group under a relaxed required condition, based on that the second cell group is in a deactivated state.

(6) A sixth aspect of the present invention is a base station apparatus for communicating with a terminal apparatus. The base station apparatus includes a transmitter configured to transmit an RRC message to the terminal apparatus, and a processing unit configured to generate the RRC message to be transmitted to the terminal apparatus. A measurement configuration included in the RRC message includes a measurement object and a reporting configuration, and information of a measurement identifier associating the measurement object and the reporting configuration. The measurement object including first information is regarded as a first measurement object group. The measurement object not including the first information is regarded as a second measurement object group. The base station apparatus indicates to the terminal apparatus activation of a secondary cell group, and thereby causes the terminal apparatus to measure the first measurement object group and the second measurement object group. The base station apparatus indicates to the terminal apparatus deactivation by the secondary cell group, and thereby causes the terminal apparatus to not measure the first measurement object group, or to measure the first measurement object group under a relaxed required condition.

(7) A seventh aspect of the present invention is a method applied to a terminal apparatus for communicating with one or multiple base station apparatuses by using a first cell group including a PCell and a second cell group including a PSCell. The method includes the steps of processing an RRC message received from the one or multiple base station apparatuses, and performing measurement, based on a measurement configuration included in the RRC message. The measurement configuration includes a measurement object and a reporting configuration, and information of a measurement identifier associating the measurement object and the reporting configuration. The measurement object including first information is regarded as a first measurement object group. The measurement object not including the first information is regarded as a second measurement object group. The first measurement object group and the second measurement object group are measured, based on that the second cell group is in an activated state. The first measurement object group is not measured, or the first measurement object group is measured under a relaxed required condition, based on that the second cell group is in a deactivated state.

(8) An eighth aspect of the present invention is an integrated circuit implemented in a terminal apparatus for communicating with one or multiple base station apparatuses by using a first cell group including a PCell and a second cell group including a PSCell. The integrated circuit is configured to cause the terminal apparatus to exert a function of processing an RRC message received from the one or multiple base station apparatuses, and a function of performing measurement, based on a measurement configuration included in the RRC message. The measurement configuration includes a measurement object and a reporting configuration, and information of a measurement identifier associating the measurement object and the reporting configuration. The measurement object including first information is regarded as a first measurement object group. The measurement object not including the first information is regarded as a second measurement object group. The first measurement object group and the second measurement object group are measured, based on that the second cell group is in an activated state. The first measurement object group is not measured, or the first measurement object group is measured under a relaxed required condition, based on that the second cell group is in a deactivated state.

(9) A ninth aspect of the present invention is a terminal apparatus for communicating with one or multiple base station apparatuses by using a first cell group including a PCell and a second cell group including a PSCell. The terminal apparatus includes a processing unit configured to process an RRC message received from the one or multiple base station apparatuses, and a measuring unit configured to perform measurement, based on a measurement configuration included in the RRC message. The measurement configuration includes a measurement object and a reporting condition, and information of a measurement identifier associating the measurement object and the reporting condition. In a case of deactivating the second cell group, the terminal apparatus determines whether to remove the measurement of the measurement identifier, based on whether or not the measurement identifier is included in a reconfiguration performing condition field of a conditional PSCell modification configuration information element. The terminal apparatus removes the measurement of the measurement identifier, based at least on that the measurement identifier is not included in the reconfiguration performing condition field of the conditional PSCell modification configuration information element.

(10) A tenth aspect of the present invention is a base station apparatus for communicating with a terminal apparatus. The base station apparatus includes a transmitter configured to transmit an RRC message to the terminal apparatus, and a processing unit configured to generate the RRC message to be transmitted to the terminal apparatus. A measurement configuration included in the RRC message includes a measurement object and a reporting configuration, and information of a measurement identifier associating the measurement object and the reporting configuration. The base station apparatus indicates to the terminal apparatus deactivation of a secondary cell group, and thereby causes the terminal apparatus to remove measurement of the measurement identifier, based at least on that the measurement identifier is not included in a reconfiguration performing condition field of a conditional PSCell modification configuration information element.

(11) An eleventh aspect of the present invention is a method applied to a terminal apparatus for communicating with one or multiple base station apparatuses by using a first cell group including a PCell and a second cell group including a PSCell. The method includes the steps of processing an RRC message received from the one or multiple base station apparatuses, and performing measurement, based on a measurement configuration included in the RRC message. The measurement configuration includes a measurement object and a reporting condition, and information of a measurement identifier associating the measurement object and the reporting condition. In a case of deactivating the second cell group, whether to remove the measurement of the measurement identifier is determined, based on whether or not the measurement identifier is included in a reconfiguration performing condition field of a conditional PSCell modification configuration information element. The measurement of the measurement identifier is removed, based at least on that the measurement identifier is not included in the reconfiguration performing condition field of the conditional PSCell modification configuration information element.

(12) A twelfth aspect of the present invention is an integrated circuit implemented in a terminal apparatus for communicating with one or multiple base station apparatuses by using a first cell group including a PCell and a second cell group including a PSCell. The integrated circuit is configured to cause the terminal apparatus to exert a function of processing an RRC message received from the one or multiple base station apparatuses, and a function of performing measurement, based on a measurement configuration included in the RRC message. The measurement configuration includes a measurement object and a reporting condition, and information of a measurement identifier associating the measurement object and the reporting condition. In a case of deactivating the second cell group, whether to remove the measurement of the measurement identifier is determined, based on whether or not the measurement identifier is included in a reconfiguration performing condition field of a conditional PSCell modification configuration information element. The measurement of the measurement identifier is removed, based at least on that the measurement identifier is not included in the reconfiguration performing condition field of the conditional PSCell modification configuration information element.

A program that operates on an apparatus according to the present invention may serve as a program that controls a Central Processing Unit (CPU) and the like to cause a computer to operate in such a manner as to implement the functions of the above-described embodiment according to the present invention. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Note that the apparatuses in the above-described embodiment may be partially enabled by a computer. In such a case, a program for implementing such control functions may be recorded on a computer-readable recording medium to cause a computer system to read and execute the program recorded on this recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that, the invention of the present application is not limited to the above-described embodiments. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. For the present invention, various modifications are possible within the scope of the claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

INDUSTRIAL APPLICABILITY

The present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
210, 312 NAS
500, 604 Receiver
502, 602 Processing unit
504, 600 Transmitter

The invention claimed is:

1. A terminal apparatus for communicating with one or more base station apparatuses by using a master cell group (MCG) including a primary cell (PCell), and a secondary cell group (SCG) including a primary SCG cell (PSCell), the terminal apparatus comprising:
- a receiver configured to receive a radio resource control (RRC) message from the one or more base station apparatuses; and
- processing circuitry configured to:
  - process the RRC message received from the one or more base station-apparatus apparatuses,
  - configure a first active downlink bandwidth part (BWP) based on a BWP identifier included in the RRC message, and
  - in a case that information, indicating that a cell group is to be deactivated, is included in the RRC message:
  - deactivate the SCG,
  - switch an active downlink BWP of the PSCell to the first active downlink BWP, and
  - perform radio link monitoring by using a reference signal for the radio link monitoring configured for the first active downlink BWP.

2. A base station apparatus for communicating with a terminal apparatus by using a master cell group (MCG) including a primary cell (PCell), and a secondary cell group (SCG) including a primary SCG cell (PSCell), the base station apparatus comprising:
- processing circuitry configured to generate a radio resource control (RRC) message to be transmitted to the terminal apparatus; and
- a transmitter configured to transmit the RRC message to the terminal apparatus, wherein
- the terminal apparatus, after receiving the RRC message:
- configures a first active downlink bandwidth part (BWP) based on a BWP identifier included in the RRC message, and in a case that information indicating that a cell group is to be deactivated is included in the RRC message:
  - deactivates the SCG,
  - switches an active downlink BWP of the PSCell to the first active downlink BWP, and
  - performs radio link monitoring by using a reference signal for the radio link monitoring configured for the first active downlink BWP.

3. A method performed by a terminal apparatus for communicating with one or more base station apparatuses by using a master cell group (MCG) including a primary cell (PCell), and a secondary cell group (SCG) including a primary SCG cell (PSCell), the method comprising:
- receiving a radio resource control (RRC) message from the one or more base station apparatuses;

configuring a first active downlink bandwidth part (BWP) based on a BWP identifier included in the RRC message; and in a case that information indicating that a cell group is to be deactivated is included in the RRC message:

deactivating the SCG, switching an active downlink BWP of the PSCell to the first active downlink BWP, and performing radio link monitoring by using a reference signal for the radio link monitoring configured for the first active downlink BWP.

* * * * *